US010226777B2

(12) United States Patent
Quinn et al.

(10) Patent No.: US 10,226,777 B2
(45) Date of Patent: Mar. 12, 2019

(54) SHOWERHEAD BRACKET

(71) Applicant: WATER PIK, INC., Fort Collins, CO (US)

(72) Inventors: Michael J. Quinn, Windsor, CO (US); Leland C. Leber, Fort Collins, CO (US); Harold A. Luettgen, Windsor, CO (US); Ryan Saunders, Bellvue, CO (US)

(73) Assignee: WATER PIK, INC., Fort Collins, CO (US)

(*) Notice: Subject to any disclaimer, the term of this patent is extended or adjusted under 35 U.S.C. 154(b) by 25 days.

(21) Appl. No.: 15/162,107

(22) Filed: May 23, 2016

(65) Prior Publication Data
US 2016/0263592 A1    Sep. 15, 2016

Related U.S. Application Data

(62) Division of application No. 13/924,265, filed on Jun. 21, 2013, now Pat. No. 9,347,208.
(Continued)

(51) Int. Cl.
E03C 1/06    (2006.01)
E03C 1/04    (2006.01)
(Continued)

(52) U.S. Cl.
CPC ............ B05B 1/185 (2013.01); B05B 1/3006 (2013.01); B05B 1/3026 (2013.01); B05B 15/40 (2018.02);
(Continued)

(58) Field of Classification Search
CPC .......... E03C 1/06; E03C 1/0402; E03C 1/025; E03C 1/0409; E03C 1/0412; F16K 11/085; B05B 1/3006; B05B 1/3026; B05B 15/0008; B05B 1/185; B05B 15/14; B05B 15/62; B05B 15/061
(Continued)

(56) References Cited

U.S. PATENT DOCUMENTS 203,094 A    4/1878  Wakeman
204,333 A    5/1878  Josias
(Continued)

FOREIGN PATENT DOCUMENTS

CA    659510    3/1963
CA    2341041   8/1999
(Continued)

OTHER PUBLICATIONS

Author Unknown, "Flipside: The Bold Look of Kohler," 1 page, at least as early as Jun. 2011.
(Continued)

Primary Examiner — Kevin Murphy
Assistant Examiner — Kelsey Cary
(74) Attorney, Agent, or Firm — Dorsey & Whitney LLP

(57) ABSTRACT

A showerhead bracket having a fluid inlet, a fluid outlet, a valve and a valve housing. The valve may be operably connected between the fluid inlet and the fluid outlet. The valve includes a valve inlet port, a low flow exit port and a high flow exit port. The valve housing is disposed between the fluid inlet and the valve inlet port. The valve can selectively rotate within the valve housing.

21 Claims, 48 Drawing Sheets

Related U.S. Application Data

(60) Provisional application No. 61/663,385, filed on Jun. 22, 2012.

(51) Int. Cl.
*B05B 1/18* (2006.01)
*B05B 1/30* (2006.01)
*E03C 1/02* (2006.01)
*F16K 11/085* (2006.01)
*B05B 15/40* (2018.01)
*B05B 15/62* (2018.01)

(52) U.S. Cl.
CPC .............. *B05B 15/62* (2018.02); *E03C 1/025* (2013.01); *E03C 1/0409* (2013.01); *E03C 1/0412* (2013.01); *E03C 1/06* (2013.01); *F16K 11/085* (2013.01); *B05B 1/18* (2013.01); *E03C 2001/026* (2013.01); *Y10T 137/6851* (2015.04)

(58) Field of Classification Search
USPC ...... 137/356; 4/615, 567, 570; 248/75, 74.3, 248/79, 212
See application file for complete search history.

(56) References Cited

U.S. PATENT DOCUMENTS

| | | |
|---|---|---|
| 309,349 A | 12/1884 | Hart |
| 428,023 A | 5/1890 | Schoff |
| 432,712 A | 7/1890 | Taylor |
| 445,250 A | 1/1891 | Lawless |
| 453,109 A | 5/1891 | Dreisorner |
| 486,986 A | 11/1892 | Schinke |
| 566,384 A | 8/1896 | Engelhart |
| 566,410 A | 8/1896 | Schinke |
| 570,405 A | 10/1896 | Jerguson et al. |
| 694,888 A | 3/1902 | Pfluger |
| 800,802 A | 10/1905 | Franquist |
| 832,523 A | 10/1906 | Andersson |
| 835,678 A | 11/1906 | Hammond |
| 845,540 A | 2/1907 | Ferguson |
| 854,094 A | 5/1907 | Klein |
| 926,929 A | 7/1909 | Dusseau |
| 1,001,842 A | 8/1911 | Greenfield |
| 1,003,037 A | 9/1911 | Crowe |
| 1,018,143 A | 2/1912 | Vissering |
| 1,046,573 A | 12/1912 | Ellis |
| 1,130,520 A | 3/1915 | Kenney |
| 1,203,466 A | 10/1916 | Benson |
| 1,217,254 A | 2/1917 | Winslow |
| 1,218,895 A | 3/1917 | Porter |
| 1,255,577 A | 2/1918 | Berry |
| 1,260,181 A | 3/1918 | Garnero |
| 1,276,117 A | 8/1918 | Riebe |
| 1,284,099 A | 11/1918 | Harris |
| 1,327,428 A | 1/1920 | Gregory |
| 1,451,800 A | 4/1923 | Agner |
| 1,459,582 A | 6/1923 | Dubee |
| 1,469,528 A | 10/1923 | Owens |
| 1,500,921 A | 7/1924 | Bramson et al. |
| 1,560,789 A | 11/1925 | Johnson et al. |
| 1,597,477 A | 8/1926 | Panhorst |
| 1,633,531 A | 6/1927 | Keller |
| 1,669,949 A | 5/1928 | Reynolds |
| 1,692,394 A | 11/1928 | Sundh |
| 1,695,263 A | 12/1928 | Jacques |
| 1,724,147 A | 8/1929 | Russell |
| 1,724,161 A | 8/1929 | Wuesthoff |
| 1,736,160 A | 11/1929 | Jonsson |
| 1,754,127 A | 4/1930 | Srulowitz |
| 1,758,115 A | 5/1930 | Kelly |
| 1,778,658 A | 10/1930 | Baker |
| 1,821,274 A | 9/1931 | Plummer |
| 1,849,517 A | 3/1932 | Fraser |
| 1,890,156 A | 12/1932 | Konig |
| 1,906,575 A | 5/1933 | Goeriz |
| 1,934,553 A | 11/1933 | Mueller et al. |
| 1,946,207 A | 2/1934 | Haire |
| 2,011,446 A | 8/1935 | Judell |
| 2,024,930 A | 12/1935 | Judell |
| 2,033,467 A | 3/1936 | Groeniger |
| 2,044,445 A | 6/1936 | Price et al. |
| 2,085,854 A | 7/1937 | Hathaway et al. |
| 2,096,912 A | 10/1937 | Morris |
| 2,117,152 A | 5/1938 | Crosti |
| D113,439 S | 2/1939 | Reinecke |
| 2,196,783 A | 4/1940 | Shook |
| 2,197,667 A | 4/1940 | Shook |
| 2,216,149 A | 10/1940 | Weiss |
| D126,433 S | 4/1941 | Enthof |
| 2,251,192 A | 7/1941 | Krumsiek et al. |
| 2,268,263 A | 12/1941 | Newell et al. |
| 2,285,831 A | 6/1942 | Pennypacker |
| 2,342,757 A | 2/1944 | Roser |
| 2,402,741 A | 6/1946 | Draviner |
| D147,258 S | 8/1947 | Becker |
| D152,584 S | 2/1949 | Becker |
| 2,467,954 A | 4/1949 | Becker |
| 2,518,709 A | 8/1950 | Mosby, Jr. |
| 2,546,348 A | 3/1951 | Schuman |
| 2,567,642 A | 9/1951 | Penshaw |
| 2,581,129 A | 1/1952 | Muldoon |
| D166,073 S | 3/1952 | Dunkelberger |
| 2,648,762 A | 8/1953 | Dunkelberger |
| 2,664,271 A | 12/1953 | Arutunoff |
| 2,671,693 A | 3/1954 | Hyser et al. |
| 2,676,806 A | 4/1954 | Bachman |
| 2,679,575 A | 5/1954 | Haberstump |
| 2,680,358 A | 6/1954 | Zublin |
| 2,726,120 A | 12/1955 | Bletcher et al. |
| 2,759,765 A | 8/1956 | Pawley |
| 2,776,168 A | 1/1957 | Schweda |
| 2,792,847 A | 5/1957 | Spencer |
| 2,873,999 A | 2/1959 | Webb |
| 2,930,505 A | 3/1960 | Meyer |
| 2,931,672 A | 4/1960 | Merritt et al. |
| 2,935,265 A | 5/1960 | Richter |
| 2,949,242 A | 8/1960 | Blumberg et al. |
| 2,957,587 A | 10/1960 | Tobin |
| 2,966,311 A | 12/1960 | Davis |
| D190,295 S | 5/1961 | Becker |
| 2,992,437 A | 7/1961 | Nelson et al. |
| 3,007,648 A | 11/1961 | Fraser |
| D192,935 S | 5/1962 | Becker |
| 3,032,357 A | 5/1962 | Shames et al. |
| 3,034,809 A | 5/1962 | Greenberg |
| 3,037,799 A | 6/1962 | Mulac |
| 3,081,339 A | 3/1963 | Green et al. |
| 3,092,333 A | 6/1963 | Gaiotto |
| 3,098,508 A | 7/1963 | Gerdes |
| 3,103,723 A | 9/1963 | Becker |
| 3,104,815 A | 9/1963 | Schultz |
| 3,104,827 A | 9/1963 | Aghnides |
| 3,111,277 A | 11/1963 | Grimsley |
| 3,112,073 A | 11/1963 | Larson et al. |
| 3,143,857 A | 8/1964 | Eaton |
| 3,196,463 A | 7/1965 | Farneth |
| 3,231,200 A | 1/1966 | Heald |
| 3,236,545 A | 2/1966 | Parkes et al. |
| 3,239,152 A | 3/1966 | Bachli et al. |
| 3,266,059 A | 8/1966 | Stelle |
| 3,272,437 A | 9/1966 | Coson |
| 3,273,359 A | 9/1966 | Fregeolle |
| 3,306,634 A | 2/1967 | Groves et al. |
| 3,323,148 A | 6/1967 | Burnon |
| 3,329,967 A | 7/1967 | Martinez et al. |
| 3,341,132 A | 9/1967 | Parkison |
| 3,342,419 A | 9/1967 | Weese |
| 3,344,994 A | 10/1967 | Fife |
| 3,363,842 A | 1/1968 | Burns |
| 3,383,051 A | 5/1968 | Fiorentino |
| 3,389,925 A | 6/1968 | Gottschald |
| 3,393,311 A | 7/1968 | Dahl |
| 3,393,312 A | 7/1968 | Dahl |

(56) References Cited

U.S. PATENT DOCUMENTS

| | | |
|---|---|---|
| 3,404,410 A | 10/1968 | Sumida |
| 3,492,029 A | 1/1970 | French et al. |
| 3,516,611 A | 6/1970 | Piggott |
| 3,546,961 A | 12/1970 | Marton |
| 3,550,863 A | 12/1970 | McDermott |
| 3,552,436 A | 1/1971 | Stewart |
| 3,565,116 A | 2/1971 | Gabin |
| 3,566,917 A | 3/1971 | White |
| 3,580,513 A | 5/1971 | Martin |
| 3,584,822 A | 6/1971 | Oram |
| 3,596,835 A | 8/1971 | Smith et al. |
| 3,612,577 A | 10/1971 | Pope |
| 3,637,143 A | 1/1972 | Shames et al. |
| 3,641,333 A | 2/1972 | Gendron |
| 3,647,144 A | 3/1972 | Parkison et al. |
| 3,663,044 A | 5/1972 | Contreras et al. |
| 3,669,470 A | 6/1972 | Deurloo |
| 3,672,648 A | 6/1972 | Price |
| 3,682,392 A | 8/1972 | Kint |
| 3,685,745 A | 8/1972 | Peschcke-koedt |
| D224,834 S | 9/1972 | Laudell |
| 3,711,029 A | 1/1973 | Bartlett |
| 3,722,798 A | 3/1973 | Bletcher et al. |
| 3,722,799 A | 3/1973 | Rauh |
| 3,731,084 A | 5/1973 | Trevorrow |
| 3,754,779 A | 8/1973 | Peress |
| D228,622 S | 10/1973 | Juhlin |
| 3,762,648 A | 10/1973 | Deines et al. |
| 3,768,735 A | 10/1973 | Ward |
| 3,786,995 A | 1/1974 | Manoogian et al. |
| 3,801,019 A | 4/1974 | Trenary et al. |
| 3,810,580 A | 5/1974 | Rauh |
| 3,826,454 A | 7/1974 | Zieger |
| 3,840,734 A | 10/1974 | Oram |
| 3,845,291 A | 10/1974 | Portyrata |
| 3,860,271 A | 1/1975 | Rodgers |
| 3,861,719 A | 1/1975 | Hand |
| 3,865,310 A | 2/1975 | Elkins et al. |
| 3,869,151 A | 3/1975 | Fletcher et al. |
| 3,887,136 A | 6/1975 | Anderson |
| 3,896,845 A | 7/1975 | Parker |
| 3,902,671 A | 9/1975 | Symmons |
| 3,910,277 A | 10/1975 | Zimmer |
| D237,708 S | 11/1975 | Grohe |
| 3,929,164 A | 12/1975 | Richter |
| 3,929,287 A | 12/1975 | Givler et al. |
| 3,958,756 A | 5/1976 | Trenary et al. |
| D240,322 S | 6/1976 | Staub |
| 3,963,179 A | 6/1976 | Tomaro |
| 3,967,783 A | 7/1976 | Halsted et al. |
| 3,979,096 A | 9/1976 | Zieger |
| 3,994,443 A | 11/1976 | Shenker |
| 3,997,116 A | 12/1976 | Moen |
| 3,998,390 A | 12/1976 | Peterson et al. |
| 3,999,714 A | 12/1976 | Lang |
| 4,005,880 A | 2/1977 | Anderson et al. |
| 4,006,920 A | 2/1977 | Sadler et al. |
| 4,023,782 A | 5/1977 | Eifer |
| 4,042,984 A | 8/1977 | Butler |
| 4,045,054 A | 8/1977 | Arnold |
| D245,858 S | 9/1977 | Grube |
| D245,860 S | 9/1977 | Grube |
| 4,068,801 A | 1/1978 | Leutheuser |
| 4,081,135 A | 3/1978 | Tomaro |
| 4,084,271 A | 4/1978 | Ginsberg |
| 4,091,998 A | 5/1978 | Peterson |
| D249,356 S | 9/1978 | Nagy |
| 4,117,979 A | 10/1978 | Lagarelli et al. |
| 4,129,257 A | 12/1978 | Eggert |
| 4,130,120 A | 12/1978 | Kohler, Jr. |
| 4,131,233 A | 12/1978 | Koenig |
| 4,133,486 A | 1/1979 | Fanella |
| 4,135,549 A | 1/1979 | Baker |
| D251,045 S | 2/1979 | Grube |
| 4,141,502 A | 2/1979 | Grohe |
| 4,151,955 A | 5/1979 | Stouffer |
| 4,151,957 A | 5/1979 | Gecewicz et al. |
| 4,162,801 A | 7/1979 | Kresky et al. |
| 4,165,837 A | 8/1979 | Rundzaitis |
| 4,167,196 A | 9/1979 | Morris |
| 4,174,822 A | 11/1979 | Larsson |
| 4,185,781 A | 1/1980 | O'Brien |
| 4,190,207 A | 2/1980 | Fienhold et al. |
| 4,191,332 A | 3/1980 | De Langis et al. |
| 4,203,550 A | 5/1980 | On |
| 4,209,132 A | 6/1980 | Kwan |
| D255,626 S | 7/1980 | Grube |
| 4,219,160 A | 8/1980 | Allred, Jr. |
| 4,221,338 A | 9/1980 | Shames et al. |
| 4,239,409 A | 12/1980 | Osrwo |
| 4,243,253 A | 1/1981 | Rogers, Jr. |
| 4,244,526 A | 1/1981 | Arth |
| D258,677 S | 3/1981 | Larsson |
| 4,254,914 A | 3/1981 | Shames et al. |
| 4,258,414 A | 3/1981 | Sokol |
| 4,272,022 A | 6/1981 | Evans |
| 4,274,400 A | 6/1981 | Baus |
| 4,275,843 A | 6/1981 | Moen |
| 4,282,612 A | 8/1981 | King |
| D261,300 S | 10/1981 | Klose |
| D261,417 S | 10/1981 | Klose |
| 4,303,201 A | 12/1981 | Elkins et al. |
| 4,319,608 A | 3/1982 | Raikov et al. |
| 4,324,364 A | 4/1982 | Diller |
| 4,330,089 A | 5/1982 | Finkbeiner |
| D266,212 S | 9/1982 | Haug et al. |
| 4,350,298 A | 9/1982 | Tada |
| 4,353,508 A | 10/1982 | Butterfield et al. |
| 4,358,056 A | 11/1982 | Greenhut et al. |
| D267,582 S | 1/1983 | Mackay et al. |
| D268,359 S | 3/1983 | Klose |
| D268,442 S | 3/1983 | Darmon |
| D268,611 S | 4/1983 | Klose |
| 4,383,554 A | 5/1983 | Merriman |
| 4,396,797 A | 8/1983 | Sakuragi et al. |
| 4,398,669 A | 8/1983 | Fienhold |
| 4,425,965 A | 1/1984 | Bayh, III et al. |
| 4,432,392 A | 2/1984 | Paley |
| D274,457 S | 6/1984 | Haug |
| 4,461,052 A | 7/1984 | Mostul |
| 4,465,308 A | 8/1984 | Martini |
| 4,467,964 A | 8/1984 | Kaeser |
| 4,495,550 A | 1/1985 | Visciano |
| 4,527,745 A | 7/1985 | Butterfield et al. |
| 4,540,202 A | 9/1985 | Amphoux et al. |
| 4,545,081 A | 10/1985 | Nestor et al. |
| 4,553,775 A | 11/1985 | Halling |
| D281,820 S | 12/1985 | Oba et al. |
| 4,561,593 A | 12/1985 | Cammack et al. |
| 4,564,889 A | 1/1986 | Bolson |
| 4,571,003 A | 2/1986 | Roling et al. |
| 4,572,232 A | 2/1986 | Gruber |
| D283,645 S | 4/1986 | Tanaka |
| 4,587,991 A | 5/1986 | Chorkey |
| 4,588,130 A | 5/1986 | Trenary et al. |
| 4,598,866 A | 7/1986 | Cammack et al. |
| 4,614,303 A | 9/1986 | Moseley, Jr. et al. |
| 4,616,298 A | 10/1986 | Bolson |
| 4,618,100 A | 10/1986 | White et al. |
| 4,629,124 A | 12/1986 | Gruber |
| 4,629,125 A | 12/1986 | Liu |
| 4,643,463 A | 2/1987 | Halling et al. |
| 4,645,244 A | 2/1987 | Curtis |
| RE32,386 E | 3/1987 | Hunter |
| 4,650,120 A | 3/1987 | Kress |
| 4,650,470 A | 3/1987 | Epstein |
| 4,652,025 A | 3/1987 | Conroy, Sr. |
| 4,654,900 A | 4/1987 | McGhee |
| 4,657,185 A | 4/1987 | Rundzaitis |
| 4,669,666 A | 6/1987 | Finkbeiner |
| 4,669,757 A | 6/1987 | Bartholomew |
| 4,674,687 A | 6/1987 | Smith et al. |
| 4,683,917 A | 8/1987 | Bartholomew |
| 4,703,893 A | 11/1987 | Gruber |

(56) References Cited

U.S. PATENT DOCUMENTS

| | | |
|---|---|---|
| 4,717,180 A | 1/1988 | Roman |
| 4,719,654 A | 1/1988 | Blessing |
| 4,733,337 A | 3/1988 | Bieberstein |
| D295,437 S | 4/1988 | Fabian |
| 4,739,801 A | 4/1988 | Kimura et al. |
| 4,749,126 A | 6/1988 | Kessener et al. |
| D296,582 S | 7/1988 | Haug et al. |
| 4,754,928 A | 7/1988 | Rogers et al. |
| D297,160 S | 8/1988 | Robbins |
| 4,764,047 A | 8/1988 | Johnston et al. |
| 4,778,104 A | 10/1988 | Fisher |
| 4,778,111 A | 10/1988 | Leap |
| 4,787,591 A | 11/1988 | Villacorta |
| 4,790,294 A | 12/1988 | Allred, III et al. |
| 4,801,091 A | 1/1989 | Sandvik |
| 4,809,369 A | 3/1989 | Bowden |
| 4,839,599 A | 6/1989 | Fischer |
| 4,841,590 A | 6/1989 | Terry |
| 4,842,059 A | 6/1989 | Tomek |
| D302,325 S | 7/1989 | Charet et al. |
| 4,850,616 A | 7/1989 | Pava |
| 4,854,499 A | 8/1989 | Neuman |
| 4,856,822 A | 8/1989 | Parker |
| 4,865,362 A | 9/1989 | Holden |
| D303,830 S | 10/1989 | Ramsey et al. |
| 4,871,196 A | 10/1989 | Kingsford |
| 4,896,658 A | 1/1990 | Yonekubo et al. |
| D306,351 S | 2/1990 | Charet et al. |
| 4,901,927 A | 2/1990 | Valdivia |
| 4,903,178 A | 2/1990 | Englot et al. |
| 4,903,897 A | 2/1990 | Hayes |
| 4,903,922 A | 2/1990 | Harris, III |
| 4,907,137 A | 3/1990 | Schladitz et al. |
| 4,907,744 A | 3/1990 | Jousson |
| 4,909,435 A | 3/1990 | Kidouchi et al. |
| 4,914,759 A | 4/1990 | Goff |
| 4,946,202 A | 8/1990 | Perricone |
| 4,951,329 A | 8/1990 | Shaw |
| 4,953,585 A | 9/1990 | Rollini et al. |
| 4,964,573 A | 10/1990 | Lipski |
| 4,972,048 A | 11/1990 | Martin |
| D313,267 S | 12/1990 | Lenci et al. |
| 4,976,460 A | 12/1990 | Newcombe et al. |
| D314,246 S | 1/1991 | Bache |
| D315,191 S | 3/1991 | Mikol |
| 4,998,673 A | 3/1991 | Pilolla |
| 5,004,158 A | 4/1991 | Halem et al. |
| D317,348 S | 6/1991 | Geneve et al. |
| 5,020,570 A | 6/1991 | Cotter |
| 5,022,103 A | 6/1991 | Faist |
| D317,968 S | 7/1991 | Tsai |
| 5,032,015 A | 7/1991 | Christianson |
| 5,033,528 A | 7/1991 | Volcani |
| 5,033,897 A | 7/1991 | Chen |
| D319,294 S | 8/1991 | Kohler, Jr. et al. |
| D320,064 S | 9/1991 | Presman |
| 5,046,764 A | 9/1991 | Kimura et al. |
| D321,062 S | 10/1991 | Bonbright |
| 5,058,804 A | 10/1991 | Yonekubo et al. |
| D322,119 S | 12/1991 | Haug et al. |
| D322,681 S | 12/1991 | Yuen |
| 5,070,552 A | 12/1991 | Gentry et al. |
| D323,545 S | 1/1992 | Ward |
| 5,082,019 A | 1/1992 | Tetrault |
| 5,086,878 A | 2/1992 | Swift |
| 5,090,624 A | 2/1992 | Rogers |
| 5,100,055 A | 3/1992 | Rokitenetz et al. |
| D325,769 S | 4/1992 | Haug et al. |
| D325,770 S | 4/1992 | Haug et al. |
| 5,103,384 A | 4/1992 | Drohan |
| D326,311 S | 5/1992 | Lenci et al. |
| D327,115 S | 6/1992 | Rogers |
| 5,121,511 A | 6/1992 | Sakamoto et al. |
| D327,729 S | 7/1992 | Rogers |
| 5,127,580 A | 7/1992 | Fu-I |
| 5,134,251 A | 7/1992 | Martin |
| D328,944 S | 8/1992 | Robbins |
| 5,141,016 A | 8/1992 | Nowicki |
| D329,504 S | 9/1992 | Yuen |
| 5,143,300 A | 9/1992 | Cutler |
| 5,145,114 A | 9/1992 | Monch |
| 5,148,556 A | 9/1992 | Bottoms et al. |
| D330,068 S | 10/1992 | Haug et al. |
| D330,408 S | 10/1992 | Thacker |
| D330,409 S | 10/1992 | Raffo |
| 5,153,976 A | 10/1992 | Benchaar et al. |
| 5,154,355 A | 10/1992 | Gonzalez |
| 5,154,483 A | 10/1992 | Zeller |
| 5,161,567 A | 11/1992 | Humpert |
| 5,163,752 A | 11/1992 | Copeland et al. |
| 5,171,429 A | 12/1992 | Yasuo |
| 5,172,860 A | 12/1992 | Yuch |
| 5,172,862 A | 12/1992 | Heimann et al. |
| 5,172,866 A | 12/1992 | Ward |
| D332,303 S | 1/1993 | Klose |
| D332,994 S | 2/1993 | Huen |
| D333,339 S | 2/1993 | Klose |
| 5,197,767 A | 3/1993 | Kimura et al. |
| D334,794 S | 4/1993 | Klose |
| D335,171 S | 4/1993 | Lenci et al. |
| 5,201,468 A | 4/1993 | Freier et al. |
| 5,206,963 A | 5/1993 | Wiens |
| 5,207,499 A | 5/1993 | Vajda et al. |
| 5,213,267 A | 5/1993 | Heimann et al. |
| 5,220,697 A | 6/1993 | Birchfield |
| D337,839 S | 7/1993 | Zeller |
| 5,228,625 A | 7/1993 | Grassberger |
| 5,230,106 A | 7/1993 | Henkin et al. |
| D338,542 S | 8/1993 | Yuen |
| 5,232,162 A | 8/1993 | Chih |
| D339,492 S | 9/1993 | Klose |
| D339,627 S | 9/1993 | Klose |
| D339,848 S | 9/1993 | Gottwald |
| 5,246,169 A | 9/1993 | Heimann et al. |
| 5,246,301 A | 9/1993 | Hirasawa |
| D340,376 S | 10/1993 | Klose |
| 5,253,670 A | 10/1993 | Perrott |
| 5,253,807 A | 10/1993 | Newbegin |
| 5,254,809 A | 10/1993 | Martin |
| D341,007 S | 11/1993 | Haug et al. |
| D341,191 S | 11/1993 | Klose |
| D341,220 S | 11/1993 | Eagan |
| 5,263,646 A | 11/1993 | McCauley |
| 5,265,833 A | 11/1993 | Heimann et al. |
| 5,268,826 A | 12/1993 | Greene |
| 5,276,596 A | 1/1994 | Krenzel |
| 5,277,391 A | 1/1994 | Haug et al. |
| 5,286,071 A | 2/1994 | Storage |
| 5,288,110 A | 2/1994 | Allread |
| 5,294,054 A | 3/1994 | Benedict et al. |
| 5,297,735 A | 3/1994 | Heimann et al. |
| 5,297,739 A | 3/1994 | Allen |
| D345,811 S | 4/1994 | Van Deursen et al. |
| D346,426 S | 4/1994 | Warshawsky |
| D346,428 S | 4/1994 | Warshawsky |
| D346,430 S | 4/1994 | Warshawsky |
| D347,262 S | 5/1994 | Black et al. |
| D347,265 S | 5/1994 | Gottwald |
| 5,316,216 A | 5/1994 | Cammack et al. |
| D348,720 S | 7/1994 | Haug et al. |
| 5,329,650 A | 7/1994 | Zaccai et al. |
| D349,947 S | 8/1994 | Hing-Wah |
| 5,333,787 A | 8/1994 | Smith et al. |
| 5,333,789 A | 8/1994 | Garneys |
| 5,340,064 A | 8/1994 | Heimann et al. |
| 5,340,165 A | 8/1994 | Sheppard |
| D350,808 S | 9/1994 | Warshawsky |
| 5,344,080 A | 9/1994 | Matsui |
| 5,349,987 A | 9/1994 | Shieh |
| 5,356,076 A | 10/1994 | Bishop |
| 5,356,077 A | 10/1994 | Shames |
| D352,092 S | 11/1994 | Warshawsky |
| D352,347 S | 11/1994 | Dannenberg |
| D352,766 S | 11/1994 | Hill et al. |

(56) References Cited

U.S. PATENT DOCUMENTS

| | | |
|---|---|---|
| 5,368,235 A | 11/1994 | Drozdoff et al. |
| 5,369,556 A | 11/1994 | Zeller |
| 5,370,427 A | 12/1994 | Hoelle et al. |
| 5,385,500 A | 1/1995 | Schmidt |
| D355,242 S | 2/1995 | Warshawsky |
| D355,703 S | 2/1995 | Duell |
| D356,626 S | 3/1995 | Wang |
| 5,397,064 A | 3/1995 | Heitzman |
| 5,398,872 A | 3/1995 | Joubran |
| 5,398,977 A | 3/1995 | Berger et al. |
| 5,402,812 A | 4/1995 | Moineau et al. |
| 5,405,089 A | 4/1995 | Heimann et al. |
| 5,414,879 A | 5/1995 | Hiraishi et al. |
| 5,423,348 A | 6/1995 | Jezek et al. |
| 5,433,384 A | 7/1995 | Chan et al. |
| D361,399 S | 8/1995 | Carbone et al. |
| D361,623 S | 8/1995 | Huen |
| 5,441,075 A | 8/1995 | Clare |
| 5,449,206 A | 9/1995 | Lockwood |
| D363,360 S | 10/1995 | Santarsiero |
| 5,454,809 A | 10/1995 | Janssen |
| 5,468,057 A | 11/1995 | Megerle et al. |
| D364,935 S | 12/1995 | deBlois |
| D365,625 S | 12/1995 | Bova |
| D365,646 S | 12/1995 | deBlois |
| 5,476,225 A | 12/1995 | Chan |
| D366,309 S | 1/1996 | Huang |
| D366,707 S | 1/1996 | Kaiser |
| D366,708 S | 1/1996 | Santarsiero |
| D366,709 S | 1/1996 | Szymanski |
| D366,710 S | 1/1996 | Szymanski |
| 5,481,765 A | 1/1996 | Wang |
| D366,948 S | 2/1996 | Carbone |
| D367,315 S | 2/1996 | Andrus |
| D367,333 S | 2/1996 | Swyst |
| D367,696 S | 3/1996 | Andrus |
| D367,934 S | 3/1996 | Carbone |
| D368,146 S | 3/1996 | Carbone |
| D368,317 S | 3/1996 | Swyst |
| 5,499,767 A | 3/1996 | Morand |
| D368,539 S | 4/1996 | Carbone et al. |
| D368,540 S | 4/1996 | Santarsiero |
| D368,541 S | 4/1996 | Kaiser et al. |
| D368,542 S | 4/1996 | deBlois et al. |
| D369,204 S | 4/1996 | Andrus |
| D369,205 S | 4/1996 | Andrus |
| 5,507,436 A | 4/1996 | Ruttenberg |
| D369,873 S | 5/1996 | deBlois et al. |
| D369,874 S | 5/1996 | Santarsiero |
| D369,875 S | 5/1996 | Carbone |
| D370,052 S | 5/1996 | Chan et al. |
| D370,250 S | 5/1996 | Fawcett et al. |
| D370,277 S | 5/1996 | Kaiser |
| D370,278 S | 5/1996 | Nolan |
| D370,279 S | 5/1996 | deBlois |
| D370,280 S | 5/1996 | Kaiser |
| D370,281 S | 5/1996 | Johnstone et al. |
| 5,517,392 A | 5/1996 | Rousso et al. |
| 5,521,803 A | 5/1996 | Eckert et al. |
| D370,542 S | 6/1996 | Santarsiero |
| D370,735 S | 6/1996 | deBlois |
| D370,987 S | 6/1996 | Santarsiero |
| D370,988 S | 6/1996 | Santarsiero |
| D371,448 S | 7/1996 | Santarsiero |
| D371,618 S | 7/1996 | Nolan |
| D371,619 S | 7/1996 | Szymanski |
| D371,856 S | 7/1996 | Carbone |
| D372,318 S | 7/1996 | Szymanski |
| D372,319 S | 7/1996 | Carbone |
| 5,531,625 A | 7/1996 | Zhong |
| 5,539,624 A | 7/1996 | Dougherty |
| D372,548 S | 8/1996 | Carbone |
| D372,998 S | 8/1996 | Carbone |
| D373,210 S | 8/1996 | Santarsiero |
| 5,547,132 A | 8/1996 | Grogran |
| 5,547,374 A | 8/1996 | Coleman |
| D373,434 S | 9/1996 | Nolan |
| D373,435 S | 9/1996 | Nolan |
| D373,645 S | 9/1996 | Johnstone et al. |
| D373,646 S | 9/1996 | Szymanski et al. |
| D373,647 S | 9/1996 | Kaiser |
| D373,648 S | 9/1996 | Kaiser |
| D373,649 S | 9/1996 | Carbone |
| D373,651 S | 9/1996 | Szymanski |
| D373,652 S | 9/1996 | Kaiser |
| 5,551,637 A | 9/1996 | Lo |
| 5,552,973 A | 9/1996 | Hsu |
| 5,558,278 A | 9/1996 | Gallorini |
| D374,271 S | 10/1996 | Fleischmann |
| D374,297 S | 10/1996 | Kaiser |
| D374,298 S | 10/1996 | Swyst |
| D374,299 S | 10/1996 | Carbone |
| D374,493 S | 10/1996 | Szymanski |
| D374,494 S | 10/1996 | Santarsiero |
| D374,732 S | 10/1996 | Kaiser |
| D374,733 S | 10/1996 | Santasiero |
| 5,560,548 A | 10/1996 | Mueller et al. |
| 5,567,115 A | 10/1996 | Carbone |
| D375,541 S | 11/1996 | Michaluk |
| 5,577,664 A | 11/1996 | Heitzman |
| D376,217 S | 12/1996 | Kaiser |
| D376,860 S | 12/1996 | Santarsiero |
| D376,861 S | 12/1996 | Johnstone et al. |
| D376,862 S | 12/1996 | Carbone |
| 5,605,173 A | 2/1997 | Arnaud |
| D378,401 S | 3/1997 | Neufeld et al. |
| 5,613,638 A | 3/1997 | Blessing |
| 5,613,639 A | 3/1997 | Storm et al. |
| 5,615,837 A | 4/1997 | Roman |
| 5,624,074 A | 4/1997 | Parisi |
| 5,624,498 A | 4/1997 | Lee et al. |
| D379,212 S | 5/1997 | Chan |
| D379,404 S | 5/1997 | Spelts |
| 5,632,049 A | 5/1997 | Chen |
| D381,405 S | 7/1997 | Waidele et al. |
| D381,737 S | 7/1997 | Chan |
| D382,936 S | 8/1997 | Shfaram |
| 5,653,260 A | 8/1997 | Huber |
| 5,667,146 A | 9/1997 | Pimentel et al. |
| D385,332 S | 10/1997 | Andrus |
| D385,333 S | 10/1997 | Caroen et al. |
| D385,334 S | 10/1997 | Caroen et al. |
| D385,616 S | 10/1997 | Dow et al. |
| D385,947 S | 11/1997 | Dow et al. |
| D387,230 S | 12/1997 | von Buelow et al. |
| 5,697,557 A | 12/1997 | Blessing et al. |
| 5,699,964 A | 12/1997 | Bergmann et al. |
| 5,702,057 A | 12/1997 | Huber |
| D389,558 S | 1/1998 | Andrus |
| 5,704,080 A | 1/1998 | Kuhne |
| 5,707,011 A | 1/1998 | Bosio |
| 5,718,380 A | 2/1998 | Schorn et al. |
| D392,369 S | 3/1998 | Chan |
| 5,730,361 A | 3/1998 | Thonnes |
| 5,730,362 A | 3/1998 | Cordes |
| 5,730,363 A | 3/1998 | Kress |
| 5,742,961 A | 4/1998 | Casperson et al. |
| D394,490 S | 5/1998 | Andrus et al. |
| 5,746,375 A | 5/1998 | Guo |
| 5,749,552 A | 5/1998 | Fan |
| 5,749,602 A | 5/1998 | Delaney et al. |
| D394,899 S | 6/1998 | Caroen et al. |
| D395,074 S | 6/1998 | Neibrook et al. |
| D395,075 S | 6/1998 | Kolada |
| D395,142 S | 6/1998 | Neibrook |
| 5,764,760 A | 6/1998 | Grandbert et al. |
| 5,765,760 A | 6/1998 | Kuo |
| 5,769,802 A | 6/1998 | Wang |
| 5,772,120 A | 6/1998 | Huber |
| 5,778,939 A | 7/1998 | Hok-Yin |
| 5,788,157 A | 8/1998 | Kress |
| D398,370 S | 9/1998 | Purdy |
| 5,806,771 A | 9/1998 | Loschelder et al. |
| 5,819,791 A | 10/1998 | Chronister et al. |

(56) References Cited

U.S. PATENT DOCUMENTS

| | | |
|---|---|---|
| 5,820,574 A | 10/1998 | Henkin et al. |
| 5,823,431 A | 10/1998 | Pierce |
| 5,823,442 A | 10/1998 | Guo |
| 5,826,803 A | 10/1998 | Cooper |
| 5,833,138 A | 11/1998 | Crane et al. |
| 5,839,666 A | 11/1998 | Heimann et al. |
| D402,350 S | 12/1998 | Andrus |
| D403,754 S | 1/1999 | Gottwald |
| D404,116 S | 1/1999 | Bosio |
| 5,855,348 A | 1/1999 | Fornara |
| 5,860,599 A | 1/1999 | Lin |
| 5,862,543 A | 1/1999 | Reynoso et al. |
| 5,862,985 A | 1/1999 | Neibrook et al. |
| D405,502 S | 2/1999 | Tse |
| 5,865,375 A | 2/1999 | Hsu |
| 5,865,378 A | 2/1999 | Hollinshead et al. |
| 5,873,647 A | 2/1999 | Kurtz et al. |
| D408,893 S | 4/1999 | Tse |
| D409,276 S | 5/1999 | Ratzlaff |
| D410,276 S | 5/1999 | Ben-Tsur |
| 5,918,809 A | 7/1999 | Simmons |
| 5,918,811 A | 7/1999 | Denham et al. |
| D413,157 S | 8/1999 | Ratzlaff |
| 5,937,905 A | 8/1999 | Santos |
| 5,938,123 A | 8/1999 | Heitzman |
| 5,941,462 A | 8/1999 | Sandor |
| 5,947,388 A | 9/1999 | Woodruff |
| D415,247 S | 10/1999 | Haverstraw et al. |
| 5,961,046 A | 10/1999 | Joubran |
| 5,967,417 A | 10/1999 | Mantel |
| 5,979,776 A | 11/1999 | Williams |
| 5,992,762 A | 11/1999 | Wang |
| D418,200 S | 12/1999 | Ben-Tsur |
| 5,997,047 A | 12/1999 | Pimentel et al. |
| 6,003,165 A | 12/1999 | Loyd |
| D418,902 S | 1/2000 | Haverstraw et al. |
| D418,903 S | 1/2000 | Haverstraw et al. |
| D418,904 S | 1/2000 | Milrud |
| 6,016,975 A | 1/2000 | Amaduzzi |
| D421,099 S | 2/2000 | Mullenmeister |
| 6,021,960 A | 2/2000 | Kehat |
| D422,053 S | 3/2000 | Brenner et al. |
| 6,042,027 A | 3/2000 | Sandvik |
| 6,042,155 A | 3/2000 | Lockwood |
| D422,336 S | 4/2000 | Haverstraw et al. |
| D422,337 S | 4/2000 | Chan |
| D423,083 S | 4/2000 | Haug et al. |
| D423,110 S | 4/2000 | Cipkowski |
| D424,160 S | 5/2000 | Haug et al. |
| D424,161 S | 5/2000 | Haug et al. |
| D424,162 S | 5/2000 | Haug et al. |
| D424,163 S | 5/2000 | Haug et al. |
| D426,290 S | 6/2000 | Haug et al. |
| D427,661 S | 7/2000 | Haverstraw et al. |
| D428,110 S | 7/2000 | Haug et al. |
| D428,125 S | 7/2000 | Chan |
| 6,085,780 A | 7/2000 | Morris |
| D430,267 S | 8/2000 | Milrud et al. |
| 6,095,801 A | 8/2000 | Spiewak |
| D430,643 S | 9/2000 | Tse |
| 6,113,002 A | 9/2000 | Finkbeiner |
| 6,123,272 A | 9/2000 | Havican et al. |
| 6,123,308 A | 9/2000 | Faisst |
| D432,624 S | 10/2000 | Chan |
| D432,625 S | 10/2000 | Chan |
| D433,096 S | 10/2000 | Tse |
| D433,097 S | 10/2000 | Tse |
| 6,126,091 A | 10/2000 | Heitzman |
| 6,126,290 A | 10/2000 | Veigel |
| D434,109 S | 11/2000 | Ko |
| 6,164,569 A | 12/2000 | Hollinshead et al. |
| 6,164,570 A | 12/2000 | Smeltzer |
| D435,889 S | 1/2001 | Ben-Tsur et al. |
| D439,305 S | 3/2001 | Slothower |
| 6,199,580 B1 | 3/2001 | Morris |
| 6,202,679 B1 | 3/2001 | Titus |
| D440,276 S | 4/2001 | Slothower |
| D440,277 S | 4/2001 | Slothower |
| D440,278 S | 4/2001 | Slothower |
| D441,059 S | 4/2001 | Fleischmann |
| 6,209,799 B1 | 4/2001 | Finkbeiner |
| D443,025 S | 5/2001 | Kollmann et al. |
| D443,026 S | 5/2001 | Kollmann et al. |
| D443,027 S | 5/2001 | Kollmann et al. |
| D443,029 S | 5/2001 | Kollmann et al. |
| 6,223,998 B1 | 5/2001 | Heitzman |
| 6,230,984 B1 | 5/2001 | Jager |
| 6,230,988 B1 | 5/2001 | Chao et al. |
| 6,230,989 B1 | 5/2001 | Haverstraw et al. |
| D443,335 S | 6/2001 | Andrus |
| D443,336 S | 6/2001 | Kollmann et al. |
| D443,347 S | 6/2001 | Gottwald |
| 6,241,166 B1 | 6/2001 | Overington et al. |
| 6,250,572 B1 | 6/2001 | Chen |
| D444,846 S | 7/2001 | Cross |
| D444,865 S | 7/2001 | Gottwald |
| D445,871 S | 7/2001 | Fan |
| 6,254,014 B1 | 7/2001 | Clearman et al. |
| 6,270,278 B1 | 8/2001 | Mauro |
| 6,276,004 B1 | 8/2001 | Bertrand et al. |
| 6,283,447 B1 | 9/2001 | Fleet |
| 6,286,764 B1 | 9/2001 | Garvey et al. |
| D449,673 S | 10/2001 | Kollmann et al. |
| D450,370 S | 11/2001 | Wales et al. |
| D450,805 S | 11/2001 | Lindholm et al. |
| D450,806 S | 11/2001 | Lindholm et al. |
| D450,807 S | 11/2001 | Lindholm et al. |
| D451,169 S | 11/2001 | Lindholm et al. |
| D451,170 S | 11/2001 | Lindholm et al. |
| D451,171 S | 11/2001 | Lindholm et al. |
| D451,172 S | 11/2001 | Lindholm et al. |
| 6,321,777 B1 | 11/2001 | Wu |
| 6,322,006 B1 | 11/2001 | Guo |
| D451,583 S | 12/2001 | Lindholm et al. |
| D451,980 S | 12/2001 | Lindholm et al. |
| D452,553 S | 12/2001 | Lindholm et al. |
| D452,725 S | 1/2002 | Lindholm et al. |
| D452,897 S | 1/2002 | Gillette et al. |
| 6,336,764 B1 | 1/2002 | Liu |
| 6,338,170 B1 | 1/2002 | De Simone |
| D453,369 S | 2/2002 | Lobermeier |
| D453,370 S | 2/2002 | Lindholm et al. |
| D453,551 S | 2/2002 | Lindholm et al. |
| 6,349,735 B2 | 2/2002 | Gul |
| D454,617 S | 3/2002 | Curbbun et al. |
| D454,938 S | 3/2002 | Lord |
| 6,375,342 B1 | 4/2002 | Koren et al. |
| D457,937 S | 5/2002 | Lindholm et al. |
| 6,382,531 B1 | 5/2002 | Tracy |
| D458,348 S | 6/2002 | Mullenmeister |
| 6,412,711 B1 | 7/2002 | Fan |
| D461,224 S | 8/2002 | Lobermeier |
| D461,878 S | 8/2002 | Green et al. |
| 6,450,425 B1 | 9/2002 | Chen |
| 6,454,186 B2 | 9/2002 | Haverstraw et al. |
| 6,463,658 B1 | 10/2002 | Larsson |
| 6,464,265 B1 | 10/2002 | Mikol |
| D465,552 S | 11/2002 | Tse |
| D465,553 S | 11/2002 | Singtoroj |
| 6,484,952 B2 | 11/2002 | Koren |
| D468,800 S | 1/2003 | Tse |
| D469,165 S | 1/2003 | Lim |
| 6,502,796 B1 | 1/2003 | Wales |
| 6,508,415 B2 | 1/2003 | Wang |
| 6,511,001 B1 | 1/2003 | Huang |
| D470,219 S | 2/2003 | Schweitzer |
| 6,516,070 B2 | 2/2003 | Macey |
| D471,253 S | 3/2003 | Tse |
| D471,953 S | 3/2003 | Colligan et al. |
| 6,533,194 B2 | 3/2003 | Marsh et al. |
| 6,537,455 B2 | 3/2003 | Farley |
| D472,958 S | 4/2003 | Ouyoung |
| 6,550,697 B2 | 4/2003 | Lai |
| 6,585,174 B1 | 7/2003 | Huang |

(56) References Cited

U.S. PATENT DOCUMENTS

| | | |
|---|---|---|
| 6,595,439 B1 | 7/2003 | Chen |
| 6,607,148 B1 | 8/2003 | Marsh et al. |
| 6,611,971 B1 | 9/2003 | Antoniello et al. |
| 6,637,676 B2 | 10/2003 | Zieger et al. |
| 6,641,057 B2 | 11/2003 | Thomas et al. |
| D483,837 S | 12/2003 | Fan |
| 6,659,117 B2 | 12/2003 | Gilmore |
| 6,659,372 B2 | 12/2003 | Marsh et al. |
| D485,887 S | 1/2004 | Luettgen et al. |
| D486,888 S | 2/2004 | Lobermeier |
| 6,691,338 B2 | 2/2004 | Zieger |
| 6,691,933 B1 | 2/2004 | Bosio |
| D487,301 S | 3/2004 | Haug et al. |
| D487,498 S | 3/2004 | Blomstrom |
| 6,701,953 B2 | 3/2004 | Agosta |
| 6,715,699 B1 | 4/2004 | Greenberg et al. |
| 6,719,218 B2 | 4/2004 | Cool et al. |
| D489,798 S | 5/2004 | Hunt |
| D490,498 S | 5/2004 | Golichowski |
| 6,736,336 B2 | 5/2004 | Wong |
| 6,739,523 B2 | 5/2004 | Haverstraw et al. |
| 6,739,527 B1 | 5/2004 | Chung |
| D492,004 S | 6/2004 | Haug et al. |
| 6,742,725 B1 | 6/2004 | Fan |
| D494,655 S | 8/2004 | Lin |
| D494,661 S | 8/2004 | Zieger et al. |
| D495,027 S | 8/2004 | Mazzola |
| 6,776,357 B1 | 8/2004 | Naito |
| 6,789,751 B1 | 9/2004 | Fan |
| D496,987 S | 10/2004 | Glunk |
| D497,974 S | 11/2004 | Haug et al. |
| D498,514 S | 11/2004 | Haug et al. |
| D500,121 S | 12/2004 | Blomstrom |
| 6,827,039 B1 | 12/2004 | Nelson |
| D500,549 S | 1/2005 | Blomstrom |
| D501,242 S | 1/2005 | Blomstrom |
| D502,760 S | 3/2005 | Zieger et al. |
| D502,761 S | 3/2005 | Zieger et al. |
| D503,211 S | 3/2005 | Lin |
| D503,463 S | 3/2005 | Hughes et al. |
| 6,863,227 B2 | 3/2005 | Wollenberg et al. |
| 6,869,030 B2 | 3/2005 | Blessing et al. |
| D503,774 S | 4/2005 | Zieger |
| D503,775 S | 4/2005 | Zieger |
| D503,966 S | 4/2005 | Zieger |
| 6,899,292 B2 | 5/2005 | Titinet |
| D506,243 S | 6/2005 | Wu |
| D507,037 S | 7/2005 | Wu |
| 6,935,581 B2 | 8/2005 | Titinet |
| D509,280 S | 9/2005 | Bailey et al. |
| D509,563 S | 9/2005 | Bailey et al. |
| D510,123 S | 9/2005 | Tsai |
| D511,809 S | 11/2005 | Haug et al. |
| D512,119 S | 11/2005 | Haug et al. |
| 6,981,661 B1 | 1/2006 | Chen |
| D516,169 S | 2/2006 | Wu |
| 7,000,854 B2 | 2/2006 | Malek et al. |
| 7,004,409 B2 | 2/2006 | Okubo |
| 7,004,410 B2 | 2/2006 | Li |
| D520,109 S | 5/2006 | Wu |
| 7,040,554 B2 | 5/2006 | Drennow |
| 7,048,210 B2 | 5/2006 | Clark |
| 7,055,767 B1 | 6/2006 | Ko |
| D525,341 S | 7/2006 | Bossini |
| 7,070,125 B2 | 7/2006 | Williams et al. |
| 7,077,342 B2 | 7/2006 | Lee |
| D527,440 S | 8/2006 | Macan |
| 7,093,780 B1 | 8/2006 | Chung |
| 7,097,122 B1 | 8/2006 | Farley |
| D527,790 S | 9/2006 | Hughes et al. |
| D528,631 S | 9/2006 | Gillette et al. |
| 7,100,845 B1 | 9/2006 | Hsieh |
| 7,111,795 B2 | 9/2006 | Thong |
| 7,111,798 B2 | 9/2006 | Thomas et al. |
| D530,389 S | 10/2006 | Glenslak et al. |
| D530,392 S | 10/2006 | Tse |
| D531,259 S | 10/2006 | Hsieh |
| 7,114,666 B2 | 10/2006 | Luettgen et al. |
| D533,253 S | 12/2006 | Luettgen et al. |
| D534,239 S | 12/2006 | Dingler et al. |
| D535,354 S | 1/2007 | Wu |
| D536,060 S | 1/2007 | Sadler |
| 7,156,325 B1 | 1/2007 | Chen |
| 7,182,043 B1 | 2/2007 | Nelson |
| D538,391 S | 3/2007 | Mazzola |
| D540,424 S | 4/2007 | Kirar |
| D540,425 S | 4/2007 | Endo et al. |
| D540,426 S | 4/2007 | Cropelli |
| D540,427 S | 4/2007 | Bouroullec et al. |
| D542,391 S | 5/2007 | Gilbert |
| D542,393 S | 5/2007 | Haug et al. |
| D544,573 S | 6/2007 | Dingler et al. |
| 7,229,031 B2 | 6/2007 | Schmidt |
| 7,243,863 B2 | 7/2007 | Glunk |
| 7,246,760 B2 | 7/2007 | Marty et al. |
| D552,713 S | 10/2007 | Rexach |
| 7,278,591 B2 | 10/2007 | Clearman et al. |
| D556,295 S | 11/2007 | Genord et al. |
| 7,299,510 B2 | 11/2007 | Tsai |
| D557,763 S | 12/2007 | Schonherr et al. |
| D557,764 S | 12/2007 | Schonherr et al. |
| D557,765 S | 12/2007 | Schonherr et al. |
| D558,301 S | 12/2007 | Hoernig |
| 7,303,151 B2 | 12/2007 | Wu |
| D559,357 S | 1/2008 | Wang et al. |
| D559,945 S | 1/2008 | Patterson et al. |
| D560,269 S | 1/2008 | Tse |
| D562,937 S | 2/2008 | Schonherr et al. |
| D562,938 S | 2/2008 | Blessing |
| D562,941 S | 2/2008 | Pan |
| 7,331,536 B1 | 2/2008 | Zhen et al. |
| 7,347,388 B2 | 3/2008 | Chung |
| D565,699 S | 4/2008 | Berberet |
| D565,702 S | 4/2008 | Daunter et al. |
| D565,703 S | 4/2008 | Lammel et al. |
| D566,228 S | 4/2008 | Neagoe |
| D566,229 S | 4/2008 | Rexach |
| D567,328 S | 4/2008 | Spangler et al. |
| D567,335 S | 4/2008 | Huang |
| 7,360,723 B2 | 4/2008 | Lev |
| 7,364,097 B2 | 4/2008 | Okuma |
| 7,374,112 B1 | 5/2008 | Bulan et al. |
| 7,384,007 B2 | 6/2008 | Ho |
| D577,099 S | 9/2008 | Leber |
| D577,793 S | 9/2008 | Leber |
| D578,604 S | 10/2008 | Wu et al. |
| D578,605 S | 10/2008 | Wu et al. |
| D578,608 S | 10/2008 | Wu et al. |
| D580,012 S | 11/2008 | Quinn et al. |
| D580,513 S | 11/2008 | Quinn et al. |
| D581,013 S | 11/2008 | Citterio |
| D581,014 S | 11/2008 | Quinn et al. |
| D586,426 S | 2/2009 | Schoenherr et al. |
| 7,503,345 B2 | 3/2009 | Paterson et al. |
| D590,048 S | 4/2009 | Leber et al. |
| 7,520,448 B2 | 4/2009 | Luettgen et al. |
| D592,276 S | 5/2009 | Shoenherr et al. |
| D592,278 S | 5/2009 | Leber |
| 7,537,175 B2 | 5/2009 | Miura et al. |
| D600,777 S | 9/2009 | Whitaker et al. |
| D603,935 S | 11/2009 | Leber |
| 7,617,990 B2 | 11/2009 | Huffman |
| D605,731 S | 12/2009 | Leber |
| D606,623 S | 12/2009 | Whitaker et al. |
| D606,626 S | 12/2009 | Zore |
| D608,412 S | 1/2010 | Barnard et al. |
| D608,413 S | 1/2010 | Barnard et al. |
| D616,061 S | 5/2010 | Whitaker et al. |
| 7,721,363 B2 * | 5/2010 | Huang .................. E03C 1/066 248/122.1 |
| 7,721,979 B2 | 5/2010 | Mazzola |
| D617,419 S | 6/2010 | Lee |
| D617,873 S | 6/2010 | Lee |
| 7,740,186 B2 | 6/2010 | Macan et al. |

(56) References Cited

U.S. PATENT DOCUMENTS

| | | | |
|---|---|---|---|
| D621,904 S | 8/2010 | Yoo et al. | |
| D621,905 S | 8/2010 | Yoo et al. | |
| 7,770,820 B2 | 8/2010 | Clearman et al. | |
| 7,770,822 B2 | 8/2010 | Leber | |
| D624,156 S | 9/2010 | Leber | |
| 7,789,326 B2 | 9/2010 | Luettgen et al. | |
| D625,776 S | 10/2010 | Williams | |
| 7,832,662 B2 | 11/2010 | Gallo | |
| D628,676 S | 12/2010 | Lee | |
| D629,867 S | 12/2010 | Rexach et al. | |
| 7,871,020 B2 | 1/2011 | Nelson et al. | |
| D641,830 S | 7/2011 | Alexander | |
| D641,831 S | 7/2011 | Williams | |
| 8,020,787 B2 | 9/2011 | Leber | |
| 8,020,788 B2 | 9/2011 | Luettgen et al. | |
| 8,028,935 B2 | 10/2011 | Leber | |
| D652,108 S | 1/2012 | Eads | |
| D652,110 S | 1/2012 | Nichols | |
| D652,114 S | 1/2012 | Yoo | |
| D652,894 S | 1/2012 | Nichols | |
| 8,109,450 B2 | 2/2012 | Luettgen et al. | |
| D656,582 S | 3/2012 | Flowers et al. | |
| 8,132,745 B2 | 3/2012 | Leber et al. | |
| 8,146,838 B2 | 4/2012 | Luettgen et al. | |
| 8,220,726 B2 | 7/2012 | Qui et al. | |
| D667,531 S | 9/2012 | Romero et al. | |
| D669,158 S | 10/2012 | Flowers et al. | |
| 8,292,200 B2 | 10/2012 | Macan et al. | |
| 8,297,534 B2 | 10/2012 | Li et al. | |
| D672,433 S | 12/2012 | Yoo et al. | |
| D673,649 S | 1/2013 | Quinn et al. | |
| D674,047 S | 1/2013 | Yoo et al. | |
| D674,050 S | 1/2013 | Quinn et al. | |
| 8,348,181 B2 | 1/2013 | Whitaker | |
| 8,366,024 B2 | 2/2013 | Leber | |
| D678,463 S | 3/2013 | Quinn et al. | |
| D678,467 S | 3/2013 | Quinn et al. | |
| 8,640,973 B2 | 2/2014 | Gansebom | |
| 9,295,997 B2 | 3/2016 | Harwanko et al. | |
| 9,387,493 B2 | 7/2016 | Lev | |
| 9,399,860 B2 | 7/2016 | Lev | |
| 2001/0042797 A1 | 11/2001 | Shrigley | |
| 2002/0109023 A1 | 8/2002 | Thomas et al. | |
| 2003/0042332 A1 | 3/2003 | Lai | |
| 2003/0062426 A1 | 4/2003 | Gregory et al. | |
| 2003/0121993 A1 | 7/2003 | Haverstraw et al. | |
| 2004/0074993 A1 | 4/2004 | Thomas et al. | |
| 2004/0118949 A1 | 6/2004 | Marks | |
| 2004/0217209 A1 | 11/2004 | Bui | |
| 2004/0244105 A1 | 12/2004 | Tsai | |
| 2005/0001072 A1 | 1/2005 | Bolus et al. | |
| 2005/0284967 A1 | 12/2005 | Korb | |
| 2006/0016913 A1 | 1/2006 | Lo | |
| 2006/0102747 A1 | 5/2006 | Ho | |
| 2006/0163391 A1 | 7/2006 | Schorn | |
| 2006/0219822 A1 | 10/2006 | Miller et al. | |
| 2006/0272086 A1 | 12/2006 | Mesa | |
| 2007/0040054 A1 | 2/2007 | Farzan | |
| 2007/0200013 A1 | 8/2007 | Hsiao | |
| 2007/0246577 A1 | 10/2007 | Leber | |
| 2007/0252021 A1 | 11/2007 | Cristina | |
| 2007/0272770 A1 | 11/2007 | Leber et al. | |
| 2008/0073449 A1 | 3/2008 | Haynes et al. | |
| 2008/0083844 A1 | 4/2008 | Leber et al. | |
| 2008/0121293 A1 | 5/2008 | Leber et al. | |
| 2008/0121771 A1* | 5/2008 | Sen | E03C 1/06 248/229.11 |
| 2008/0156897 A1 | 7/2008 | Leber | |
| 2008/0223957 A1 | 9/2008 | Schorn | |
| 2008/0272591 A1 | 11/2008 | Leber | |
| 2009/0039181 A1 | 2/2009 | Auer, Jr. | |
| 2009/0200404 A1 | 8/2009 | Cristina | |
| 2009/0218420 A1 | 9/2009 | Mazzola | |
| 2009/0307836 A1 | 12/2009 | Blattner et al. | |
| 2010/0127096 A1 | 5/2010 | Leber | |
| 2010/0258695 A1* | 10/2010 | Wu | E03C 1/06 248/289.11 |
| 2011/0000983 A1 | 1/2011 | Chang | |
| 2011/0011953 A1 | 1/2011 | Macan et al. | |
| 2011/0073678 A1 | 3/2011 | Qiu et al. | |
| 2011/0121098 A1 | 5/2011 | Luettgen et al. | |
| 2011/0179566 A1* | 7/2011 | Yang | E03C 1/066 4/605 |
| 2012/0048968 A1 | 3/2012 | Williams | |
| 2012/0222207 A1 | 9/2012 | Slothower et al. | |
| 2013/0126646 A1 | 5/2013 | Wu | |
| 2013/0147186 A1 | 6/2013 | Leber | |
| 2014/0252138 A1 | 9/2014 | Wischstadt et al. | |
| 2015/0165452 A1 | 6/2015 | Luettgen et al. | |
| 2015/0233101 A1* | 8/2015 | Andersen | E03C 1/066 248/75 |

FOREIGN PATENT DOCUMENTS

| | | | |
|---|---|---|---|
| CH | 234284 | 3/1963 | |
| CN | 201260999 Y | 6/2009 | |
| CN | 200920182881 | 9/2009 | |
| CN | 101628263 A | 1/2010 | |
| CN | 101773880 A | 7/2010 | |
| CN | 201940296 U | 8/2011 | |
| CN | 201230021930 | 2/2012 | |
| CN | 201530310992 | 8/2015 | |
| DE | 352813 | 5/1922 | |
| DE | 848627 | 9/1952 | |
| DE | 854100 | 10/1952 | |
| DE | 2360534 | 6/1974 | |
| DE | 2806093 | 8/1979 | |
| DE | 3107808 | 9/1982 | |
| DE | 3246327 | 6/1984 | |
| DE | 3440901 | 7/1985 | |
| DE | 3706320 | 3/1988 | |
| DE | 8804236 | 6/1988 | |
| DE | 4034695 | 5/1991 | |
| DE | 19608085 | 9/1996 | |
| DE | 10034818 A1 | 1/2002 | |
| DE | 202005000881 | 3/2005 | |
| DE | 102006032017 | 1/2008 | |
| DE | 202008009530 | 9/2008 | |
| DE | 202013101201 | 3/2013 | |
| EP | 0167063 | 6/1985 | |
| EP | 0478999 | 4/1992 | |
| EP | 0514753 | 11/1992 | |
| EP | 0435030 | 7/1993 | |
| EP | 0617644 | 10/1994 | |
| EP | 0683354 | 11/1995 | |
| EP | 0687851 | 12/1995 | |
| EP | 0695907 | 2/1996 | |
| EP | 0700729 | 3/1996 | |
| EP | 0719588 | 7/1996 | |
| EP | 0721082 | 7/1996 | |
| EP | 0733747 | 9/1996 | |
| EP | 0808661 | 11/1997 | |
| EP | 0726811 | 1/1998 | |
| EP | 1921214 A1 * | 5/2008 | E03C 1/06 |
| EP | 2164642 | 10/2010 | |
| EP | 2260945 | 12/2010 | |
| FR | 538538 | 6/1922 | |
| FR | 873808 | 7/1942 | |
| FR | 1039750 | 10/1953 | |
| FR | 1098836 | 8/1955 | |
| FR | 2591099 | 6/1987 | |
| FR | 2596492 | 10/1987 | |
| FR | 2695452 | 3/1994 | |
| GB | 10086 | 4/1894 | |
| GB | 3314 | 12/1914 | |
| GB | 129812 | 7/1919 | |
| GB | 204600 | 10/1923 | |
| GB | 634483 | 3/1950 | |
| GB | 971866 | 10/1964 | |
| GB | 1111126 | 4/1968 | |
| GB | 2066074 | 1/1980 | |
| GB | 2066704 | 7/1981 | |
| GB | 2068778 | 8/1981 | |
| GB | 2121319 | 12/1983 | |

(56) References Cited

FOREIGN PATENT DOCUMENTS

| | | |
|---|---|---|
| GB | 2155984 | 10/1985 |
| GB | 2156932 A | 10/1985 |
| GB | 2199771 | 7/1988 |
| GB | 2298595 | 11/1996 |
| GB | 2337471 | 11/1999 |
| IT | 327400 | 7/1935 |
| IT | 350359 | 7/1937 |
| IT | 563459 | 5/1957 |
| JP | S63-181459 | 11/1988 |
| JP | H2-78660 | 6/1990 |
| JP | 4062238 | 2/1992 |
| JP | 4146708 | 5/1992 |
| JP | 2004278194 | 10/2004 |
| NL | 8902957 | 6/1991 |
| WO | WO93/12894 | 7/1993 |
| WO | WO93/25839 | 12/1993 |
| WO | WO96/00617 | 1/1996 |
| WO | WO98/30336 | 7/1998 |
| WO | WO99/59726 | 11/1999 |
| WO | WO00/10720 | 3/2000 |
| WO | WO08/082699 | 7/2008 |
| WO | WO10/04593 | 1/2010 |

OTHER PUBLICATIONS

Color Copy, Labeled 1A, Gemlo, available at least as early as Dec. 2, 1998.
Color Copy, Labeled 1B, Gemlo, available at least as early as Dec. 2, 1998.
International Search Report, PCT/US07/88962, 9 pages, dated Jun. 10, 2008.
International Search Report, PCT/US07/67141, 8 pages, dated Jul. 2, 2008.
EZ Wash Wand, accessed at least as early as Feb. 2016, http://www.ezwashwand.com.
WashWands, accessed at least as early as Feb. 2016, http://www.washwand.com.
Woof Washer, accessed at least as early as Feb. 2016, http://www.woofwasher.com.

* cited by examiner

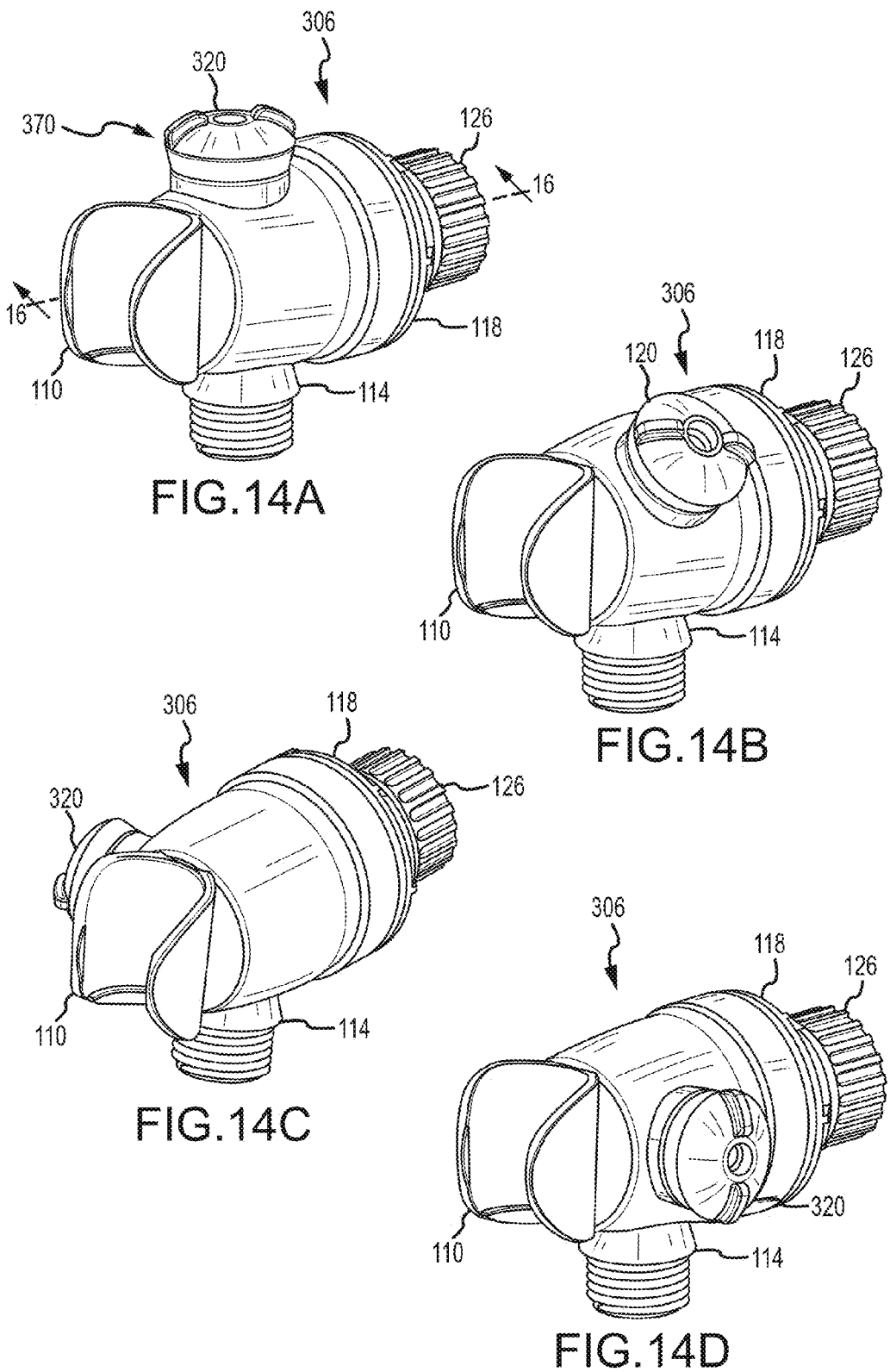

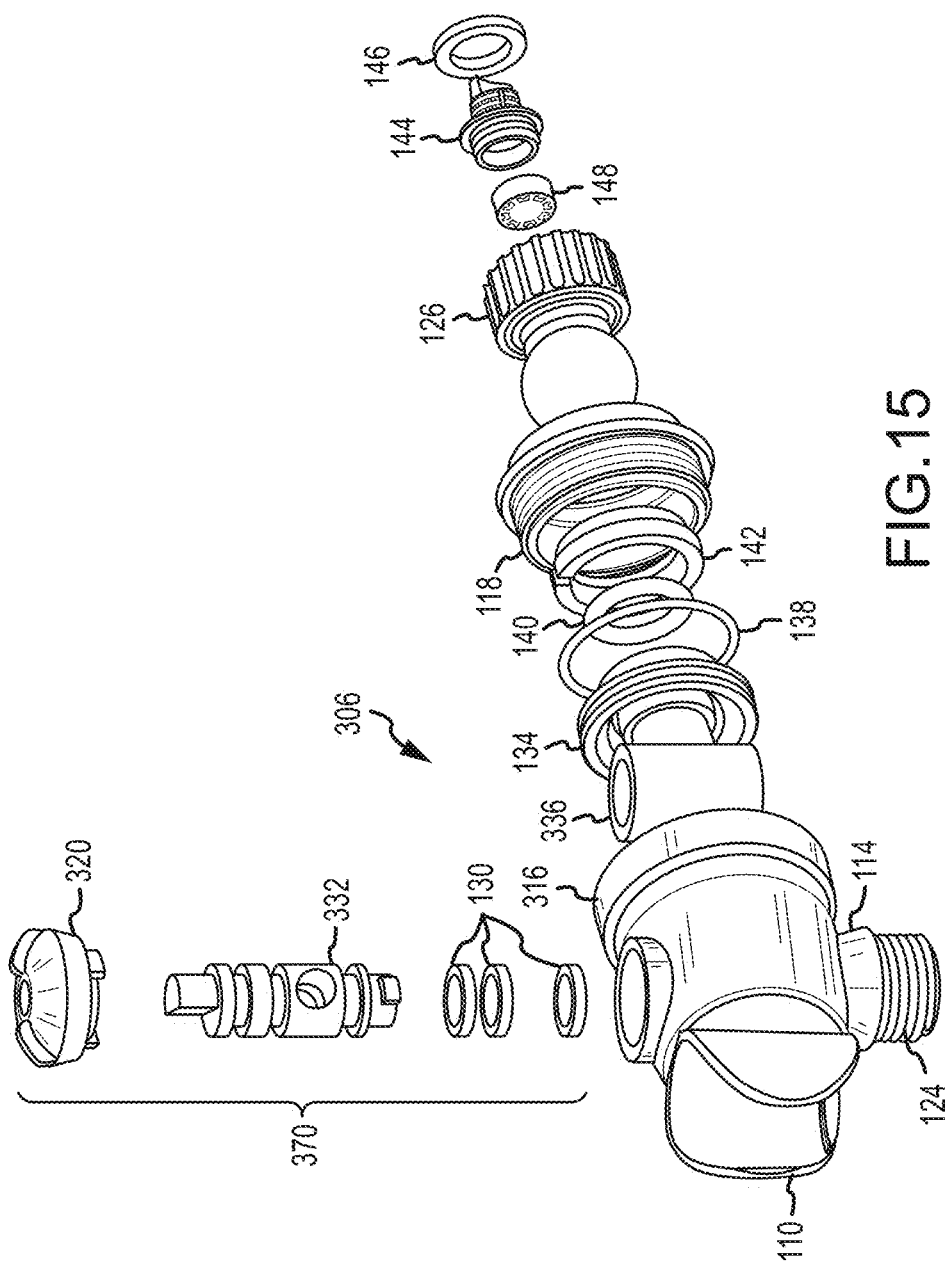

SHOWERHEAD BRACKET

CROSS-REFERENCE TO RELATED APPLICATIONS

This application is a divisional application of U.S. application Ser. No. 13/924,265 filed on Jun. 21, 2013 and now U.S. Pat. No. 9,347,208, issued on May 24, 2016, and entitled "Bracket for Showerhead With Integral Flow Control," which claims the benefit of priority pursuant to 35 U.S.C. § 119(e) of U.S. Provisional Patent Application No. 61/663,385 filed on Jun. 22, 2012 and entitled "Bracket for Showerhead with Integral Flow Control," both of which are hereby incorporated by reference in their entirety.

TECHNICAL FIELD

The technology described herein relates generally to shower hardware, and more particularly to a bracket for a showerhead.

BACKGROUND

Some bath and shower systems include a handheld showerhead that is connected to the water supply by a flexible hose. Usually, a bracket is mounted within the bath or shower enclosure to hold the handheld showerhead when not in use. In some configurations, the bracket is mounted to or provided as part of the shower arm extending from the shower pipe in the wall that supports a standard, fixed showerhead. In some configurations, the bracket may even be provided as an integral component part of the shower arm. In such configurations, these showerhead brackets may also supply water from the shower pipe to either or both conventional and/or handheld showerheads. These showerhead brackets may be fixed or removable from the shower pipe and/or the showerhead.

In order to meet government standards or simply to conserve water, some brackets may contain a flow regulator. However, the flow regulator may be set to a predetermined flow rate. This may be problematic as some users may wish to further decrease the flow rate as compared with other users and/or some users may wish to dynamically change the flow rate while showering.

The information included in this Background section of the specification, including any references cited herein and any description or discussion thereof, is included for technical reference purposes only and is not to be regarded subject matter by which the scope of the invention is defined in the claims is to be bound.

SUMMARY

Some embodiments may include a showerhead bracket having a fluid inlet, a fluid outlet, a valve, and a valve housing. The valve may be operably connected between the fluid inlet and the fluid outlet. The valve may include a valve inlet port, a low flow exit port, and a high flow exit port. The valve housing may be disposed between the fluid inlet and the valve inlet port and may be configured such that the valve can selectively rotate within the valve housing.

Other embodiments may include a bracket assembly for a showerhead. The bracket assembly may include a bracket body and a flow control assembly. The bracket body may include an inlet and an outlet. The flow control assembly may be substantially surrounded by the bracket body and may be disposed between the inlet and the outlet. The flow control assembly may include a flow regulator configured to selectively alternate a rate of fluid flow through the bracket and a housing configured to partially secure the flow regulator within the bracket body.

Still other embodiments may include a showerhead assembly having a showerhead and a bracket fluidly connected to the showerhead. The bracket may include a bracket body, a flow regulator, and a controller. The flow regulator may be substantially surrounded by the bracket body. The flow regulator may include a valve configured to selectively decrease or increase a flow rate of water through the bracket and a valve housing operably connected to the valve. The valve housing may be configured to partially restrain lateral movements of the valve, while still allowing the valve to rotate within the valve housing. The controller may be operably connected to the flow regulator and the bracket body. The controller may be configured to selectively rotate the valve.

Another embodiment may take the form of a showerhead bracket including a bracket housing defining a fluid inlet and a fluid outlet, a spool that is selectively rotatable relative to the bracket housing to adjust a flow rate of fluid flowing from the fluid inlet to the fluid outlet, a spring-biased fluid seal supported within the spool defining a metering hole, and a cradle configured to support a showerhead handle that is selectively rotatable relative to the bracket housing. Rotation of the spool to a low flow position positions the fluid seal against the fluid outlet such that fluid is directed through the metering hole.

A further embodiment may take the form of a showerhead bracket including a bracket housing defining a fluid inlet attachable to a shower pipe and a fluid outlet attachable to showerhead assembly including a showerhead handle, a cradle configured to support the showerhead handle that is selectively rotatable by a user relative to the bracket housing, and a spring sandwiched between the bracket housing and the cradle, such that the spring is configured to rotate relative to the bracket housing in both clockwise and counter-clockwise directions. The frictional forces between the spring and the bracket housing prevent the spring from rotating relative to the bracket housing when the showerhead handle is supported by the cradle and no rotational forces are applied to the cradle by the user.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present invention as defined in the claims is provided in the following written description of various embodiments of the invention and illustrated in the accompanying drawings.

BRIEF DESCRIPTION OF THE DRAWINGS

FIG. 14A is a front isometric view of a second embodiment of a showerhead bracket assembly with a flow controller located on a top surface of a showerhead bracket body.

FIG. 14B is a front isometric view of a third embodiment of a showerhead bracket assembly with the flow controller located on a top right oblique surface of the showerhead bracket body.

FIG. 14C is a front isometric view of a fourth embodiment of a showerhead bracket assembly with the flow controller located on a left side surface of the showerhead bracket body.

FIG. 14D is a front isometric view of a fifth embodiment of a showerhead bracket assembly with the flow controller located on a right side surface of the showerhead bracket body.

FIG. 15 is an exploded view of the showerhead bracket assembly of FIG. 14A.

DETAILED DESCRIPTION

Figure 1:
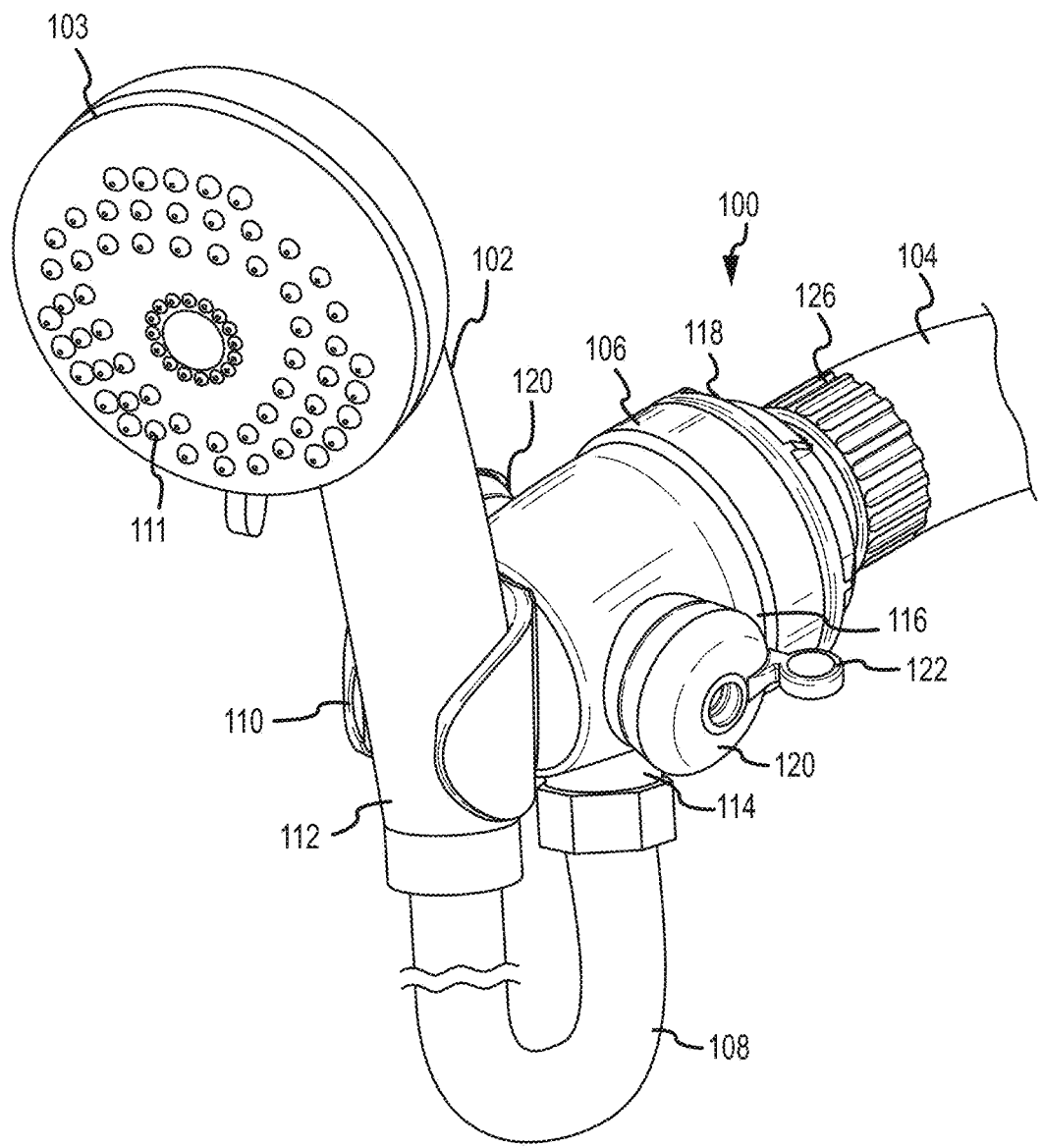
FIG. 1 is an isometric view of an exemplary embodiment of a showerhead bracket assembly attaching a showerhead to a shower pipe.

Various examples of a handheld showerhead bracket with fluid flow controls are described herein. The showerhead bracket may be configured for coupling a conventional handheld showerhead in fluid communication with a showerhead assembly. A coupling member may join the showerhead bracket to a shower pipe and a flexible hose may be joined to the showerhead bracket to deliver water or other fluid from the showerhead assembly to the handheld shower. The showerhead bracket may provide a cradle for holding the handheld showerhead when not being handled by a user. When in the cradle, the handheld showerhead may be configured to direct water towards a user in the same manner as a conventional showerhead. In other embodiments, a conventional showerhead may be mounted to the showerhead bracket, either in place of or in addition to the handheld showerhead. The showerhead bracket may be selectively rotatable and/or pivotable relative to the coupling member, the showerhead, or both in order to change the direction that water exits the showerhead assembly relative to the showerhead pipe.

The showerhead bracket may also include a flow control assembly or flow regulator assembly. The flow control assembly may be disposed between the inlet of the showerhead bracket and the outlet of the showerhead bracket. The flow control assembly selectively alternates the flow volume of water between the shower pipe and the showerhead(s). For example, in one embodiment the flow control assembly may decrease water flow out of the showerhead from approximately 2 gallons per minute to approximately 1.6 gallons per minute. The flow control assembly may include a valve housing, a valve housing base, a controller and a valve. The controller allows a user to rotate the valve within the valve housing. Depending on the position within the valve housing, the valve may restrict a portion, all (or substantially all), or none of the water exiting the shower pipe from reaching the showerhead. This allows a user to customize the water flow while the handheld showerhead is in use. For example, the user may wish to reduce the flow while applying condition to his or her hair. Alternatively or additionally, some spray modes for the showerhead may be too strong (i.e., too highly pressurized) for a particular user. In this case, the user may reduce the water flow while the showerhead is in a particular spray mode, thus reducing the pressure of the water. Then, after changing spray modes the user may increase the water flow (via the flow control assembly) to obtain a desired flow rate and/or pressure.

In some embodiments, the valve may be a stem or rod including a substantially hollow middle portion. A front surface of the valve may include an outlet port and a backside surface of the valve may include an inlet port. Water from the shower pipe enters the valve via the inlet port and exists via the outlet port. The outlet port may vary in dimensions and/or geometry along the body of the valve, such that a first portion of the outlet port may be substantially narrow and a second portion may be substantially wider than the narrow portion. In one embodiment, the outlet port transitions from a narrow open rectangular aperture into a half-circle aperture. In this embodiment, the outlet port aperture may roughly resemble an umbrella. The varying dimensions of the outlet port allow the user to selectively adjust the water flow through the valve (and therefore to the outlet of the shower head bracket). For example, if the narrow portion of the outlet port (i.e., umbrella stem) is aligned with the inlet port, less water will flow between the shower pipe and the showerhead than if the larger portion of the outlet port is aligned with the valve inlet port. As such, the valve may rotate within the valve housing, allowing the user to dynamically adjust the size/shape of the outlet port aligned with the inlet port, thus, varying the flow rate through the valve.

The position of the valve within the valve housing may be controlled by a knob or other controller device (e.g., tab, handle, rod, etc.). There may be multiple controllers. For example, there may be a knob on both the left and right sides of the bracket. The controller may be operably connected to one or both sides of the valve. In embodiments where there is a controller operably connected to both sides of the valve, either controller may adjust the position of the valve within the valve housing.

In other embodiments, there may only be a single controller. In these embodiments, the valve may include a locking mechanism on one side, and a controller operably connected to a second side. The locking mechanism may secure the valve from being separated from the valve housing. The knob or controller may be placed at almost any location on the showerhead bracket. For example, the controller may be placed on the sides, top, oblique surfaces or in any other position along the showerhead bracket. When the controller is placed at varying locations, the angle and/or position of the flow control assembly may also be altered. For example, if the controller is placed on the top surface of the bracket body, the flow control assembly may be positioned within the bracket body so that the valve is substantially perpendicular to the top surface of the bracket body. This allows the controller to easily control the valve without requiring the geometry/shape of the controller, the valve, and/or the flow control assembly to be dramatically altered (if altered at all).

Also, in some embodiments, the flow control assembly may be in addition to a flow regulator or restrictor. The flow restrictor may reduce the flow rate of water through the showerhead bracket at a constant rate. For example, in some embodiments, the flow restrictor may reduce the flow rate to accommodate water conservation standards/regulations. Thus, the showerhead bracket assembly may have two flow regulators: an adjustable regulator and a non-adjustable restrictor. Further, the showerhead bracket assembly may also include a filter to filter the water as it travels from the shower pipe to the showerhead.

Figure 2:
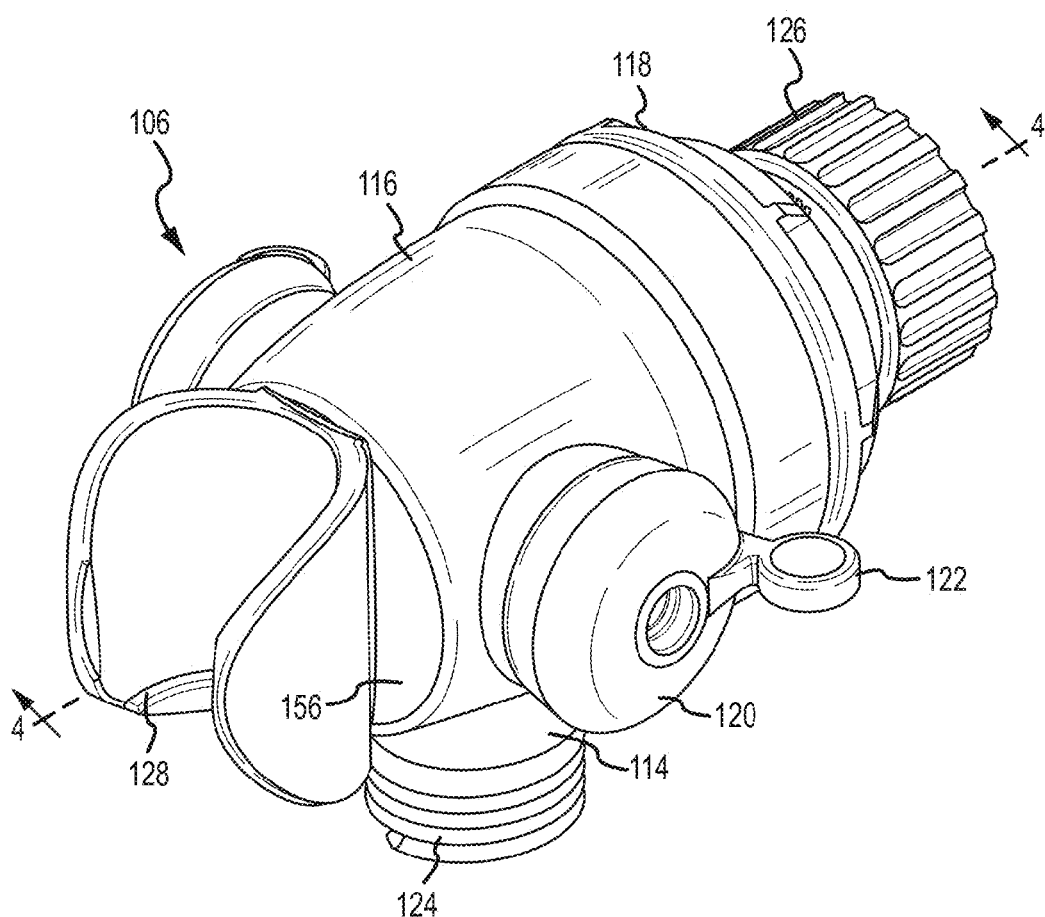
FIG. 2 is a front top isometric view of the showerhead bracket assembly removed from the handheld showerhead and the shower pipe.

FIG. 1 depicts an isometric view of a showerhead system 100. The showerhead system 100 may include a handheld showerhead 102 for connection with a hose 108 to a showerhead bracket assembly 106. The handheld showerhead 102 may have a head portion 103 with a plurality of outlet nozzles 111 and a handle portion 112 that connects to the hose 108. The handheld showerhead 102 may deliver water or other fluid from the showerhead system 100 to a user via the nozzles 111. FIG. 2 is an isometric view of the showerhead bracket assembly 106 in isolation. The showerhead bracket assembly 106 may be coupled to a shower pipe 104 extending from a wall of the shower or bath enclosure. In other embodiments, the showerhead bracket assembly 106 may be operably connected at both the inlet and outlet ports 114 to a hose 108. In these embodiments, the showerhead bracket assembly 106 may be used in addition to another showerhead bracket. Further, these embodiments may allow the bracket assembly 106 to be located at varying positions along the length of the hose 108 which may be more accessible/desired by some users.

The bracket assembly 106 may have a housing or bracket body 116 with a coupling member 118 that may be operably connected at a first end and form a cradle 110 at a second, opposite end. The coupling member 118 may be configured to extend around a pivot ball 126. A fluid outlet port 114 may extend from a bottom portion of the bracket assembly 106. The various components forming the showerhead system 100 may be made of plastic, metal, ceramic, any other suitable material, or any combination thereof.

As shown in the exemplary embodiment of FIGS. 1 and 2, the cradle 110 may generally be C-shaped. In alternative embodiments, the cradle 110 may take any other shape complementary to the handle 112 that is suitable for securely and releasably attaching the handheld showerhead 102 to the showerhead bracket 106. Generally, the cradle 110 receives the handle 112 of the handheld showerhead 102 to hold and support the handheld showerhead 102 in a fixed position at the end of the shower pipe 104 and for storage when not in use. The cradle 110 may securely retain the handheld showerhead 102 within it until the handheld showerhead 102 is selectively removed. The cradle 110 may also be formed with a step or a ledge 128 for a portion the handle 112 to bear against. Likewise, the handle 112 may also be formed with a recess or notch complementary to the ledge 128 to create a further interface between the bracket 106 and the handle 112.

The coupling member 118 may join the bracket assembly 106 to a shower pipe 104 or other water source (e.g., in alternative embodiments, hose 108). For example, the coupling member 118 may operably connect to the shower pipe 104 via a pivot ball 126, which may be operably connected to the end of the shower pipe 104 or some other component. The bracket assembly 106 may be selectively rotatable, pivotable, or otherwise movable relative to the pivot ball 126 or other connecting mechanism. Such selective movement may allow a user to control the direction that a fluid exits the showerhead system 100 through the handheld showerhead 102, when the handheld showerhead 102 is held within the cradle 110. The handheld showerhead 102 may be removable from the showerhead bracket 106 to allow a user to direct a fluid exiting the handheld showerhead 102 towards any part of a user's body.

Figure 3:
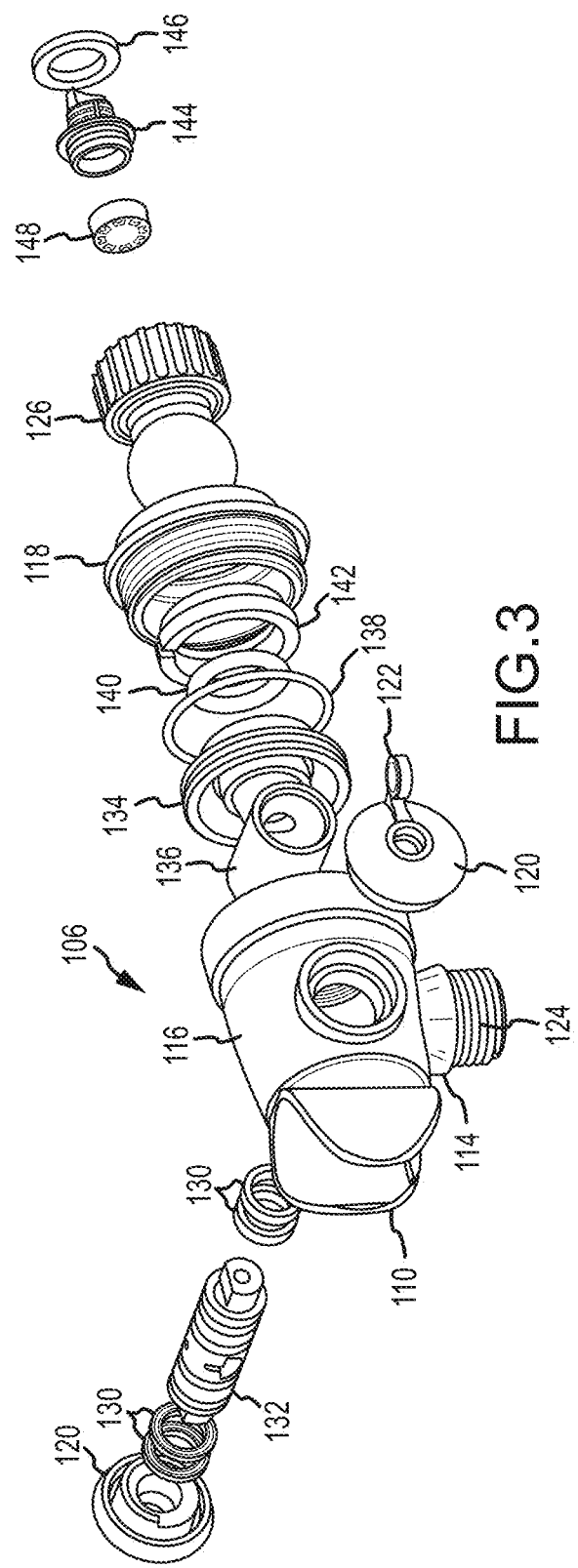
FIG. 3 is an exploded view of the showerhead bracket assembly of FIG. 2.
Figure 4:
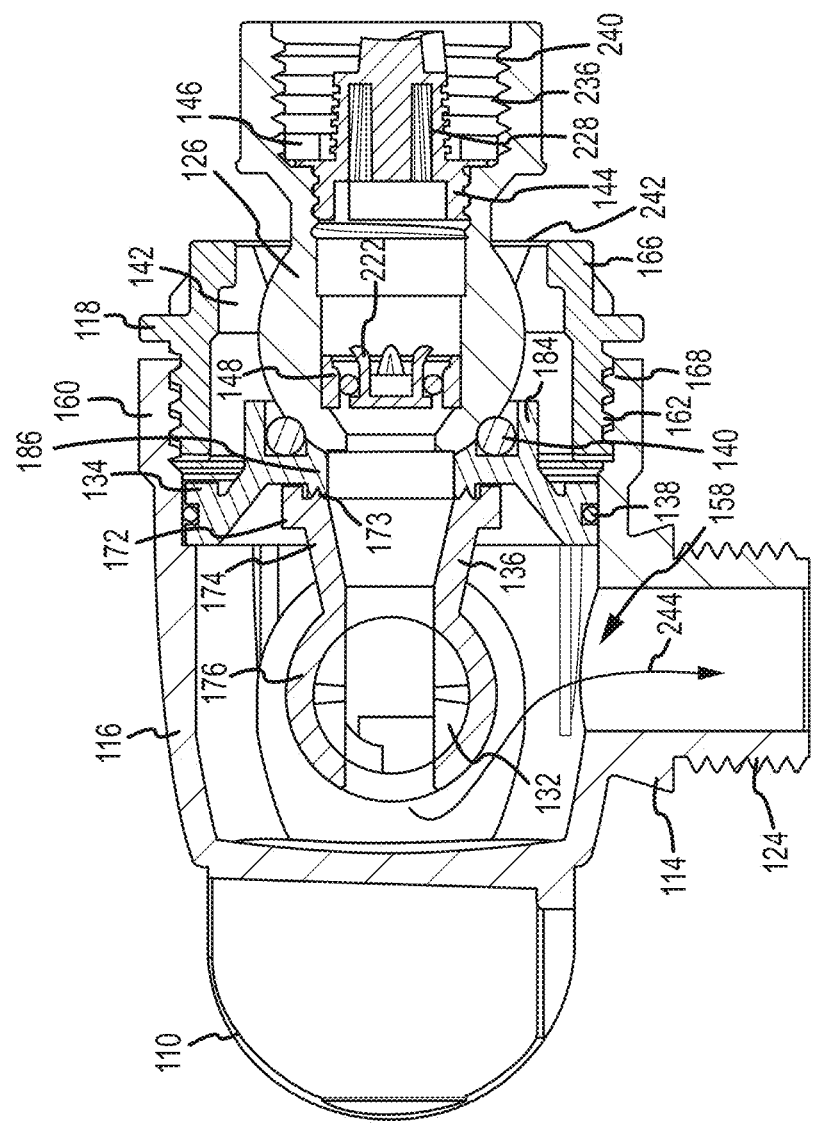
FIG. 4 is a cross-section view of the showerhead bracket assembly of FIG. 2 taken along line 4-4 in FIG. 2.
Figure 5A:
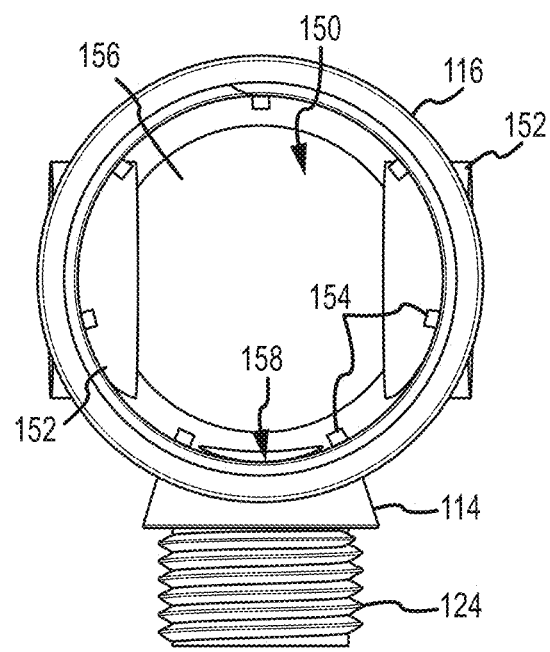
FIG. 5A is a rear elevation view of a bracket housing removed from the showerhead bracket assembly of FIG. 3.
Figure 5B:
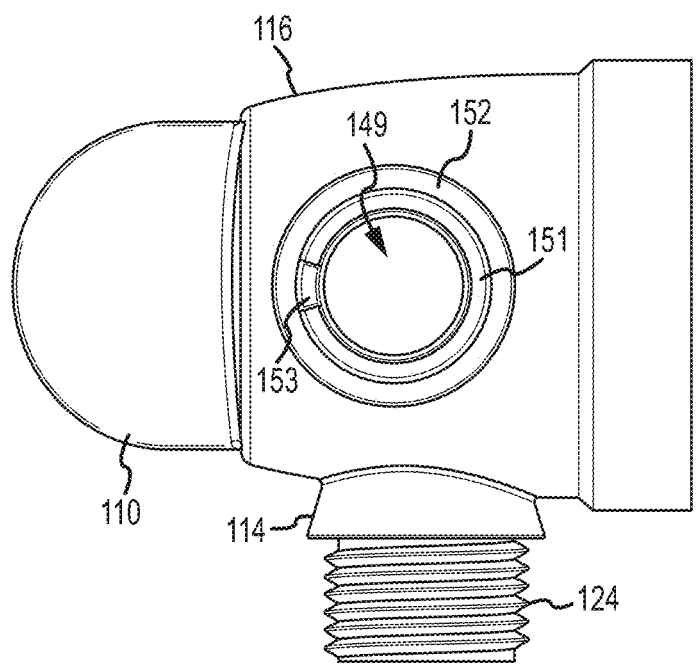
FIG. 5B is a right-side elevation of the bracket housing of FIG. 5A.

FIG. 3 is an exploded view of the bracket assembly 106, FIG. 4 is a cross-section view of the showerhead bracket assembly 106, FIG. 5A is a rear elevation view of the bracket body 116, and FIG. 5B is a right-side elevation view of the bracket body 116. The bracket body 116 may define a fluid chamber 150 in fluid communication with the handheld showerhead 102 and with the shower pipe 104. The fluid chamber 150 may be substantially open on a back end of the bracket body 116 and a front wall 156 may seal the front end, as well as support the cradle 110. The bracket body 116 may also include a controller housing 152 extending at least partially into the fluid chamber 150 and defining a controller aperture 149. A fluid outlet 158 may be defined by the bracket body 116 and extend downward from the fluid chamber 150 into and through the outlet port 114. The fluid outlet 158 may provide fluid communication between the fluid outlet port 114 and the fluid chamber 150.

In alternative embodiments, the bracket body 116 may have more than one fluid outlet 158 and corresponding outlet port 114, for example, to supply water flow to a fixed showerhead or any other suitable fluid delivery device in addition to the handheld showerhead 102.

The fluid outlet port 114 may be generally cylindrical or any other desired shape and may extend downward from a bottom portion of the bracket body 116. In still other embodiments, the outlet port 114 may extend from other surfaces of the bracket body 116. In these embodiments a conventional showerhead may be directly connected to the outlet port 114. At least a portion of the exterior surface of the fluid outlet port 114, as shown in FIGS. 2, 4, and 5 may be threaded, e.g., as with threads 124. Alternatively, an interior surface of the outlet port 114 may be threaded. Threads 124 may mate with a threaded connection on an end of the hose 108. Although threads 124 are depicted for joining the hose 108 to the fluid outlet port 114, the hose 108 and the fluid outlet port 114 may be joined by press fitting, clamping, or any other suitable connection method, or any combination thereof.

The upper, inner surface of the bracket body 116 may further include locking features 154 extending downward into the fluid cavity 150. In an exemplary embodiment, the locking features 154 may be formed as ridges running along the inner surface of the bracket body 116. For example, there may be seven locking features 154 spaced around the inner surface of the bracket body 116. However, in other embodiments there may be any number of locking features 154 spaced in substantially any configuration along the bracket body 116. Further, the locking features 154 may be one or more tabs, detents, protrusions, or the like and positioned anywhere within the bracket body 116.

As noted, the bracket body 116 may also include a controller housing 152 on either side of the bracket body 116. The controller housing 152 may be a substantially hollow cylinder and may extend partially into the fluid cavity 150 (see e.g., FIG. 5A). The controller housing 152 may define controller apertures 149 through a center portion of the controller housing 152. A portion of the valve 132 and/or controller 120 may be inserted partially into either or both of the controller apertures 149. Although there are two controller housings 152 (and thus two controller apertures 149) illustrated, there may be only a singular controller housing 152, depending on the desired number of controllers 120.

Additionally, each of the controller housing 152 members may also include a controller channel 151 and a lock tab 153 on a front face of the respective controller housing 152. The controller channel 151 may be a partially recessed ring on the front face of the controller housing 152 surrounding the controller aperture 149. The lock tab 153 may extend outward from a location on the face of the controller channel 151. The lock tab 153 may be configured to be even with a face of the controller housing 152 (i.e., the portion of the controller housing 152 not forming the controller channel 151) or may be lower or taller than the controller housing 152.

The back end of the bracket body 116 may transition into a collar 160. The collar 160 forms the back end of the bracket body 116 and may have a slightly larger diameter than other portions of the bracket body 116. The interior surface of the collar 160 may include threading 168 as shown in FIG. 4. The threading 168 may provide a mating area for the coupling member 118, such that the bracket body 116 and the coupling member 118 may be secured together.

FIGS. 1, 3, 4, and 11 illustrate the coupling member 118. The coupling member 118 is generally cylindrical and defines threading 162 about an outer surface. The collar 160 receives a threaded portion 162 of the coupling member 118 and secures the coupling member 118 via complementary threading 168 along an inner surface of the collar 160.

The coupling member 118 may also include grip ridges or tabs 164 extending away from its outer surface. The grip tabs 164 provide a gripping surface, allowing a user to more easily twist the coupling member 118 to unscrew and release the coupling member 118 from the collar 160. Additionally, in some implementations, the coupling member 118 may define a pivot ball receiving portion 166. The pivot ball receiving portion 166 may extend from the rear of the coupling member 118 and may receive and surround at least a portion of the pivot ball 126 (see e.g., FIG. 4).

Figure 6:
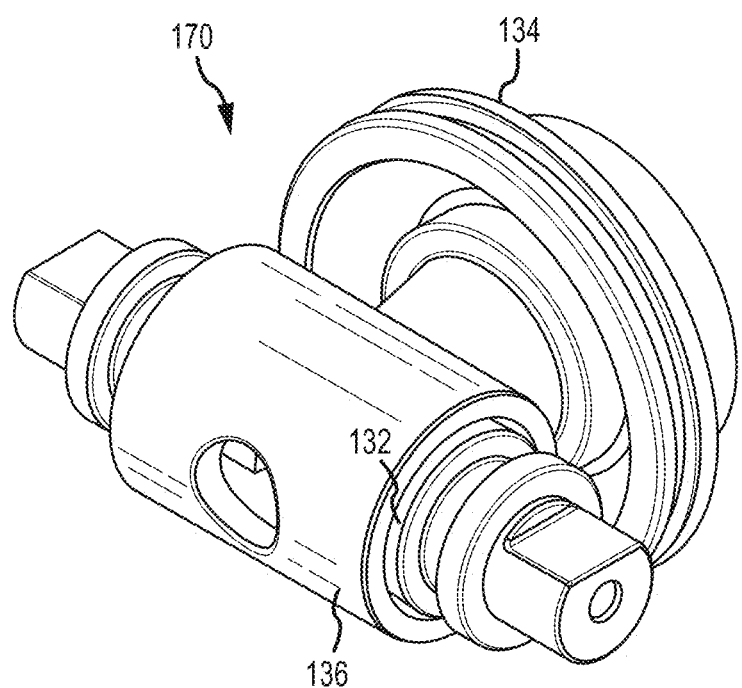
FIG. 6 is a front isometric view of a flow control assembly removed from the showerhead bracket assembly of FIG. 3.

FIG. 6 is a front isometric view of an exemplary embodiment of a flow control assembly 170. The regulator or flow control assembly 170 may be inserted into the fluid chamber 150 such that the bracket body 116 substantially surrounds a substantial portion of the flow control assembly 170. The flow control assembly 170 modifies and/or regulates the fluid flow between the showerhead bracket assembly 106 and the handheld showerhead 102. For example, the flow control assembly 170 may selectively decrease or increase the water flow from the shower bracket assembly 106 to the showerhead 102.

Figure 7:
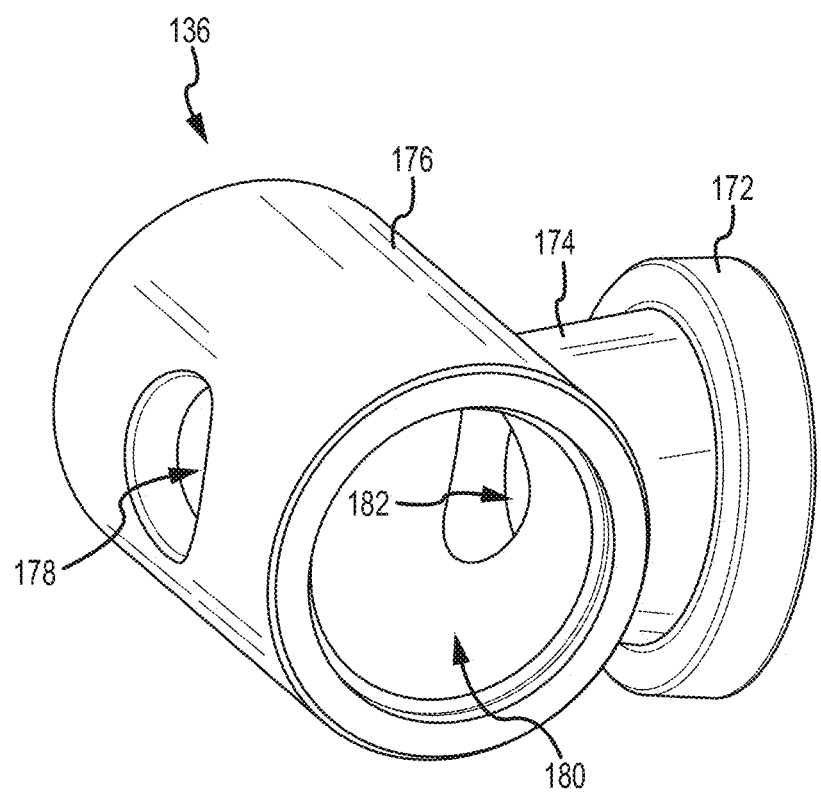
FIG. 7 is a front isometric view of a valve housing removed from the flow control assembly of FIG. 6.
Figure 8A:
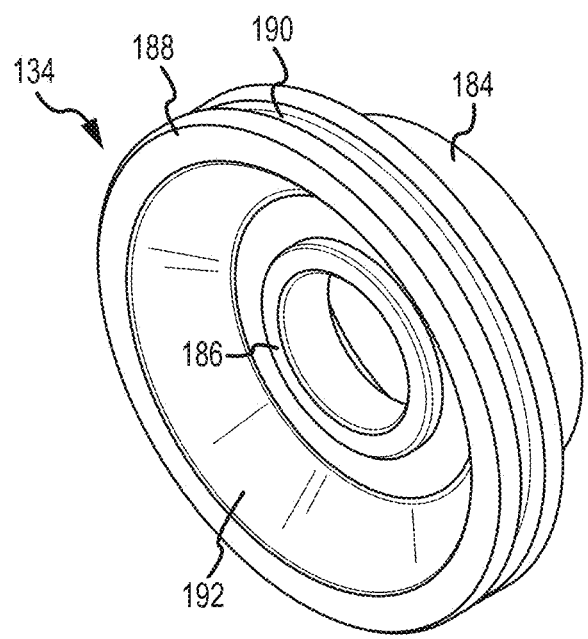
FIG. 8A is a front isometric view of valve housing base removed from the flow control assembly of FIG. 6.
Figure 8B:
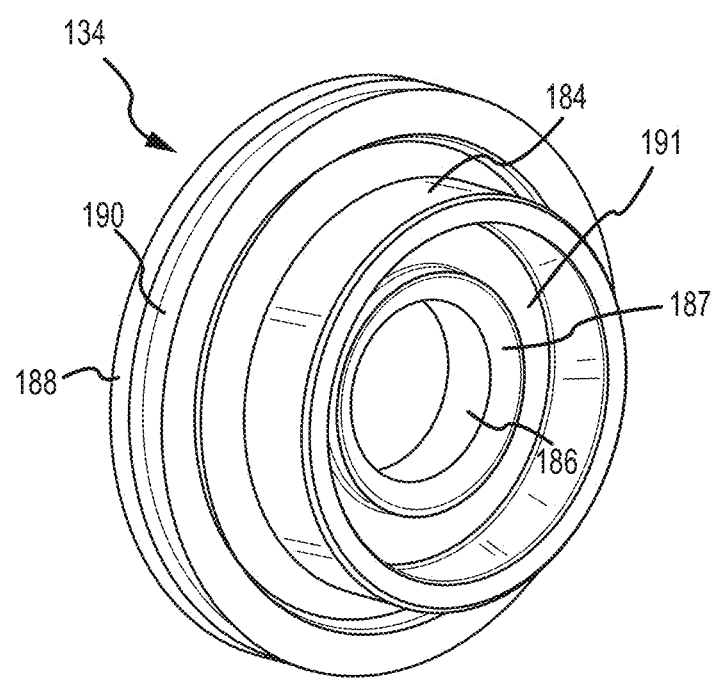
FIG. 8B is a rear isometric view of the valve housing base of FIG. 8A.

FIG. 7 is front isometric view of a valve housing 136, FIG. 8A is a front isometric view of a valve base 134, and FIG. 8B is a rear isometric view of the valve base 134. The flow control assembly 170 may include a valve 132, a valve housing 136, and a valve base 134. A rear portion of the valve housing 136 is inserted around a portion of the valve base 134. The valve 132 or stem may then be inserted into a portion of the valve housing 136. Also, the controllers 120 may be inserted onto the outer ends of the valve 132 (see e.g., FIGS. 2 and 4), securing the valve 132 within the valve housing 136.

Referring now to FIGS. 6 and 7, the valve housing 136 may include a valve retainer body 176, a valve inlet conduit 174, and a base connector ring 172. The base connector ring 172 secures the valve housing 136 to the valve base 134. As such, the base connector ring 172 may be a collar or annular ring extending outwards from the valve inlet conduit 174, and optionally may include an extension ring 173 (see FIG. 4) which may extend from a surface of the base connector ring 172. The valve inlet conduit 174 transports fluid from the inlet of the valve housing 136 to the valve retainer body 176. In an exemplary embodiment, the valve inlet conduit 174 may be hollow and be partially conically shaped. In this embodiment, the valve inlet conduit 174 may narrow toward a front portion where it intersects with the valve retainer body 176. This embodiment may help to funnel water through the inlet conduit 174 into the valve retainer body 176.

The valve retainer body 176 receives and at least partially surrounds a portion of the valve 132. The valve retainer body 176 may be shaped to correspond to the shape and/or dimensions of the valve 132. However, the valve retainer body 176 has a slightly larger diameter then the valve 132, such that the valve 132 may be able to rotate within the valve retainer body 176. In one embodiment, the valve retainer body 176 may be a hollow cylinder with a valve receiving aperture 180 on each end. As with the overall diameter of the valve retainer body 176 one or both of the valve receiving apertures 180 may have a diameter at least slightly larger then the diameter of the valve 132. This may allow the valve 132 to be inserted into the valve retainer body 176. In one embodiment, both valve receiving apertures 180 may be substantially the same dimensions and/or shape. This embodiment allows the valve 132 to be inserted into the valve retainer body 176 via either valve receiving aperture 180. However, in other embodiments, one of the valve receiving apertures 180 may be omitted and/or sized smaller than the diameter of the valve 132 (see e.g., FIG. 17). Additionally, the valve retainer body 176 may be shorter then the valve 132, such that a portion of each end of the valve 132 may extend partially past the valve retainer body 176.

The valve retainer body 176 may be aligned to be substantially perpendicular to the valve inlet conduit 174. Thus, the intersection of the valve retainer body 176 and the valve inlet conduit 176 may create a "T" shape. The valve retainer body 176 may include an outlet aperture 178 and an inlet aperture 182 on its front and rear side, respectively. The inlet aperture 182 and the outlet aperture 178 may be substantially aligned, such that when the valve 132 is in an open position water may flow substantially unrestricted between inlet aperture 182 and the outlet aperture 178. Similarly, the apertures 178, 182 may be substantially the same shape and/or dimensions. Further, the apertures 178, 182 may be aligned with the valve inlet conduit 174. For example, in one embodiment, the inlet aperture 182 may be formed at the intersection of the valve inlet conduit 174 and the valve retainer body 176 and the outlet aperture 178 may be spaced directly across from the inlet aperture 182.

Referring now to FIGS. 4, 6, 8A and 8B, the valve base 134 receives the base connector ring 172 and fluidly connects the valve housing 136 to the pivot ball 126. The valve base 134 may include an annular ring 188, a base body 192, a base ring receiving cylinder 186 and an O-ring retaining sleeve 184. The annular ring 188 surrounds the base body 192 and may be inserted so as to rest substantially along an inner surface of the bracket body 116. In some embodiments, the annular ring 188 is positioned within the bracket body 116 between the locking features 154 and the collar 160. A channel 190 may traverse along the outer surface of the annular ring 188. The channel 190 may be configured to receive a sealing material/member, such as O-ring 138.

In an exemplary embodiment, the base body 192 extends downward and inward from the inner surface of the annular ring 188 on the front side of the valve base 134 to form a frustum. The base body 192 transitions from the frustum to form a flat, annular, bottom surface 191 that supports the valve housing 136. The base ring receiving cylinder 186 extends past both sides of the annular bottom surface 191 and the base body 192. In some embodiments, the base ring receiving cylinder 186 may include a receiving groove which may extend annularly along a first surface of the cylinder 186 facing the annular ring 188.

On the front side of the valve base 134, the base ring receiving cylinder 186 (and optionally, the receiving groove) connect the base connector ring 172 to the base body 192, i.e., a portion of the base connector ring 172 fits around the base ring receiving cylinder 186 and the extension ring 173 interfaces with the receiving cylinder 186. On the back side of the valve base 134, the base ring receiving cylinder 186 extends from the annular bottom surface 193 of the base body 192 and is surrounded by a concentric sleeve 184. The combination of the concentric sleeve 184 and the base ring receiving cylinder 186 help to secure an O-ring 140 between the valve base 134 and the pivot ball 126. For example, the O-ring 140 may be inserted between the inner surface of the concentric sleeve 184 and the outer surface of the base ring receiving cylinder 186. A face surface 187 of the base ring receiving cylinder may be beveled or curved to conform to the spherical surface of the pivot ball 126 to provide a tighter seal and an interface conducive to pivotable movement between the pivot ball 126 and the rest of the bracket assembly 106.

Figure 9A:
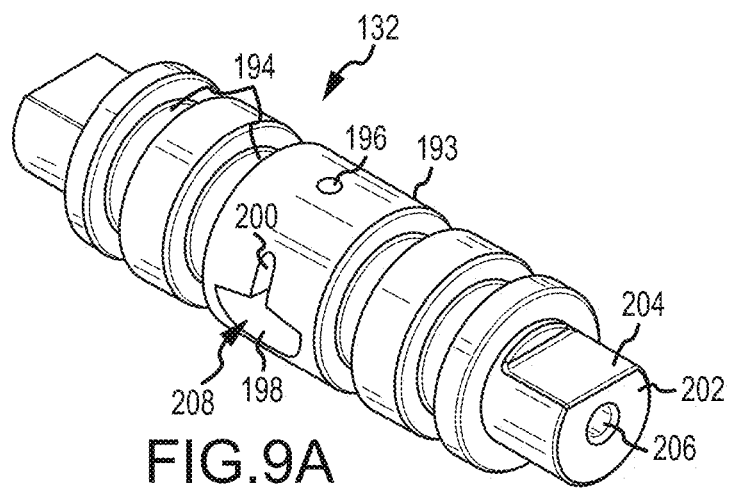
FIG. 9A is a top front isometric view of a valve removed from the flow control assembly of FIG. 6.
Figure 9B:
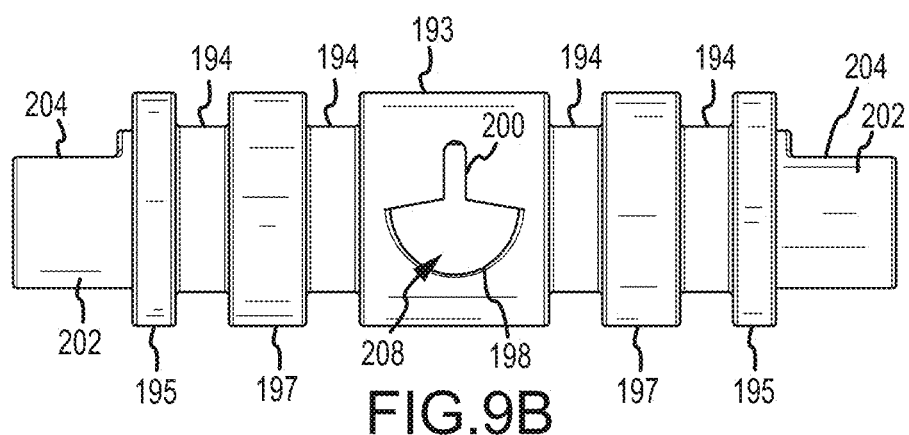
FIG. 9B is a front elevation view of the valve of FIG. 9A.
Figure 9C:
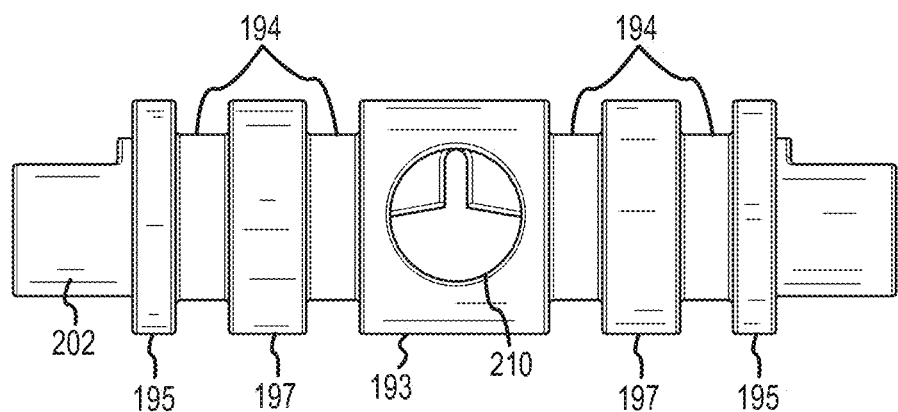
FIG. 9C is a rear elevation view of the valve of FIG. 9A.

FIG. 9A is a top isometric view of a valve 132, FIG. 9B is a front elevation view of the valve and FIG. 9C is a rear elevation view of the valve. The valve 132 or stem inserts into the valve retainer body 176 and fluidly connects/disconnects the valve retainer inlet 182 from the valve retainer outlet 178. In some embodiments, the valve 132 may not fully disconnect the valve retainer inlet 182 and outlet 178, i.e., some fluid may always be allowed to flow between the valve retainer inlet 182 and the valve retainer outlet 178.

The valve 132 may be a substantially cylindrical body having a middle portion 193 defining an inlet port 210, an exit port 208, a pressure release aperture 196, and a peg 202 that extends from either or both ends. Additionally, the valve 132 may include seal receiving channels 194 spaced around its outer surface. The middle portion 193 may be substantially hollow, whereas the rest of the valve 132 body may be substantially solid. In one embodiment, the inlet port 210 is defined by the middle portion 193 as a substantially circular aperture along the rear outer surface of the middle portion 193. The inlet port 210 fluidly connects to the valve retainer inlet 182 and the inlet port 210 may have the approximately the same dimensions and/or shape of the valve retainer inlet 182.

The exit port 208 may be aligned with the inlet port 210, however, the exit port 208 may have a different shape and/or size than the inlet port 210. This is because the exit port 208 may act as a flow modifier/regulator. For example, the exit port 208 may include a high flow exit port 198 and a low flow exit port 200. The two portions/apertures of the exit port 198, 200 may have different shapes, geometries, and/or dimensions and, thus, the exit port 208 may essentially change in shape as the different portions are aligned with the valve retainer outlet aperture 178.

The high flow exit port 198 and the low flow exit port 200 may be connected together so as to form a single aperture (the exit port 208). The high flow exit port 198 may be shaped as a half-circle, whereas the low flow exit port 200 may be a thin rectangular aperture. In an exemplary embodiment, the vertical rectangular aperture that forms the low flow exit port 200 intersects with a horizontal face of the high flow exit port 198. In this embodiment, the exit port 208 may resemble an umbrella or handheld fan shape. However, other shapes are possible, as long as the water exit areas for the high flow exit port 198 and the low flow exit port 200 are larger and smaller, respectively. Additionally, although the high flow exit port 198 and the low flow exit port 200 have been illustrated as a single aperture, the two ports 198, 200 may be formed as two separate apertures.

Referring now to FIG. 9A, the middle portion 193 of the valve 132 may also define a pressure release aperture 196. The pressure release aperture 196 may be smaller then either the inlet port 210 or the exit port 208. The pressure release aperture 196 may be positioned on a top surface of the middle portion 193 between the inlet and exit ports 210, 208.

The valve 132 body also may define the seal receiving channels 194 between outer flat ribs 195, inner flat ribs 197, and the middle portion 193. The seal receiving channels 194 may be spaced intermittently along the outer surface of the valve 132. The seal receiving channels 194 may each receive an O-ring, trickle seals, e.g., trickle seals 130, or other sealing materials (see FIG. 3). The depth and/or dimensions of the seal receiving channels 194 may be altered depending on the size/thickness of the trickle seal 130. Additionally, although four seal receiving channels 194 have been illustrated, fewer or more channels 194 may be used.

The pegs 202 may extend from the ends of the valve 132. Each peg 202 may be operably connected to a controller 120. The pegs 202 may be partially cylindrical rods having a smaller diameter than the diameter of the valve 132. Additionally, the pegs 202 may include a flat key surface 204 along a side of each of the pegs 202. In this manner, the controller 120 may fit onto the peg 202 and align/secure into place via the key surface 204. The key surface 204, which allows the controllers 120 to turn the valve 132, interfaces with a corresponding aligning feature 214 on the controller 120, as further described below. The pegs 202 may also include a peg aperture 206 on a distal end of each peg 202. The peg aperture 206 may or may not be threaded and receive a screw (not shown) that extends through the exit port 208 in the controller 120 to attach the controller 120 to the valve 132.

Figure 10:
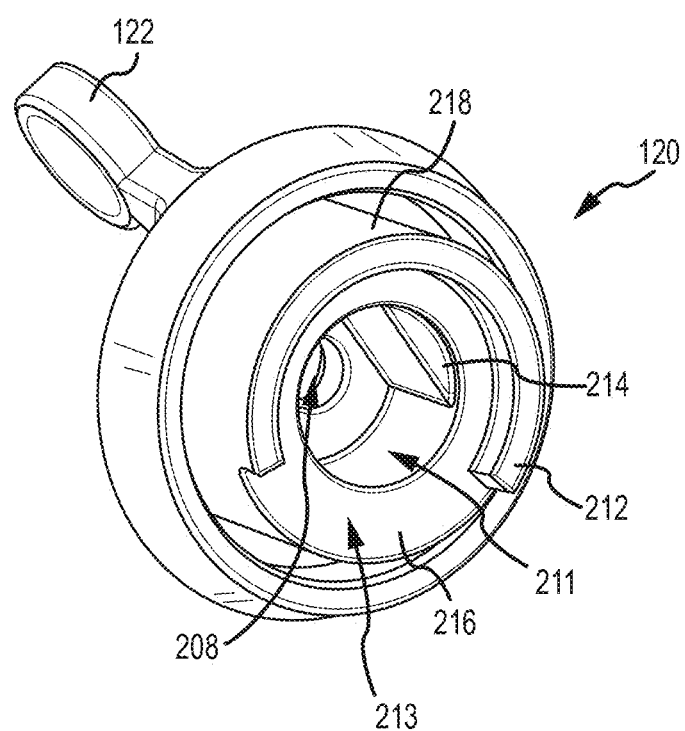
FIG. 10 is a rear isometric view of a controller removed from the showerhead bracket assembly of FIG. 3.
Figure 11:
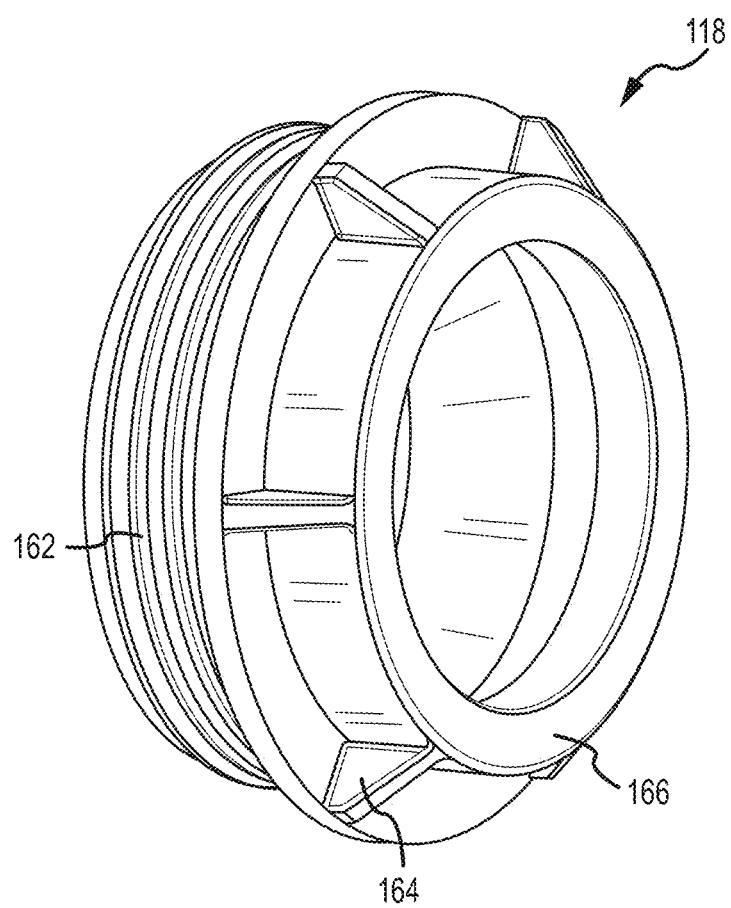
FIG. 11 is a rear isometric view of a collar removed from the showerhead bracket assembly of FIG. 3.

FIG. 10 is a rear isometric view of one of the controllers 120. The controllers 102 may be operably connected to one or both ends of the valve 132. As such, rotating the controllers 102 may cause the valve 132 to rotate. In one embodiment, the controllers 120 may be knobs. However, other control devices are possible, for example, tabs, handles, rods, buttons, or the like. In one embodiment, the controllers 120 may include various aligning, rotating, stopping, and/or locking features. For example, the controllers 120 may include an aligning feature 214 disposed within an otherwise cylindrical pocket 211 defined by an annular sleeve 218 on the back side of the controller 120. The exit port 208 opens into the pocket 211. Each pocket 211 is configured to receive the corresponding peg 202 from the valve 132. The annular sleeve 218 may define a flat annular face 216 at a partial terminus. An arcuate wall 212 may further extend above and beyond the annular face 216, thereby extending an outer wall of the annular sleeve 218 about a portion of the circumference of the annular sleeve 218. The arcuate may not be as wide as the annular face 216 as shown in FIG. 10. A gap 213 is thus defined between the ends of the arcuate wall 212 where the width of the annular face 216 is broadest defining the diameter of the pocket 211.

The features 212, 214, 218 may be shaped to be complementary to corresponding portions on the valve 132 and/or controller housing 152. For example, the pocket 211 defined by the annular sleeve 218 may have a slightly larger diameter than the peg 202. The aligning feature 214 may align with the key surface 204 of the peg 202. As the pocket 211 of the controller 120 is inserted onto the peg 202 when the valve 132 is installed within the bracket body 116, the annular sleeve 218 similarly fits within the controller housing 152 and the arcuate wall 212 may align with and rest against a front face of the controller channel 151. As can be seen in FIG. 10, the aligning feature 214 may have a substantially flat inner surface that may correspond with the flat outer surface of the key surface 204. The outer flat ribs 195 may seat within the inner diameter of the arcuate wall 212 and rest against the annular face 216. The lock tab 153 in the controller housing 152 of the bracket body 116 may be positioned in the gap 213 between the ends of the arcuate wall 212, preventing the controller 120 from freely rotating by providing positive stop interfaces in each channel.

An actuator tab 122 or finger grip may be operably connected to an outer surface of the controller 120. The actuator tab 122 may be used by a user to rotate the controller 120 and thus the valve 132. However, it should be noted that in some embodiments the actuator tab 122 may be omitted and the entire body of the controller 120 may be extended outwards or may be provided with griping features. This may allow the user to grip the outer surface of the controller 120 in order to rotate it.

Referring again to FIGS. 3 and 4, the pivot ball 126 may be inserted into the coupling member 118. The pivot ball 126 may house a flow restrictor 148 and/or a filter 144. The flow restrictor 148 and the filter 144 may be placed within a fluid flow path 242 in the pivot ball 126, between the shower pipe 104 and the outlet port 114 of the shower bracket assembly 106.

Figure 12A:
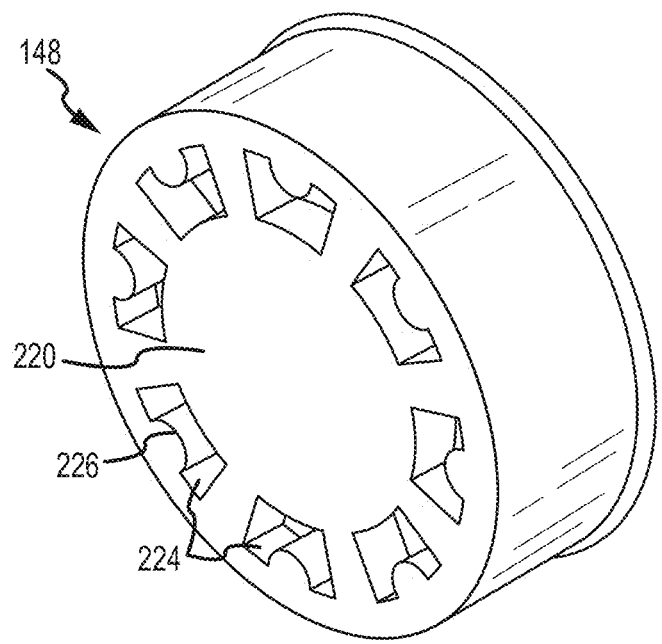
FIG. 12A is a front isometric view of a flow restrictor removed from the showerhead assembly bracket of FIG. 3.
Figure 12B:
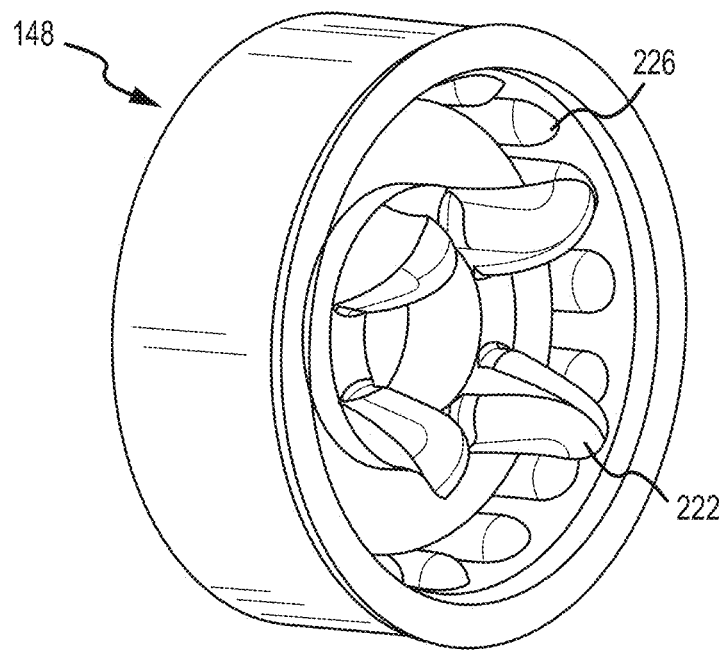
FIG. 12B is a rear isometric view of the flow regulator of FIG. 12A.

FIG. 12A illustrates a front isometric view of the flow restrictor 148 and FIG. 12B illustrates a rear elevation view of the flow restrictor 148. The flow restrictor 148 may be placed within the pivot ball 126, as can be seen in FIG. 4. The flow restrictor 148 reduces the flow of water through the showerhead bracket assembly 106. As such, the flow restrictor 148 may be substantially any device configured to reducing the flow of water. However, in one embodiment, the flow restrictor 148 is a circular body with exit apertures 224 defined intermittently along its front surface 220. Additionally, the flow restrictor 148 may also include flow barriers 226 extending partially into the apertures 224. The flow barriers 226 reduce the size of each of the aperture 224 openings. The flow restrictor 148 may also include prongs 222 extending from it back surface. The flow restrictor 148 meters a precise flow rate and may be used in order to meet regulator water conservation requirements for maximum flow rates.

Figure 13A:
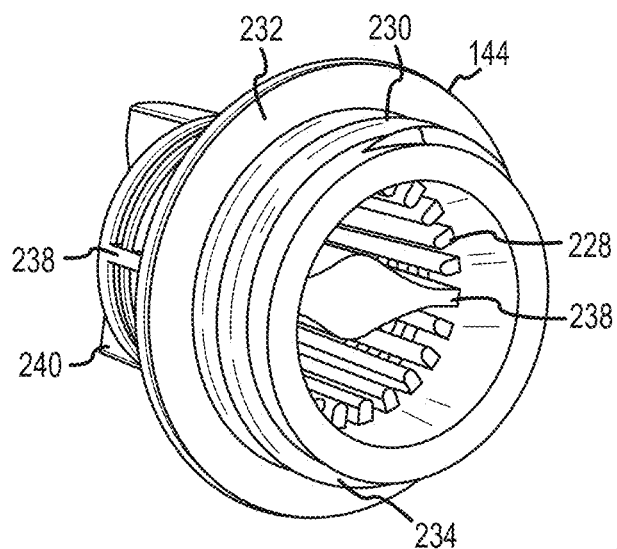
FIG. 13A is a front isometric view of a filter removed from the shower bracket assembly of FIG. 3.
Figure 13B:
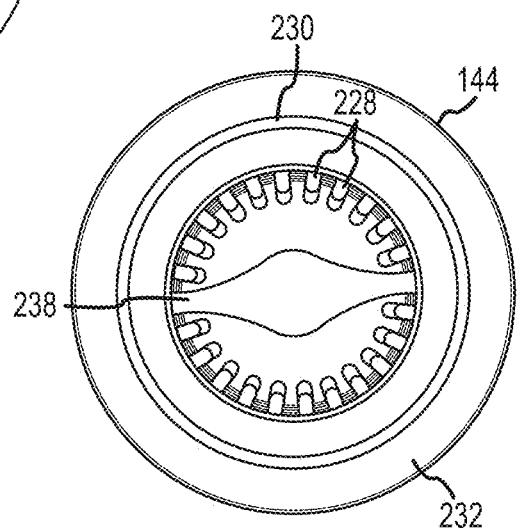
FIG. 13B is a front elevation view of the filter of FIG. 13A.
Figure 13C:
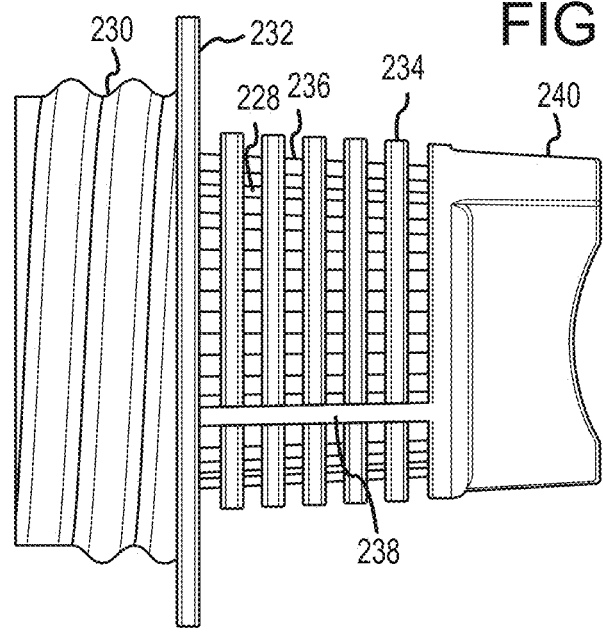
FIG. 13C is a right elevation view of the filter of FIG. 13A.

FIG. 13A illustrates a front isometric view of the filter 144, FIG. 13B illustrates a front elevation view of the filter 144 and FIG. 13C illustrates a side elevation view of the filter 144. The filter 144 filters the water from the shower pipe 104 before it reaches the flow control assembly 170. The filter 144 may include a collar 232, a threaded fitting 230 extending from a first side of the collar 232, a plurality of longitudinal grates 228 extending from a second side of the collar 232 forming a cylindrical wall, a bridge 238 extending across a diameter of a generally cylindrical cavity defined the longitudinal grates 228, a plurality of grates 234 attached tangentially to an outer surface of the longitudinal grates 228 to form entry aperture 236, and a grip 240 capping an end of the longitudinal grates 228 opposite the collar. The filter 144 may be operably connected within the pivot ball 126 via the threaded fitting 230 on a first end of the filter 144. The threaded fitting 230 may be complementary with threading (see FIG. 4) within the pivot ball 126. The grip 240 provides a surface for a user to grasp the filter 144 in order to thread/unthread the filter 144 from the pivot ball 126.

The collar 232 extends around the filter 144 and may be used to help support a sealing material such as an O-ring 146 as shown in FIG. 4. The entry apertures 236 defined between the longitudinal grates 228 and the circumferential grates 234 filter out large particles and fluidly connect water from the shower pipe 104 with the cavity within the filter 144. The inner portion of the filter 144 includes filtering tentacles 228 and a bridge 238. The bridge 238 may extend from an inner surface (not shown) of the grip 240 to provide added structural support to the grated section of the filter 144. It should be noted that any type of filter may be used in addition to or in replace of the filter 144. For example, filtering material such as charcoal or the like may be placed within the filter 144 or in replace of the filter 144.

It should be noted that although the flow restrictor 148 and the filter 144 have been illustrated as being operably connected to the pivot ball 126 other embodiments are envisioned. Thus, the filter 144 and/or the flow restrictor 148 may be placed/positioned within the bracket body 116, as well as in other locations. Further, the filter 144 and/or the flow restrictor 148 may be omitted in other embodiments.

The showerhead bracket assembly 106 may also include a variety of sealing mechanisms, such as O-rings and trickle seals. For example, the showerhead bracket assembly 106 may include trickle seals 130, 146, O-rings, 138, 140, and split ring 142. These sealing mechanisms 130, 138, 140, 146, and 142 may be used to prevent water from leaking around and between particular elements. As such, each sealing mechanism 130, 138, 140, 146, and 142 may be individually customized to fit around the particular element. Further, the sealing mechanisms/material 130, 138, 140, 146 and 142 may take substantially any form and there may be any number desired in order to accomplish the particular seal desired by the user.

In operation, water from the shower pipe 104 enters into the shower bracket assembly 106 via the rear portion of the pivot ball 126. As the water enters into the pivot ball 126, it is forced into the entry apertures 236 within the filter 144 as the filter collar 232 and the trickle seal 146 seal against the shower pipe 104. As water enters the entry apertures 236, large particles and other matter may be removed by the grates 228, 234. Water then exits the filter 144 and enters into a pivot ball fluid passageway 242. The pivot ball fluid passageway 242 fluidly connects the filter 144 and the flow restrictor 148. The water is then forced into the restrictor apertures 224 and the water flow rate is reduced. The water exits the flow restrictor 148 and enters the valve inlet conduit 174 via the base receiving cylinder 186 in the valve base 134.

The valve inlet conduit 174 directs the water to the valve housing inlet aperture 182. The valve inlet port 210 may be at least partially aligned with the valve housing inlet aperture 182 and the water then enters the middle portion 193 of the valve 132. The alignment of the exit port 208 with the valve housing outlet aperture 178 controls the rate the water exits the valve 132. The alignment of the outlet aperture 178 depends on the position of the valve 132 within the valve retainer body 176. The valve 132 position may be adjusted/altered by a user via the controllers 120. Thus, by using one or both of the controllers 120, the user may adjust flow rate exiting the valve 132.

For example, if the valve 132 is rotated to a first position, the low flow rate port 200 may be aligned with the valve housing outlet aperture 178. In the first position, the other portions of the valve exit port 208 (i.e., the high flow rate port 198) may be aligned with the inner surface of the valve retainer body 176, and therefore be substantially blocked. Thus, the only exit that may be available for the water is the low flow rate port 200. Because of the comparatively small size, the low flow rate port 200 reduces the flow rate of the water exiting the valve 132. If, on the other hand, the valve 132 is rotated so that the high flow rate port 198 is aligned with the valve housing outlet aperture 178, the flow rate may be only slightly reduced (if at all). This is because the high flow rate port 198 may be substantially the same dimensions as the valve housing inlet aperture 182. Further, the valve 132 may be rotated to include combinations of both the low flow rate port 200 and the high flow rate port 198, such that flow rates between the minimum (i.e., only the low flow rate port 200 open) and the maximum (i.e., the only the high flow rate port 198) may be obtained.

Furthermore, in instances where the flow rate may be substantially restricted, water may exit the valve 132 via the pressure release aperture 196. This may help to prevent pressure buildup in the showerhead bracket assembly 106, thus helping to prevent damage to any components.

After the water exits the valve housing outlet aperture 178, the water enters into a bracket fluid outlet path 244. The fluid outlet path 244 is defined by the bracket body 116 and the fluid outlet 158 opening to the outlet port 114. Once the water travels through the outlet port 114, it enters the hose 108. From the hose 108, the water may enter the showerhead 102 and exit the nozzles 111 onto a user. However, if the showerhead bracket assembly 106 is connected to a conventional showerhead, then the hose 108 may be omitted and the water may flow directly from the outlet port 114 to a connected showerhead.

FIGS. 14A-14D illustrate additional exemplary embodiments of a flow control assembly 370. In these embodiments, there may only be a single controller 320, and, as can be seen from FIGS. 14A-14D the controller 320 may be placed at practically any location on the showerhead bracket assembly 106. FIG. 14A is a front isometric view of a second embodiment of a shower bracket assembly 306, with the controller 320 located on the top surface of the showerhead bracket body 316. FIG. 14B is a front isometric view of a third embodiment of a showerhead bracket assembly 306 with the controller 320 located on an oblique surface of the shower bracket body 316. FIG. 14C is a front isometric view of a fourth embodiment of a showerhead bracket assembly 306 with the controller 320 located on a left side of the bracket body 316. FIG. 14D is a front isometric view of a fifth embodiment of a showerhead bracket assembly 306 with the controller 320 located on a right side of the showerhead bracket body 316. Each of these embodiments may have substantially the same components, but the flow control assembly 370 may be angled or otherwise altered in order to accommodate the location position of the controller 320. Additionally, the bracket housing 316 may also be slightly altered in order to accommodate the particular position of the controller 320, e.g., the location of the controller housing 152 may be moved according to the position of the controller 320.

Figure 16:
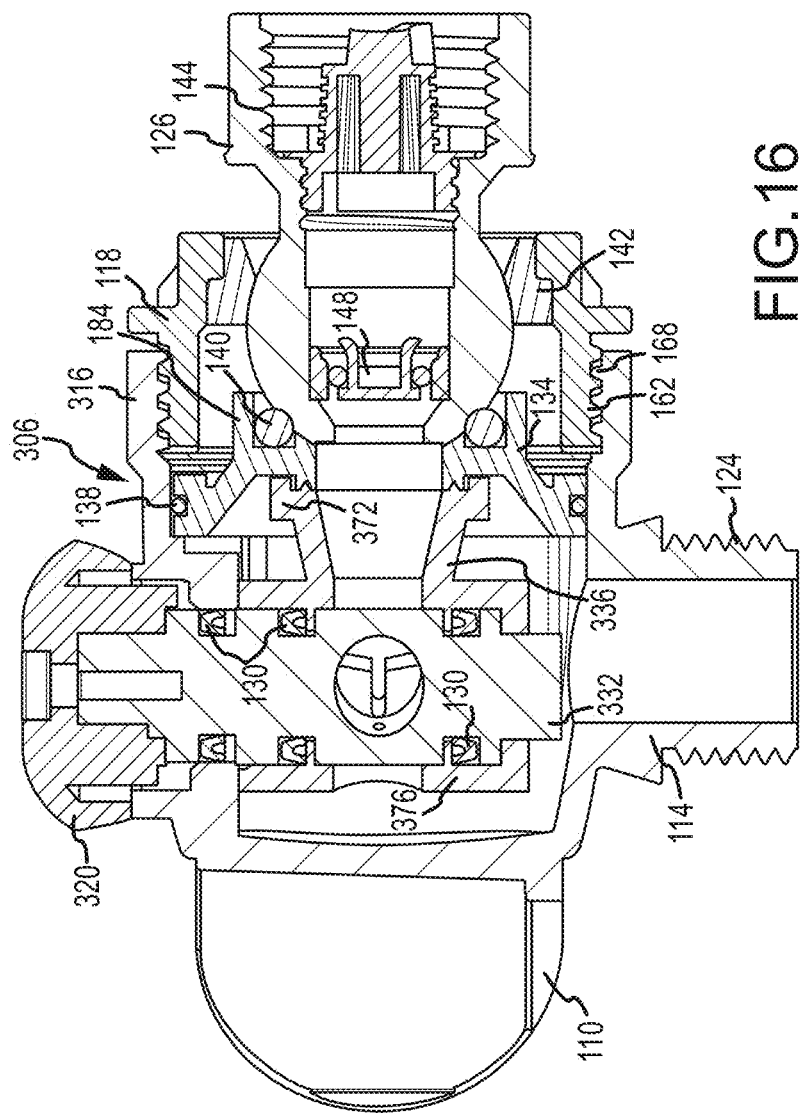
FIG. 16 is a cross-section view of the showerhead bracket of FIG. 14A taken along line 16-16 in FIG. 14A.

FIG. 15 is an exploded view of the showerhead bracket illustrated in FIG. 14A and FIG. 16 is a cross-section view of the showerhead bracket assembly illustrated in FIG. 14A taken along line 16-16 in FIG. 14A. The showerhead bracket assembly 306 may be substantially the same as the showerhead bracket assembly 106 illustrated in FIG. 1. However, the showerhead bracket assembly 306 may include alternate embodiments for a flow control assembly 370, a controller 320, and a bracket body 316. These alternative embodiments may be implemented within either showerhead bracket assembly 106, 306. However, in these embodiments, the flow control assembly 370 may be operated via a single controller 320.

As shown in FIG. 15, the bracket body 316 may be substantially the same as the bracket body 116 illustrated in FIGS. 5A and 5B. However, the bracket body 316 may include only a single controller housing 152 and thus only one controller aperture 149 to interface with a single controller 320.

Figure 17:
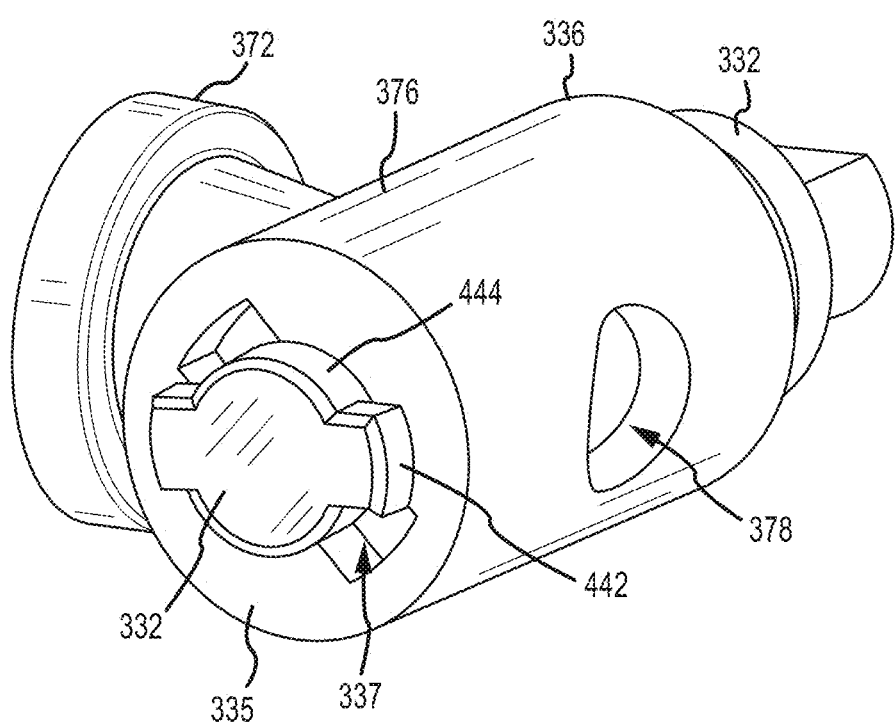
FIG. 17 is a front left isometric view of a flow control assembly removed from the showerhead bracket assembly of FIG. 14A.
Figure 18A:
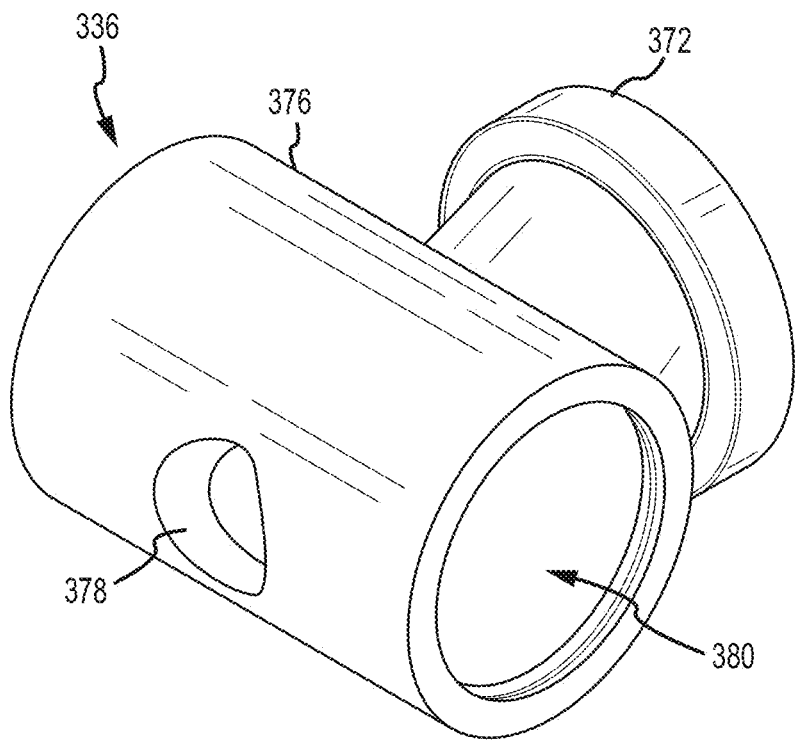
FIG. 18A is a top isometric view of a valve housing removed from the flow control assembly of FIG. 17.
Figure 18B:
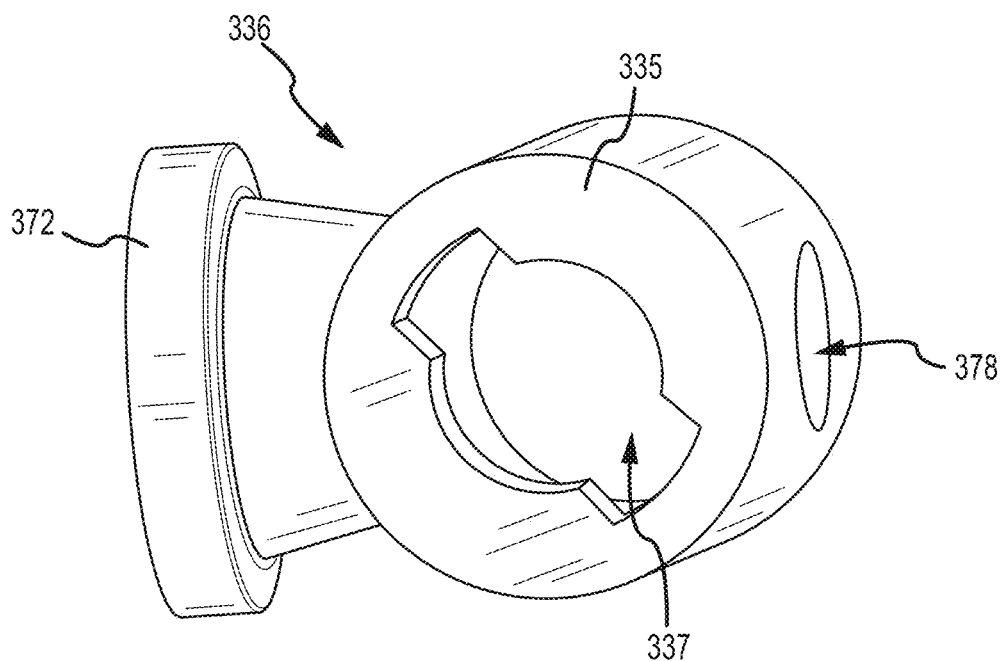
FIG. 18B is a left isometric view of the valve housing of FIG. 18A.

FIG. 17 is a side isometric view illustrating a valve 332 inserted into a valve housing 336 of the flow control assembly 370. FIG. 18A is a side isometric view of the valve housing 336 and FIG. 18B is a bottom plan view of the valve housing 336. The valve housing 336 may be similar to the valve housing 136 illustrated in FIG. 7. For example, the valve housing 336 may include a valve retaining body 376, a base receiving ring 372, as well as a valve housing inlet (not shown) and a valve housing outlet 378. However, in this embodiment the valve housing 336 may include a partially solid end. One end of the valve housing 336 may be substantially open and form a valve receiving aperture 380. The other end of the valve housing 336 may include a locking face 335 or solid end.

The locking face 335 may define a locking aperture 337 that may be configured to receive a portion of the valve 332, but only when the valve 332 is in a particular position. The locking face 335 in conjunction with the locking aperture 337 may help to secure the valve 332 within the valve housing 336. The locking face 335 extends downward from the end of the valve retaining body 376 and forms an end face for the valve retaining body 376. The locking aperture 337 may then be defined by the locking face 335 and may include a circular center aperture with two tabs or rectangular apertures extending from opposite sides of the circular center aperture.

Figure 19A:
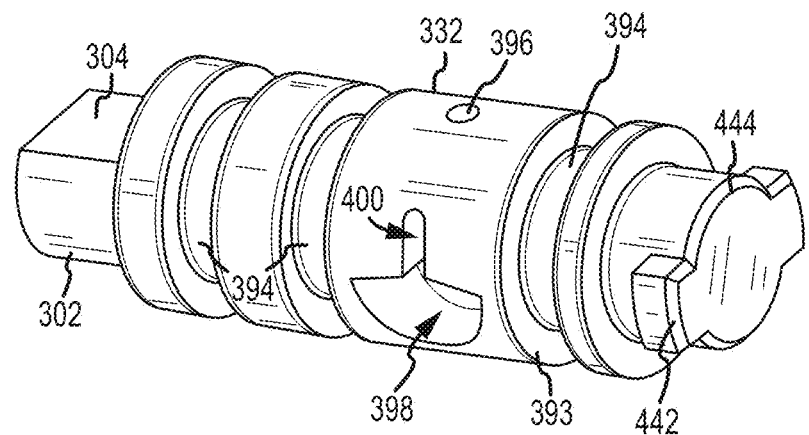
FIG. 19A is a top isometric view of a valve removed from the flow control assembly FIG. 17.
Figure 19B:
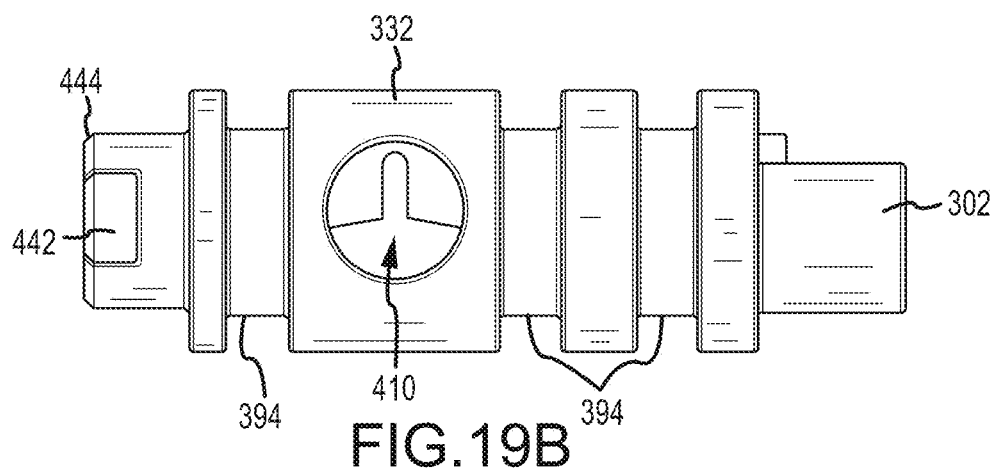
FIG. 19B is a rear elevation view of the valve of FIG. 19A.
Figure 19C:
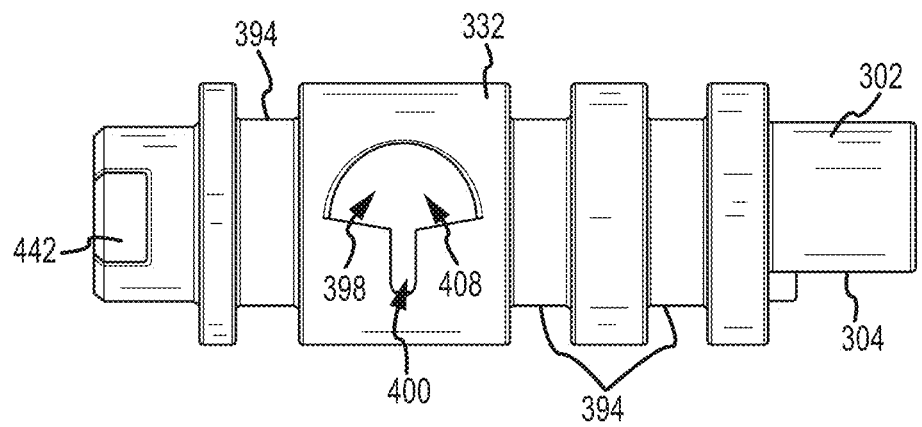
FIG. 19C is a front elevation view of the valve of FIG. 19A.

FIG. 19A is an isometric view of the valve 332, FIG. 19B is a rear side elevation view of the valve 332, and FIG. 19C is a front side elevation view of the valve 332. The valve 332 may be substantially similar to the valve 132 illustrated in FIGS. 9A-9C. For example, the valve 332 may include an inlet port 410, an exit port 408, a pressure release aperture 396 receiving channels 394, a middle portion 393, and two pegs 302, 444. The exit port 408 may be formed with a high flow exit port 398 and a low flow exit port 400. However, while the first peg 302 may be substantially the same as previous valve 132 embodiment and include a flat key surface 304, the second peg 444 may be different. For example, although the second peg or locking peg 444 may extend from the body of the valve 332 and support a pair of tabs or wings 442 extending laterally therefrom. The wings 442 may be used to secure the valve 332 into position within the valve housing 336.

Referring now to FIG. 17, the wings 442 extending from the locking peg 444 may be complementary to the tabs or rectangular cutouts or apertures of the locking aperture 337. Similarly, the locking peg 444 may be complementary to the circular portion of the locking aperture 337. Thus, when properly aligned, the locking peg 444 and wings 442 may be inserted through the locking aperture 337 on the locking face 335. Further, if the valve 332 is rotated after insertion (as shown in FIG. 17), the valve 332 may be substantially prevented from being removed from the valve housing 336. It should be noted that when the controller 320 is installed on the valve 132 and inserted into the controller housing 152, the locking tab 153 may prevent the controller 320 from rotating the valve 332 so as to re-align the wings 442 of the locking peg 444 with the tabs of locking aperture 337. Thus, after the valve 332 is inserted into the valve housing 336, the valve 332 may be substantially secured into the locking aperture 337.

In operation, the embodiments illustrated in FIGS. 14A-14D may be substantially the same as the showerhead bracket assembly 106 illustrated in FIGS. 1 and 2. Except, that in these embodiments, only the one controller 320 may be used to vary the flow rate exiting the bracket body 316.

Figure 20:
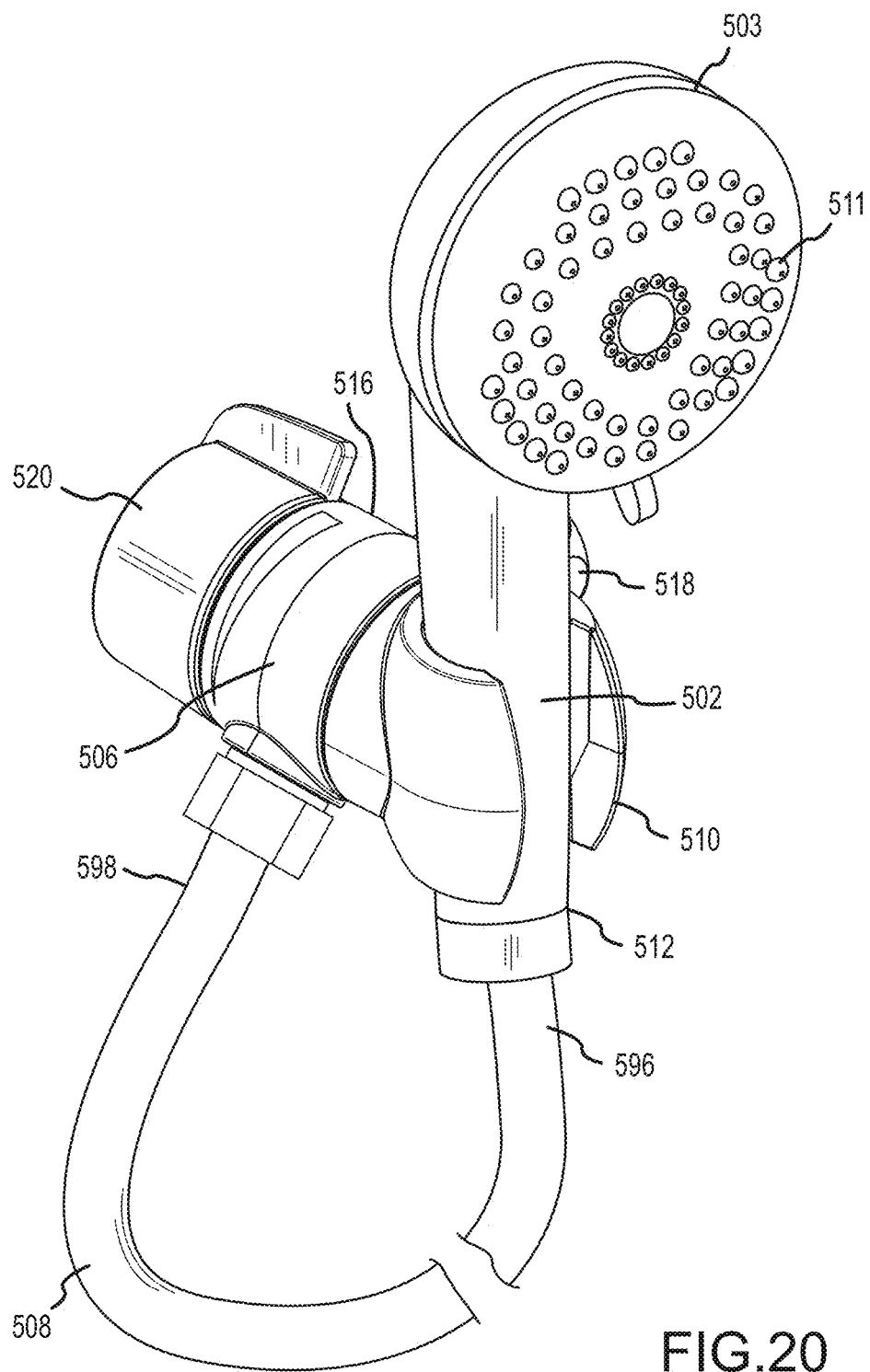
FIG. 20 is a front, right isometric view of another embodiment of a showerhead bracket assembly attaching a showerhead to a shower pipe.
Figure 21:
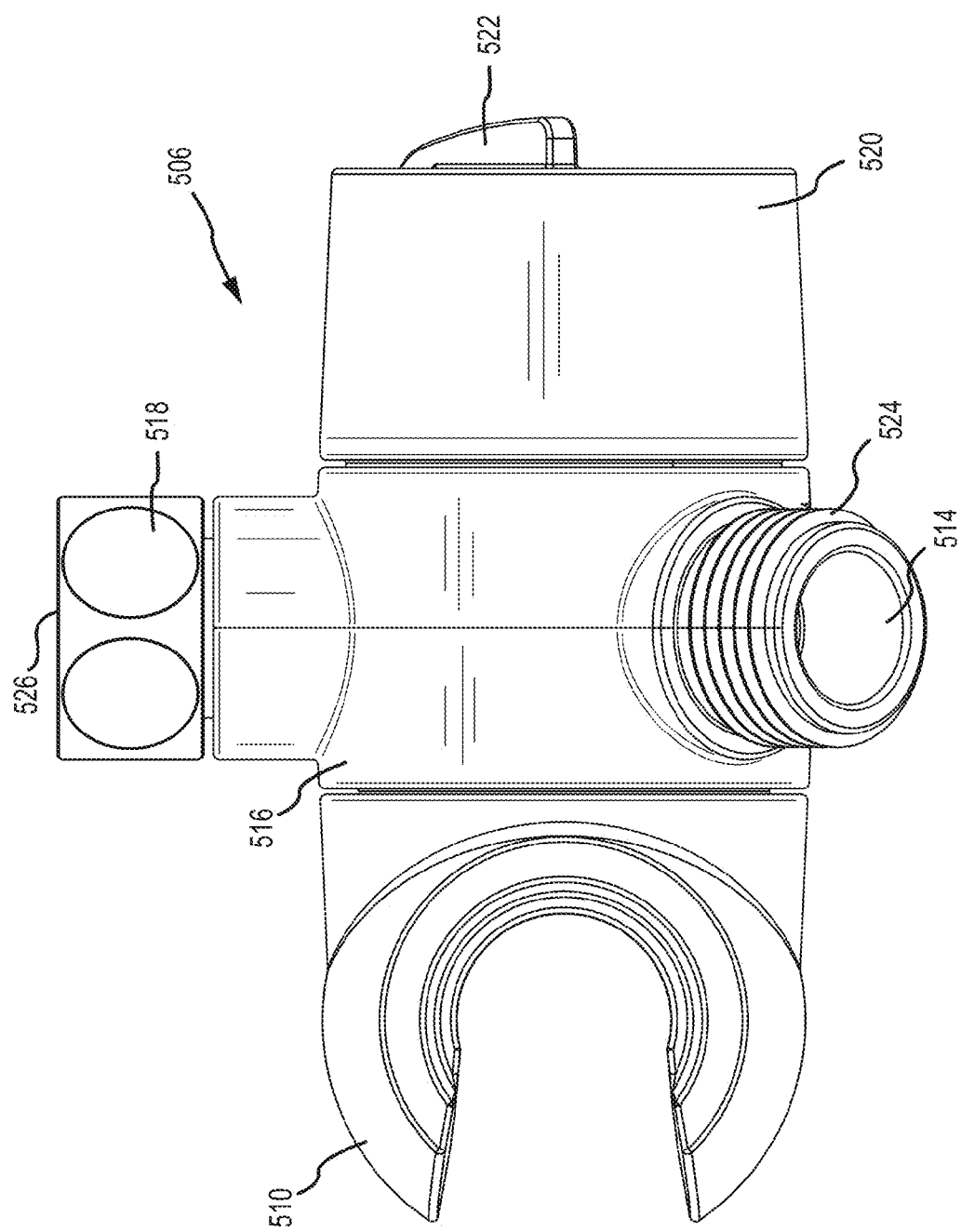
FIG. 21 is a bottom plan view of the showerhead bracket assembly of FIG. 20.
Figure 22:
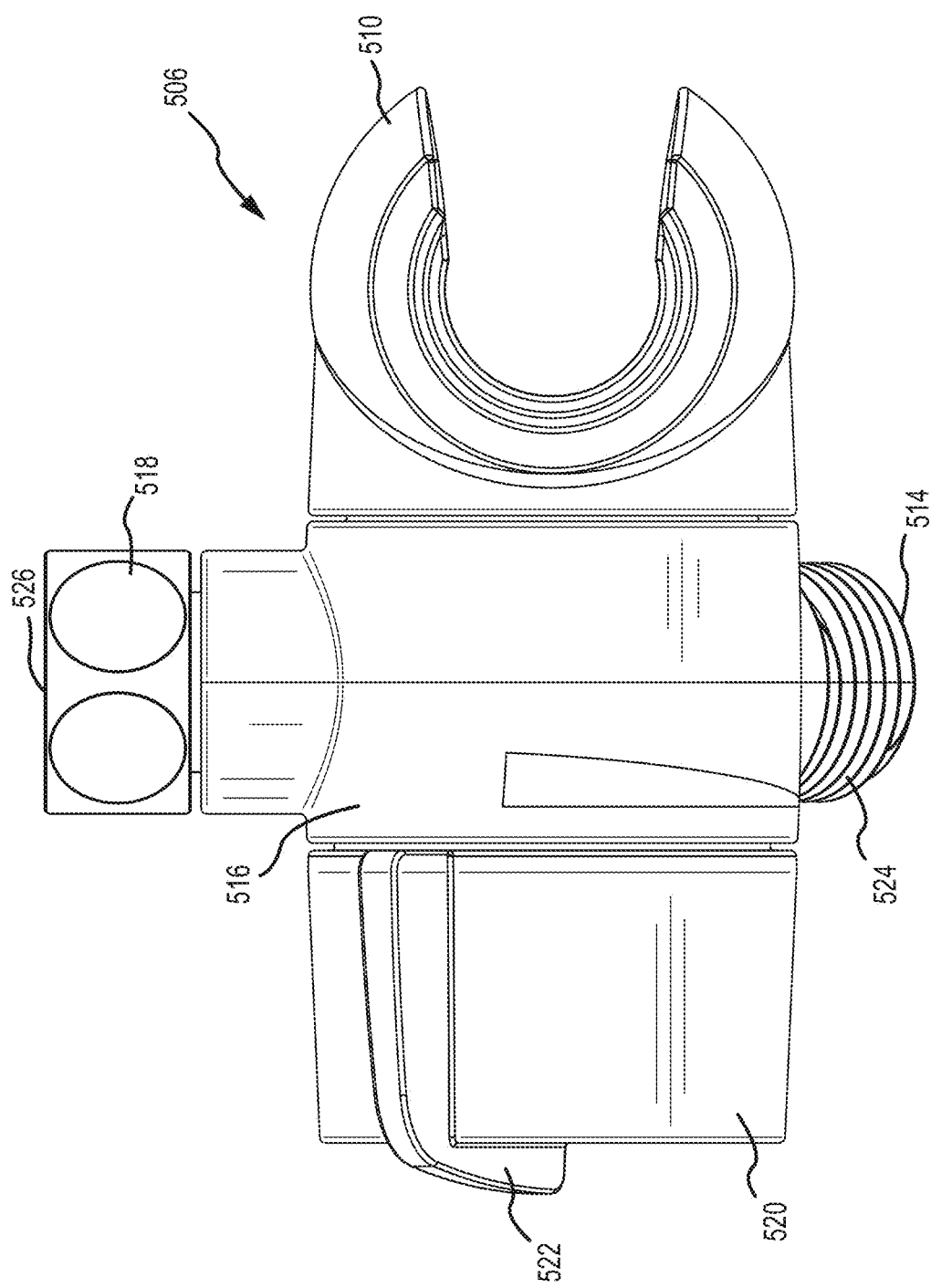
FIG. 22 is a top plan view of the showerhead bracket assembly of FIG. 20.

FIG. 20 depicts an isometric view of a detachable showerhead connected to another embodiment of a showerhead bracket assembly. The detachable showerhead may be formed of a handheld showerhead 502 connected to a hose 508 that is, in turn, connected to a showerhead bracket assembly 506. Similar to other embodiments, the handheld showerhead 502 may have a head portion 503 with a plurality of outlet nozzles 511 configured to deliver water or other fluid from the detachable showerhead to a user and a handle portion 512 that is connected to the outlet end 596 of the hose 508. The inlet end 598 of the hose 508 may be connected to the showerhead bracket assembly 506. The showerhead bracket assembly 506 may be joined to a shower pipe or other water source via a coupling member 518. In some embodiments, the coupling member 518 may be a hardware fastener, such as a swivel nut with a threaded hole. Other embodiments may utilize other types of fasteners, as appropriate.

Figure 25:
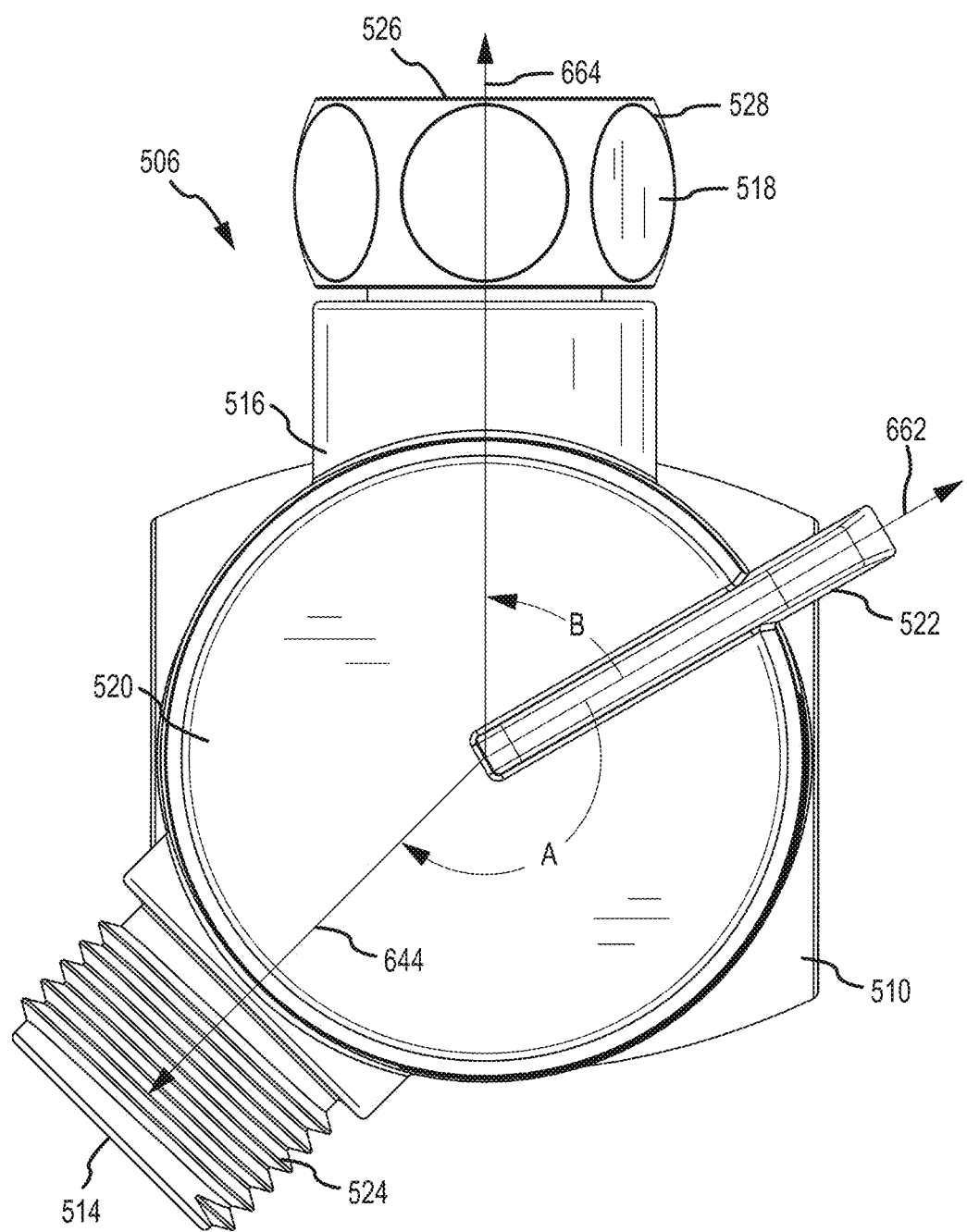
FIG. 25 is a left side elevation view of the showerhead bracket assembly of FIG. 20.
Figure 26:
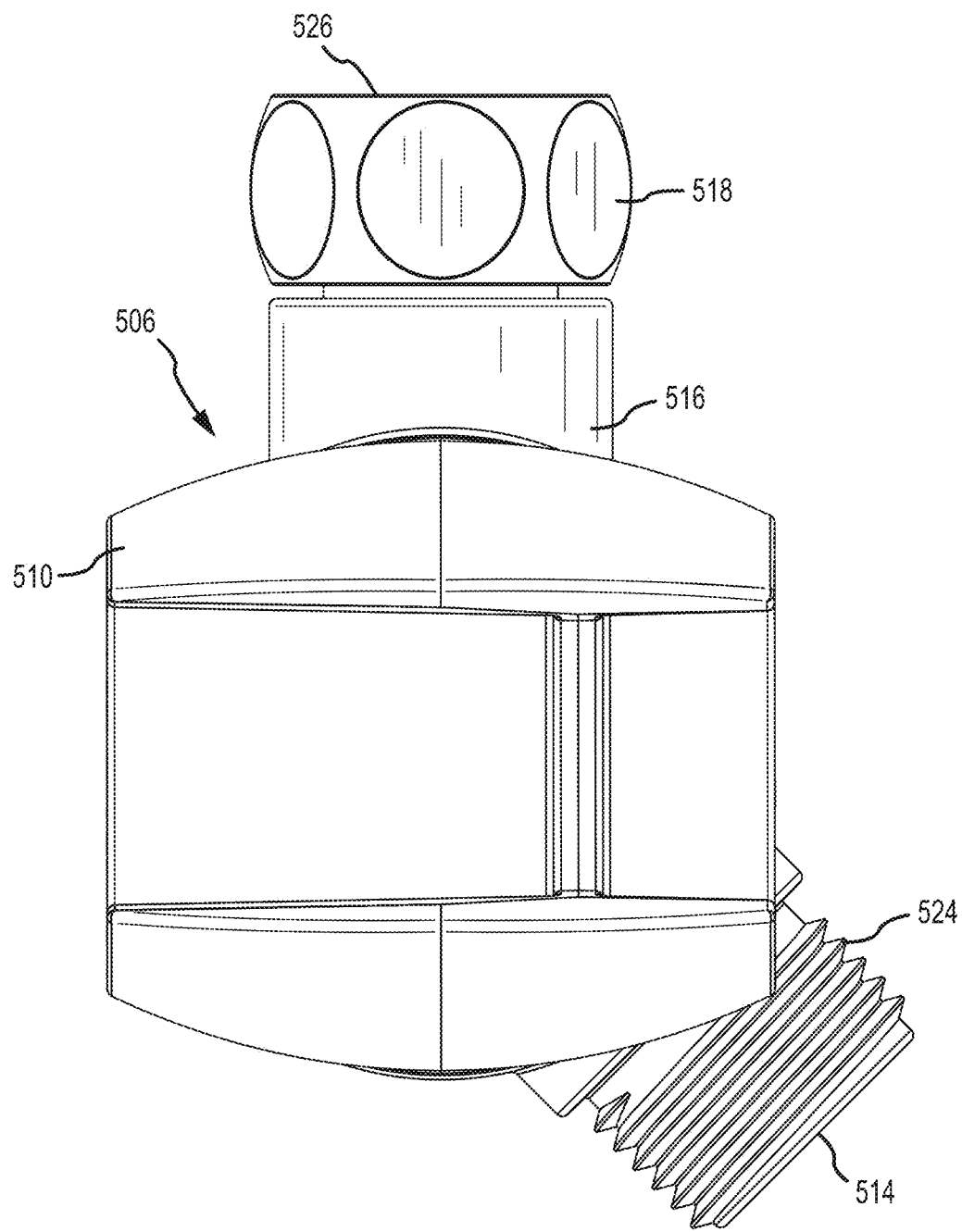
FIG. 26 is a right side view of the showerhead bracket assembly of FIG. 20.

FIGS. 21-26 illustrate various views of the showerhead bracket assembly 506, when detached from the detachable showerhead and the shower pipe. As is shown, the showerhead bracket assembly 506 may include a bracket body or housing 516 that defines a fluid inlet 526 through which water is received by the bracket body 516 and a fluid outlet 514 through which water is dispelled from the bracket body 516. As previously discussed, the fluid inlet 526 of the bracket body 516 may be fluidly coupled to the shower pipe via the coupling member 518. The fluid outlet 514 of the bracket body may be provided with a threaded outlet 524 that allows for coupling the bracket body 516 to the hose 508 of the detachable showerhead. The bracket assembly 506 may further include a flow control knob 520 that can be rotated by the user to adjust the flow rate of fluid flowing through the bracket body 516. As best shown in FIG. 25, the control knob 520 may include a lever 522 that can be engaged by the user to rotate the knob 520 in both clockwise and counter-clockwise directions. In other embodiments, the bracket assembly 506 may have a control knob 520 that does not define a lever 522, but which may otherwise allow for rotation of the knob 520 relative to the bracket body 516.

The range of motion of the knob 520 may be observed by the position of the lever 522 with respect to the bracket body 516. For example, the lever 522 may define an angle relative to the threaded outlet 524 of the bracket body 516 and the coupling member 518 at the fluid inlet 526. In one particular embodiment, the direction of extension of the lever 662 and the direction of extension of the threaded outlet 644 may form an obtuse angle A that is less than 180 degrees. Additionally, the direction of extension of the lever 662 and the direction of extension of the coupling member of the fluid outlet 664 may form an acute angle B that is between 0 and 90 degrees. In further embodiments, the direction of extension of the lever 662 and the direction of extension of the threaded outlet 644 may form an acute or a right angle, or may be co-linear. Similarly, the direction of extension 662 of the lever and the direction of extension 664 of the coupling member of the fluid outlet may form an obtuse or a right angle, or may be co-linear. In this particular embodiment, the lever 522 may be pulled downwardly, in a clockwise direction, to reduce the flow rate of fluid dispensed through the fluid outlet 514, and upwardly, in a counter-clockwise direction, to increase the flow rate of fluid dispensed through the fluid outlet 514. In other embodiments, the lever 522 may be pulled in a counter-clockwise direction to decrease the flow rate of fluid dispensed through the fluid outlet 514, and in a clockwise direction to increase the flow rate of the dispensed fluid.

The bracket body 516 may also be joined to a cradle 510 that is configured to hold the shower head 502. As in prior embodiments, the cradle 510 may be generally C-shaped, although other embodiments may utilize cradles 510 of other shapes that are complementary to the showerhead handle 512 and suitable for securely and releasably attaching the handheld showerhead 502 to the showerhead bracket 506. As will be further discussed below, the cradle 510 may be rotated in either clockwise or counter-clockwise directions relative to its rotational axis to allow for adjusting the position of the handheld showerhead 502. In some embodiments, the cradle 510 may be rotated a full 360 degrees in either direction, with no absolute stops to prevent rotation of the cradle 510.

Figure 27:
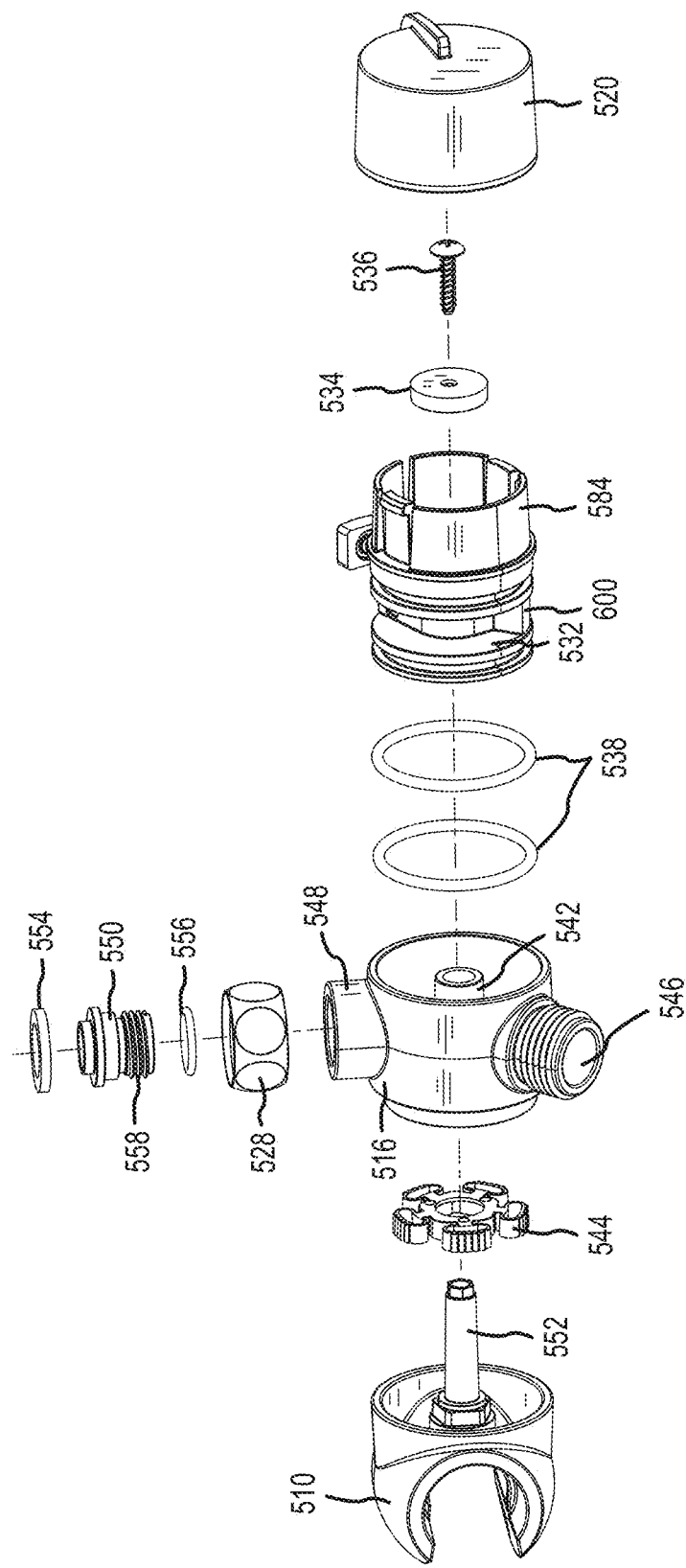
FIG. 27 is an exploded view of the showerhead bracket assembly of FIG. 20.

FIG. 27 is an exploded view of the bracket assembly 506. As will be further described below, the flow rate of fluid flowing through the fluid outlet 514 of the bracket assembly 506 can be adjusted by the user by rotating the flow control knob 520, which is coupled to a rotating spool 584 that is housed within the knob 520 and the bracket body 516. The spool 584 defines a cavity 532 and a cam wall 634 which, together with the cylindrical sidewalls 604 of the bracket body 516, form a fluid passage 638. Depending on the position of the spool 584 relative to the bracket housing 516, this fluid passage 638 may be in fluid communication with the fluid outlet 514 of the bracket assembly 506. Turning the spool 584 via the knob 520 changes the rotational position of the spool 584 in the housing 516 and the size of the fluid passage 638 that is aligned with the fluid outlet 514, which causes an adjustment of the flow rate of the fluid dispensed through the outlet 514. When the knob 520 is turned to select the lowest flow rate, the fluid passage 638 is unaligned with the fluid outlet 514. Instead, a trickle seal 530 defining a metering hole 594 is positioned in front of the fluid outlet 514, such that fluid is directed to the fluid outlet 514 via the metering hole 594, rather than the fluid passage 638.

Figure 23:
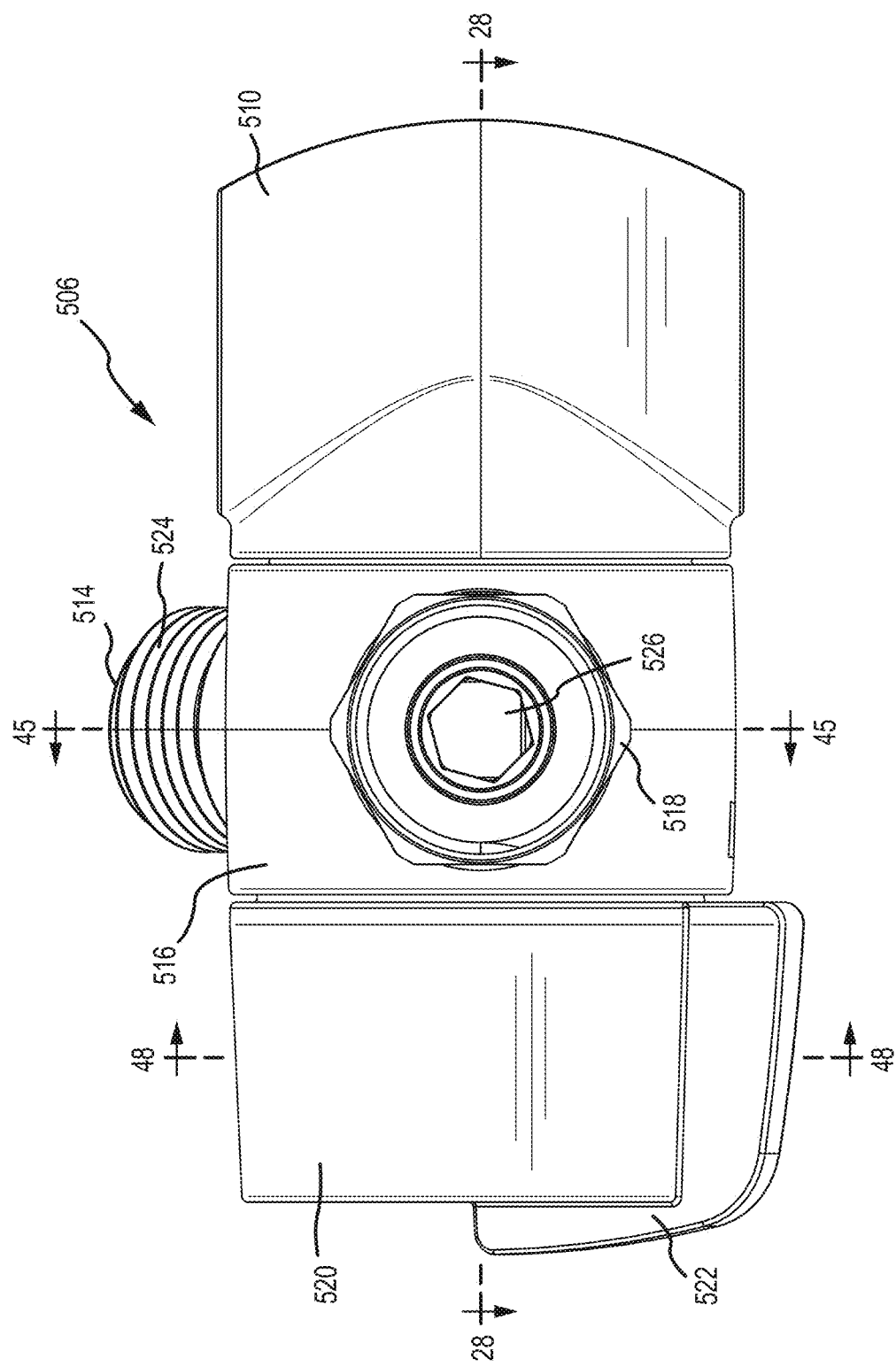
FIG. 23 is a rear elevation view of the showerhead bracket assembly of FIG. 20.
Figure 24:
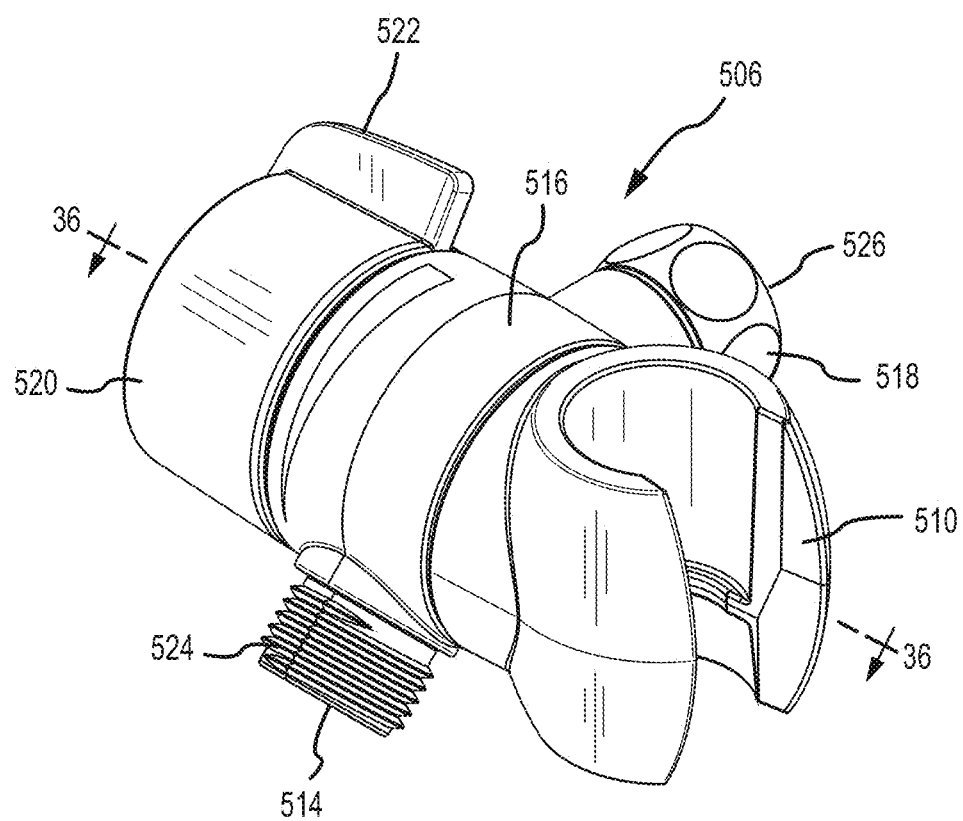
FIG. 24 is a front, right isometric view of the showerhead bracket assembly of FIG. 20.
Figure 28:
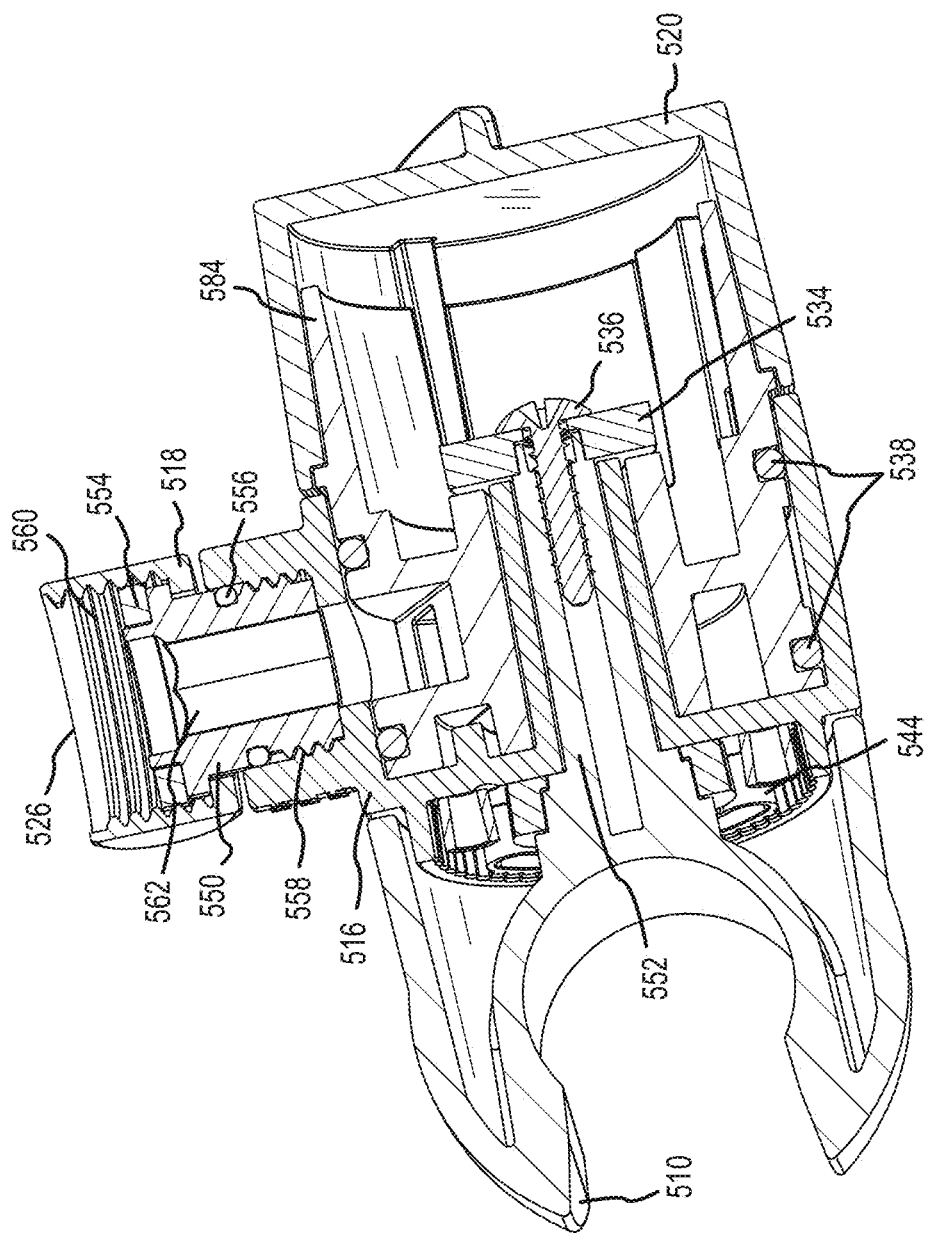
FIG. 28 is a cross-sectional view of the showerhead bracket assembly of FIG. 20, as taken along line 28-28 of FIG. 23.
Figure 29:
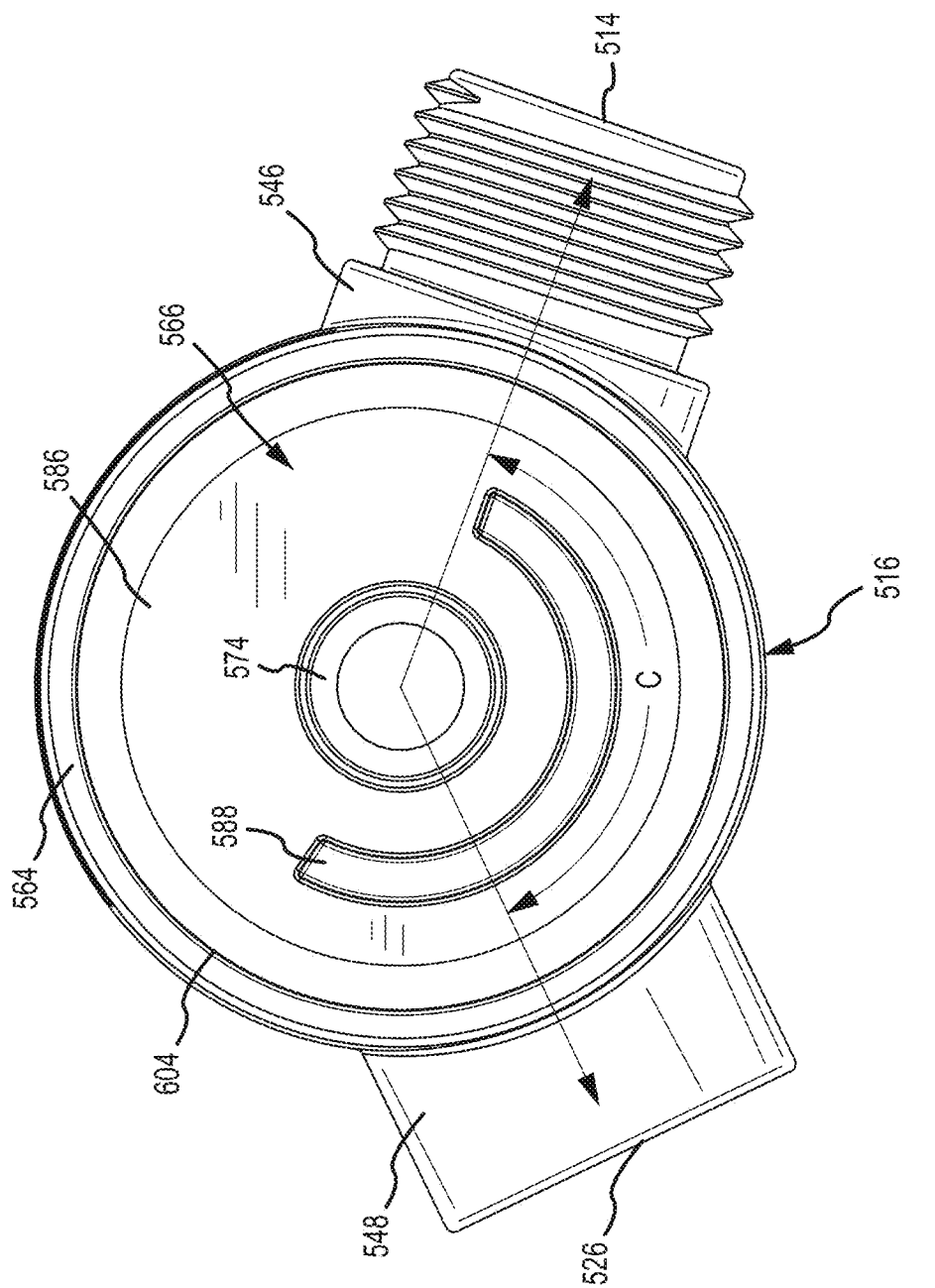
FIG. 29 is a left side view of the showerhead bracket body of the bracket assembly of FIG. 20.
Figure 30:
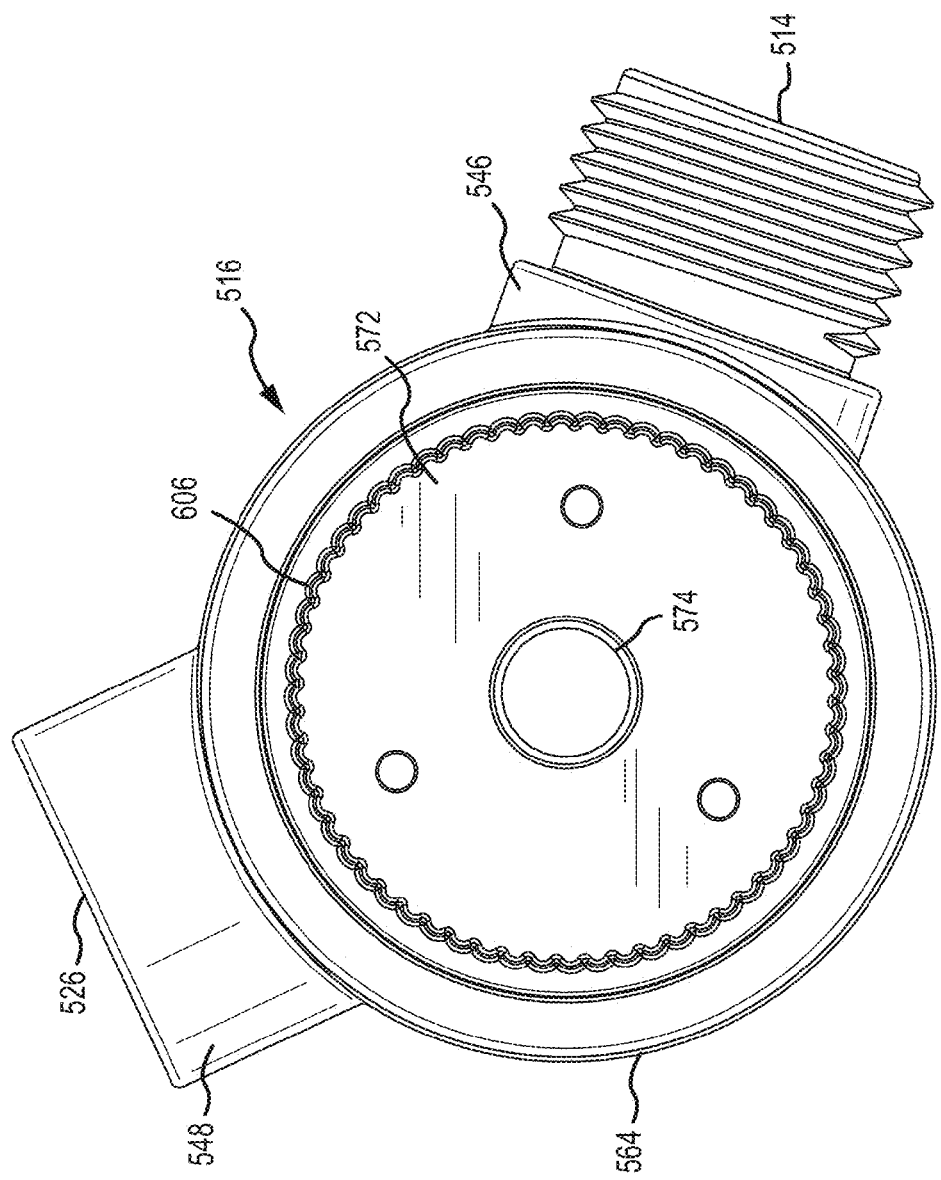
FIG. 30 is a right side view of the showerhead bracket body of the bracket assembly of FIG. 20.

FIG. 28 is a cross-sectional view of the bracket assembly 506, as taken along line 28-28 of FIG. 23. As discussed above, the coupling member 518 may join the showerhead bracket assembly 506 to a shower pipe or other water source. For example, the coupling member 518 may be a threaded nut 528 that has a threaded inner surface 560 that connects the shower pipe to the bracket body 516. In some embodiments, the threaded inner surface 560 of the coupling member 518 may be configured to engage corresponding outer surfaces of the shower pipe and a retainer 550 provided in the bracket assembly 506. One example of a retainer 550 is shown in FIG. 27, which illustrates an exploded view of the bracket assembly 506. As is shown, the bottom end of the retainer 550 may define a threaded outer surface 558 that is configured to engage a corresponding threaded inner surface 560 of the bracket body 516 to connect the retainer 550 to the bracket body 516. The retainer 550 may further define a fluid channel 562 that extends from the top end of the retainer 550 to the bottom end of the retainer 550. The fluid channel 562 may be configured to direct water expelled from the shower pipe through the fluid inlet 526 of the bracket assembly 506 and into the fluid passage 638 defined by the spool 584 and the cylindrical sidewall 604 of the bracket body 516. In some embodiments, one or more O-ring seals 538 may be positioned around the retainer 550 to prevent fluid received through the fluid inlet 526 from leaking due to any potential gaps that may be formed between the shower pipe and the coupling member 518 and/or the coupling member 518 and the bracket body 516. For example, a first annular fluid seal 554 may be positioned around the top end of the retainer 550 to prevent fluid from escaping between a potential gap formed between the shower pipe and the coupling member 518, and a second annular fluid seal 556 may be positioned along the body of the retainer 550 to prevent fluid from escaping between a potential gap formed between the coupling member 518 and the bracket body 516.

FIGS. 29 to 33 illustrate various views of the bracket body 516 in isolation. As is shown, the left side of the bracket body 516 may include a cylindrical body 564 that defines an interior chamber 566 that is configured to receive the rotating spool 584. As will be further described below, the rotating spool 584 may be rotated around a hollow shaft 574 that extends outwardly from the bottom wall 586 of the cylindrical body 564. The sidewall 604 of the cylindrical body 564 may extend outwardly from a bottom wall 586, and may define two fluid apertures, fluid inlet aperture 570 and fluid outlet aperture 568 (see FIG. 45), that are fluidly coupled to the fluid inlet 526 and the fluid outlet 514 of the bracket assembly 506. The bracket body 516 may further define a fluid inlet arm 548 and a fluid outlet arm 546, which extend outwardly at an angle relative to one another. For example, in one embodiment, the fluid inlet arm 548 and the fluid outlet arm 546 may extend at an obtuse angle C relative to one another. Such an angle may allow positioning the fluid outlet arm 546 such that it extends downwardly, i.e., in an vertical orientation that is substantially parallel with the shower wall, when the bracket assembly 506 is mounted to a shower pipe, allowing the hose 508 connected to the fluid outlet arm 546 to also extend in a downward direction. This may serve to prevent the hose 508 from potentially interfering with the shower wall or becoming tangled with a shower caddy device attached to the shower pipe. In other embodiments, the fluid inlet arm 548 and the fluid outlet arm 546 may form an acute angle relative to one another, may be co-linear, or may extend at a right angle relative to one another.

Figure 31:
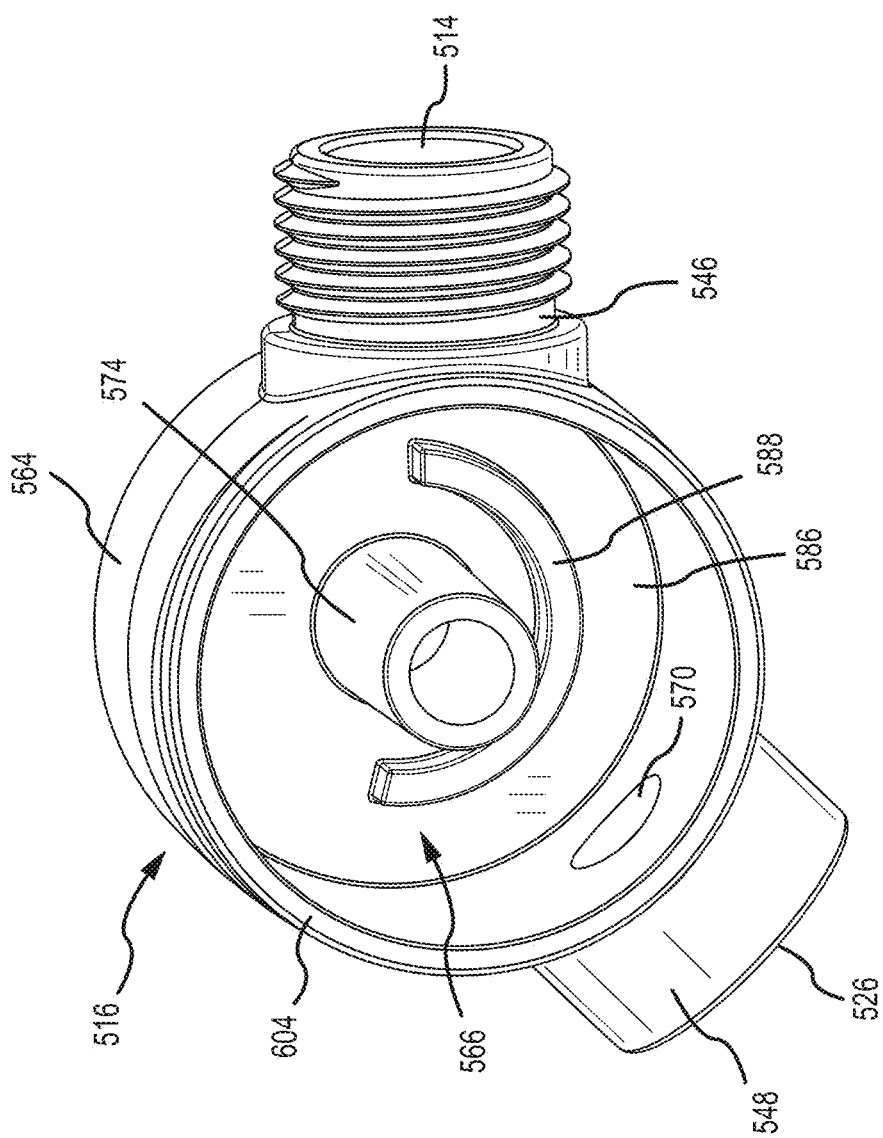
FIG. 31 is a left side isometric view of the showerhead bracket body of the bracket assembly of FIG. 20.
Figure 32:
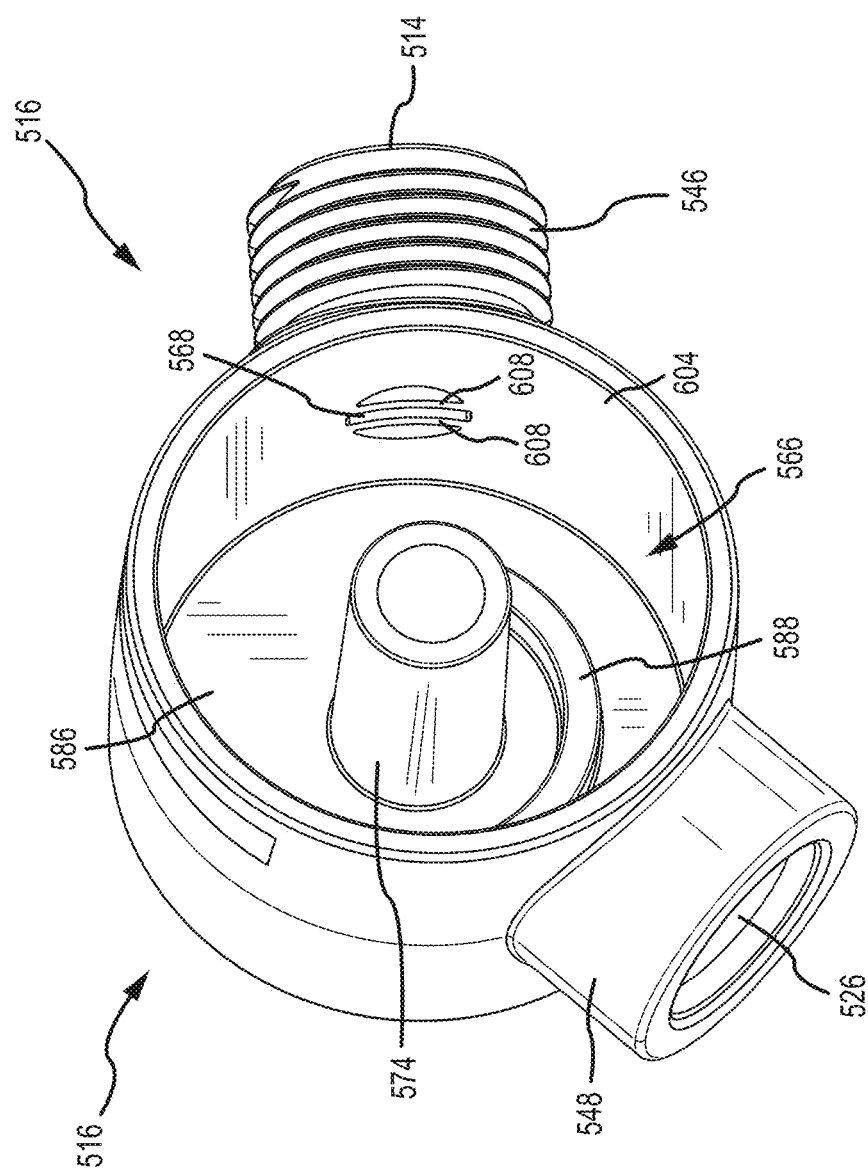
FIG. 32 is another left isometric view of the showerhead bracket body of the bracket assembly of FIG. 20.
Figure 33:
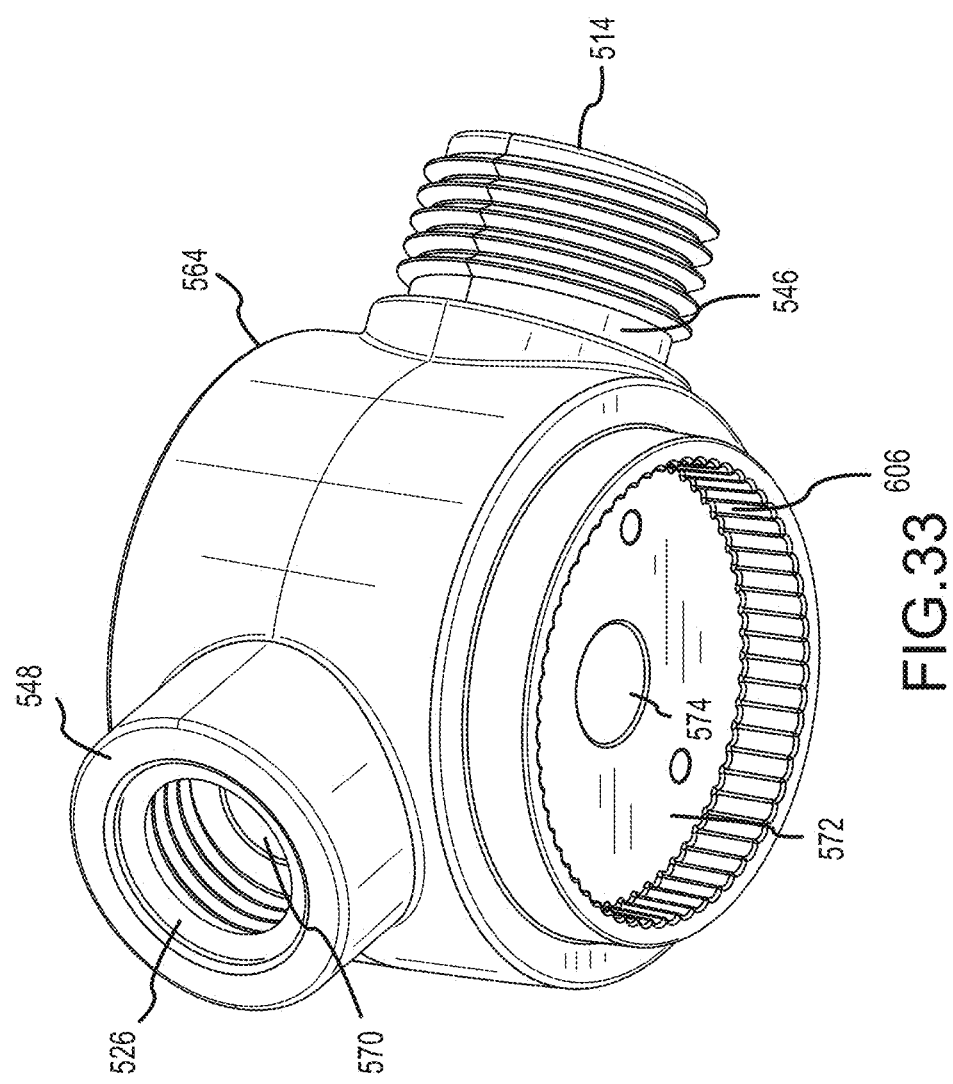
FIG. 33 is a top, right, rear isometric view of the showerhead bracket body of the bracket assembly of FIG. 20.

As best shown in FIGS. 31 and 32, the fluid inlet aperture 570 is axially aligned with the longitudinal axis of the fluid inlet arm 548 of the bracket body 516, and the fluid outlet aperture 568 is axially aligned with the longitudinal axis of the fluid outlet arm 546 of the bracket body 516. In some embodiments, the fluid inlet aperture 570 may take the form of a circular hole, while the fluid outlet aperture 568 may define one or more ribs 608. These ribs 608 may serve to prevent a trickle seal 530 of the spool 584 from becoming lodged within the fluid outlet aperture 568 when it is positioned in front of the fluid outlet aperture 568. As mentioned, the fluid outlet arm 546 may have a threaded outer surface 524 that is attachable to the hose 508 of a handheld showerhead 502, and the fluid inlet arm 548 may have a threaded inner surface 560 that is configured to engage a corresponding outer surface of the retainer 550 that attaches the coupling member 518 to the bracket body 516. The fluid inlet aperture 570 therefore allows for transporting fluid from the fluid channel 562 of the retainer 550, as received from the shower pipe, to a fluid chamber 638 defined by the cylindrical body 564 of the bracket body 516 and the rotating spool 584. The fluid aperture 568 of the fluid outlet arm 546, which is fluidly coupled to the hose 508 of the detachable showerhead, allow for transporting fluid through the fluid chamber 638 defined by the interior chamber 566 of the cylindrical housing and the rotating spool 584 to the fluid outlet 514.

The right side of the bracket body 516 may be configured to engage the cradle 510, which may be joined to the right side of the bracket body 516. Specifically, the right side of the bracket body 516 may define a socket 572, best shown in FIGS. 30 and 33, that is configured to receive a wheel-shaped spring 544 that is fixedly coupled to the cradle 510. The socket 572 may have a socket wall defining one or more teeth 606 that are configured to engage corresponding teeth 616 provided on an interaction rim of the wheel-shaped spring 544. As discussed above, the wheel-shaped spring 544 may be fixedly coupled to the cradle 510, such that the spring 544 rotates with the cradle 510 as the cradle 510 is rotated by a user. The rotational mechanism of the cradle 510 and spring 544 relative to the bracket body 516 will be discussed in more detail below.

Figure 34:
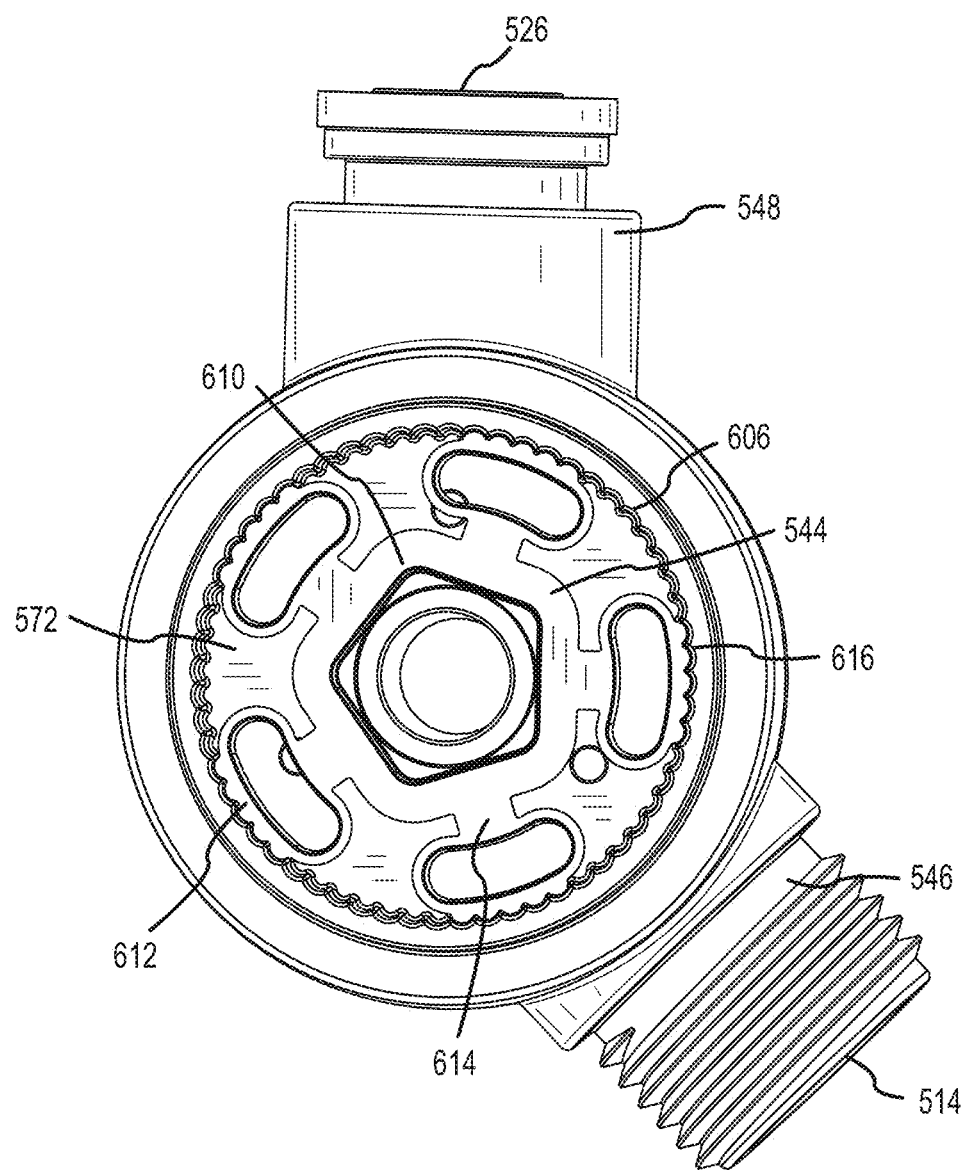
FIG. 34 is a right side elevation view of the showerhead bracket body and wheel-shaped spring of the bracket assembly of FIG. 20.

One example of a spring 544 or other deformable member that may be used in conjunction with this particular embodiment is shown in FIG. 34, which illustrates the spring 544, as detached from the cradle 510 and positioned within the socket 572. The wheel-shaped spring 544 may have a central hub 610, with a plurality of spokes 614 extending outwardly from the hub 610 to separated "rim" sections formed generally as ovals 612. Each spoke 614 may be attached to an inner long edge of each oval 612. The outer long edge of each oval 612 may define teeth 616 that correspond to the teeth 606 defined by the socket wall. The ovals 612 may act similar to a leaf spring, in that the long edges of the leaf spring are deflected inwardly to allow the wheel to advance against opposing teeth 606 provided by the socket 572.

Figure 35:
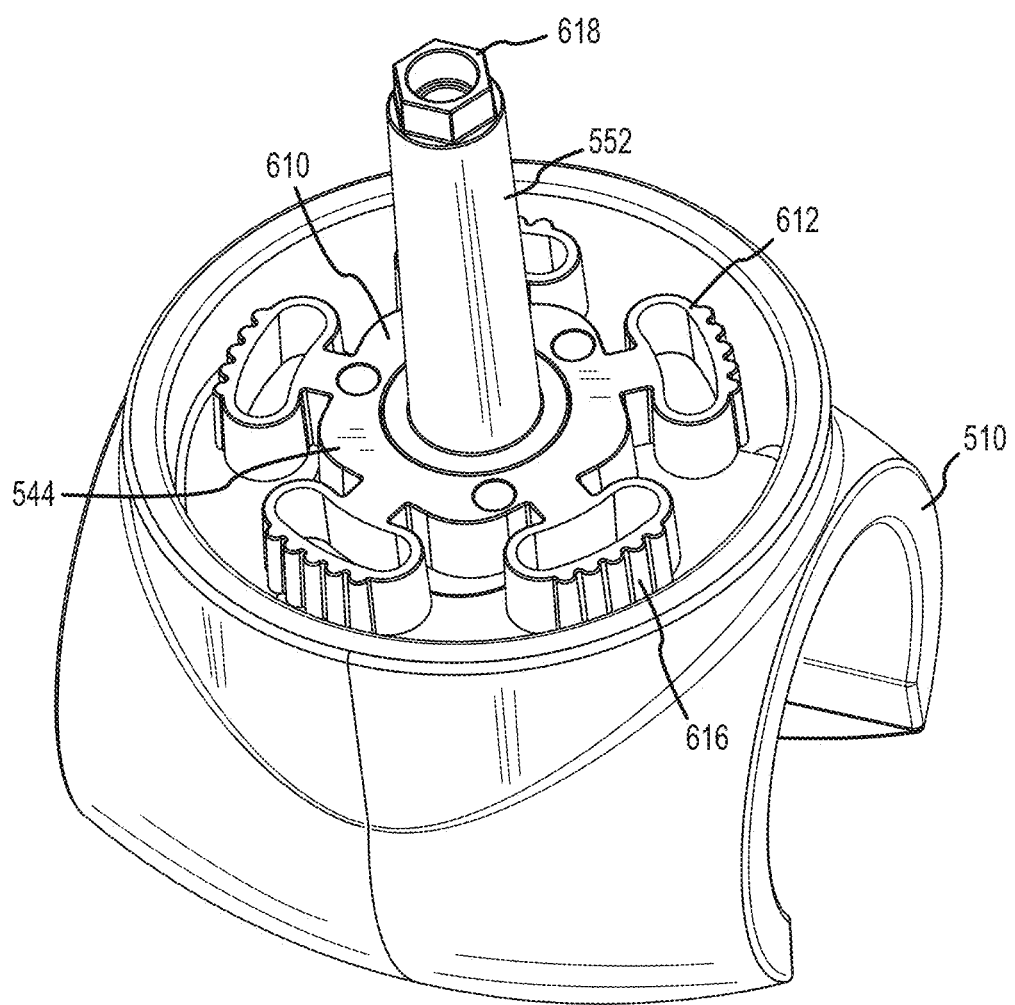
FIG. 35 is a left isometric view of the showerhead handle cradle and wheel-shaped spring of the bracket assembly of FIG. 20.

The hub 610 of the wheel-shaped spring 544 defines a central aperture through which the shaft 552 of the cradle 510 extends. The central aperture may be pentagonal-shaped on one side (as best shown in FIG. 34) and circular-shaped on the other side (as best shown in FIG. 35). More particularly, the outer side of the hub 610, i.e., the side that faces the bracket body 516, defines a circular aperture, while the inner side of the hub 610, i.e., the side that faces the cradle 510, defines a pentagonal-shaped aperture. The pentagonal aperture is mated with a corresponding pentagonal key defined on the inside wall of the cradle 510 and surrounding the cradle shaft 552 to hold the spring 544 in place between the cradle 510 and the bracket body 516 as it is rotated within the socket 572. The mating of the pentagonal key with the pentagonal aperture further allows the wheel-shaped spring 544 to rotate in conjunction with the cradle 510 and relative to the bracket body 516. In other embodiments, the key and aperture may not define pentagons, but may define other shapes to prevent rotation of the cradle 510 and the spring 544 relative to one another. For example, the key and aperture may define a square or a triangle, or some other polygonal structure. Alternatively, the key and aperture may define elliptical shapes.

As rotational forces are applied to the cradle 510, the teeth 616 provided on the outer arms 614 of the wheel-shaped spring 544 engage corresponding teeth 606 provided by the socket wall, thereby resisting the rotational forces applied to the cradle 510. FIG. 34 illustrates the spring 544 in a "stationary" position, in which the peaks of the teeth 616 of the spring 544 are positioned within corresponding depressions on the socket wall. When a sufficient rotational force is applied to the cradle 510, the spring-loaded arms 614 of the wheel-shaped spring 544 are depressed by the teeth 606 of the socket 572, temporarily deforming and disengaging the teeth 616 of spring 544 from the teeth 606 of the socket 572. As the cradle 510 is rotated, each spring-loaded arm 614 is expanded, such that the teeth 616 of the spring 544 are forced into an adjacent depression along the socket wall. The rotation of the wheel-shaped spring 544 as it slides along the teeth 606 of the socket 572 may therefore cause an audible "clicking" sound as the teeth 616 of the spring 544 are disengaged and mated with the next incremental set of socket teeth 606.

The wheel-shaped spring 544 may be rotatable relative to the socket 572 so long as the rotational forces applied to the cradle 510 are sufficient to overcome the radial spring retention forces applied to the cradle 510. Preferably, the spring and frictional forces between the teeth 616 of the wheel-shaped spring 544 and the teeth 606 of the socket 572 may be sufficiently high so as to resist rotation of the cradle 510 in response to the weight of the showerhead 502 and the hose 508 when the handheld shower 502 is merely resting in the cradle 510. In other words, once adjusted, the cradle 510 may remain stationary when it is not being manipulated by a user. One of the benefits of the disclosed rotational mechanism of the cradle 510 is that is allows users to reposition the showerhead handle 502 with a single hand. This is an improvement over most existing showerhead bracket cradles, which require a user to grasp the bracket with one hand and the cradle (or other adjustment mechanism) with the other in order to alter and set the new position of the handle. Here, a user need only use one hand to move the cradle 510 in order to adjust the position of the handle 502 because the bracket 516 is fixedly attached to the shower pipe.

Preferably, the cradle 510 may be rotatable in both clockwise and counter-clockwise directions, as is the case in the illustrated embodiment in which the teeth 606 of the socket 572 and the teeth 616 of the wheel-shaped spring 544 are uniform and symmetrical. However, in some embodiments, the cradle 510 may only be rotated in one direction. For example, the teeth 606 of the socket 572 and the teeth 616 of the wheel-shaped spring 544 may be uniform but asymmetrical, with each tooth having a moderate slope on one edge and a much steeper slope on the other edge to allow rotation in only one direction and to prevent rotation in the opposite direction. In another embodiment, the teeth 606 of the socket 572 and the teeth 616 of the wheel-shaped spring 544 may be angled in a forward direction to allow rotation in only the forward direction and to prevent rotation in the opposite direction.

FIG. 35 illustrates an isometric view of the cradle 510 and the wheel-shaped spring 544. As best shown in FIG. 35, as well as in FIG. 36 which illustrates a cross-sectional view of the bracket assembly 506, the cradle 510 may define a shaft 552 that extends through the hollow shaft 542 of the bracket body 516. In some embodiments, the shaft 552 of the cradle 510 may be hollow. For example, the shaft 552 may be configured to receive a screw, bolt or other mechanical fastener that may be inserted through an aperture that extends through the shaft 552. In other embodiments, however, the shaft 552 may be solid. As previously discussed, the wheel-shaped spring 544 may be fixedly attached to the cradle 510 with the shaft 552 of the cradle 510 inserted through the central aperture defined by the hub 610, so as to allow for rotation of the cradle 510 and the spring 544 around the shaft 552 and relative to the bracket body 516. For example, the spring 544 may be held in place by mating the pentagonal-shaped aperture with the pentagonal-shaped key provided on the cradle 510, such that the spring 544 is sandwiched between the cradle 510 and the bracket 516. As shown in FIGS. 27 and 28, the cradle 510, bracket 516, and the spring 544 are all held together by the screw 536 that extends through the spool 584 and is secured in the shaft 552 of the cradle 510. In other embodiments, the spring 544 may be integrally formed with the cradle 510, or may be attached to the cradle 510 using mechanical fasteners.

Figure 36:
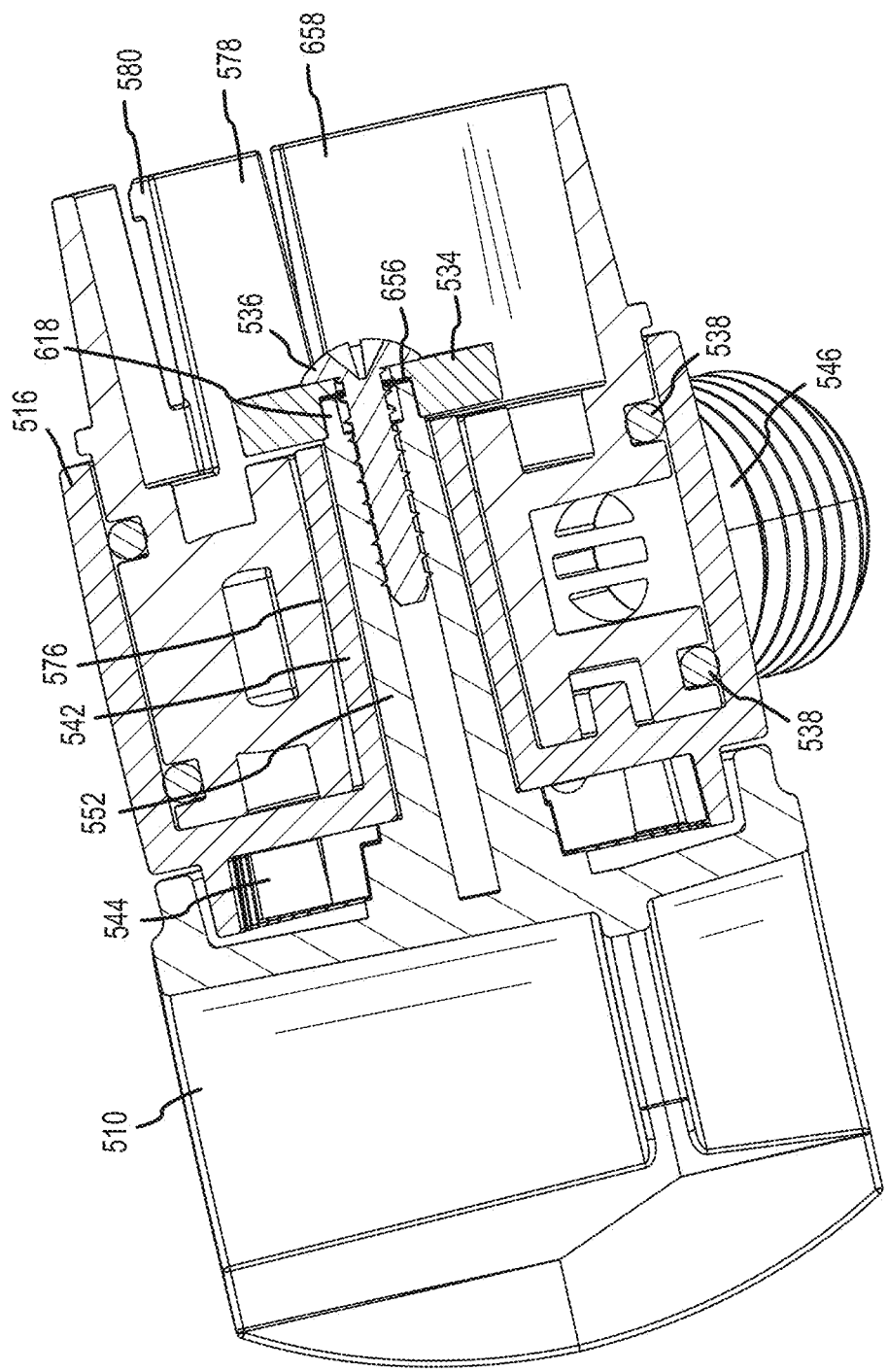
FIG. 36 is a cross-sectional view of the showerhead bracket assembly of FIG. 20, as taken along line 36-36 of FIG. 24.

As shown in FIG. 36, the cradle shaft 552 may have a longer length than the length of the bracket body shaft 542, such that the tip of the cradle shaft 552 extends beyond the base of the bracket shaft 542 when the cradle shaft 552 is received within the bracket shaft 542. In some embodiments, the tip of the cradle shaft 552 may be coupled to the spool 584 by a fastener 536, such as a screw. The tip of the shaft 552 may be formed with a hexagonal perimeter or other keyed form 618. A washer 534 with a hexagonal opening forming a keyway 656 on an inner face and transitioning to a circular aperture on an outer face may be placed upon the tip of the shaft 552. The washer 534 may have a larger outer diameter than the hollow shaft 542 of the bracket body 516, and may therefore serve to prevent the cradle 510 from potentially being pulled through the bracket body shaft 542, which would disconnect the cradle 510 from the bracket body 516. As is shown, the washer 534 may have a keyway 656 such that it engages a corresponding key 618 provided on the tip of the cradle shaft 552, such that the washer 534 interfaces with the keyed tip 618 and is positioned above the bracket body shaft 542. In some embodiments, the position of the key 618 may be such that a gap or a space is defined between the washer 534 and the tip of the bracket body shaft 542. In this manner, the washer 534 is prevented from being tightened against the bracket body shaft 542, which might impede the rotation of the cradle 510 relative to the bracket body 516.

Figure 37:
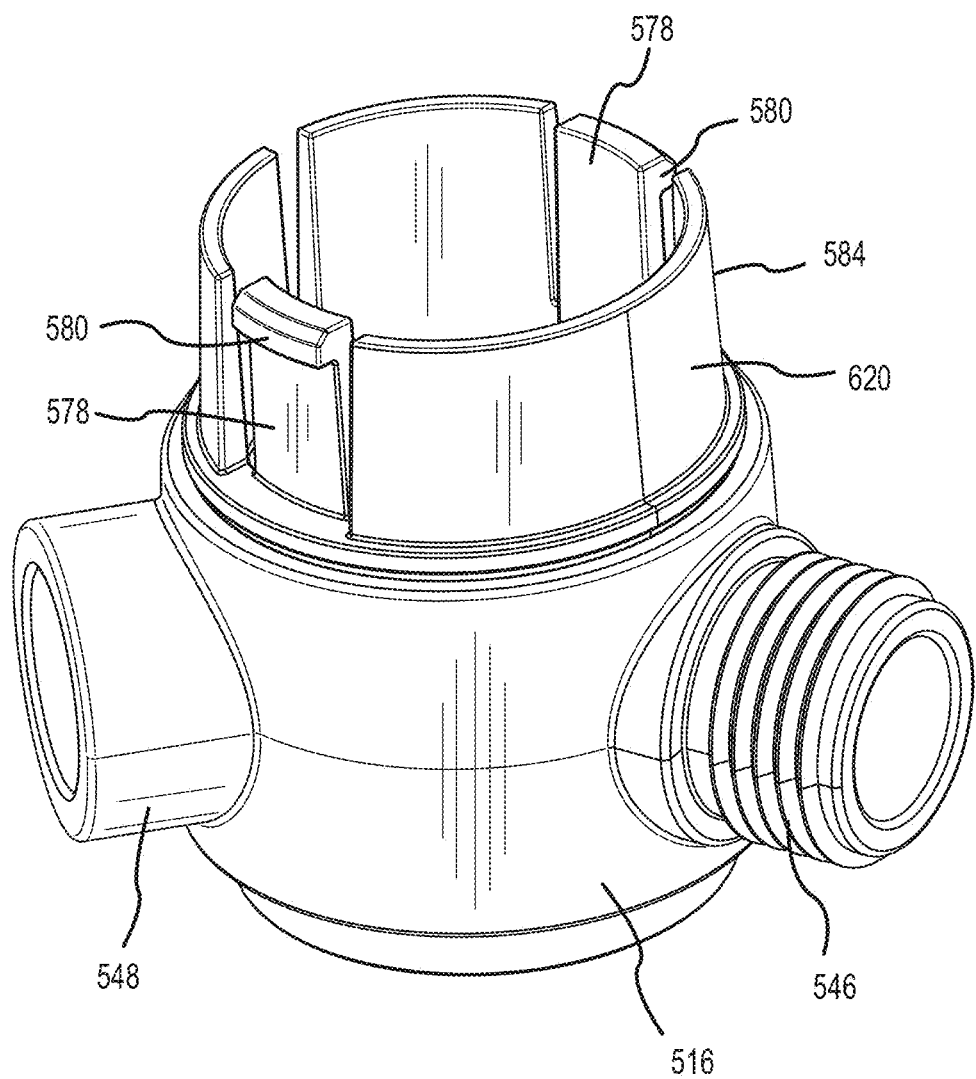
FIG. 37 is a bottom left isometric view of the showerhead bracket body and spool of the bracket assembly of FIG. 20.
Figure 38:
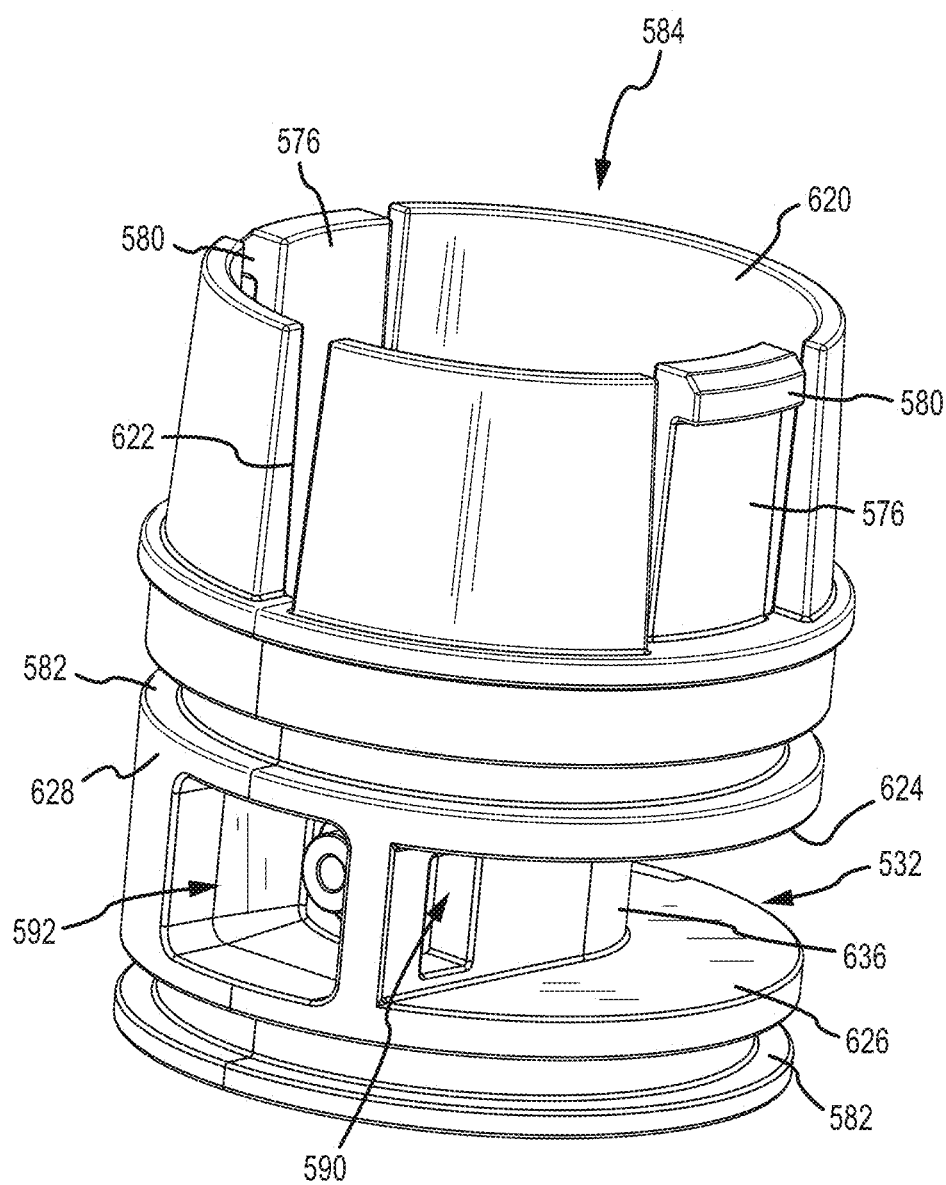
FIG. 38 is a side isometric view of the spool of the bracket assembly of FIG. 20.
Figure 39:
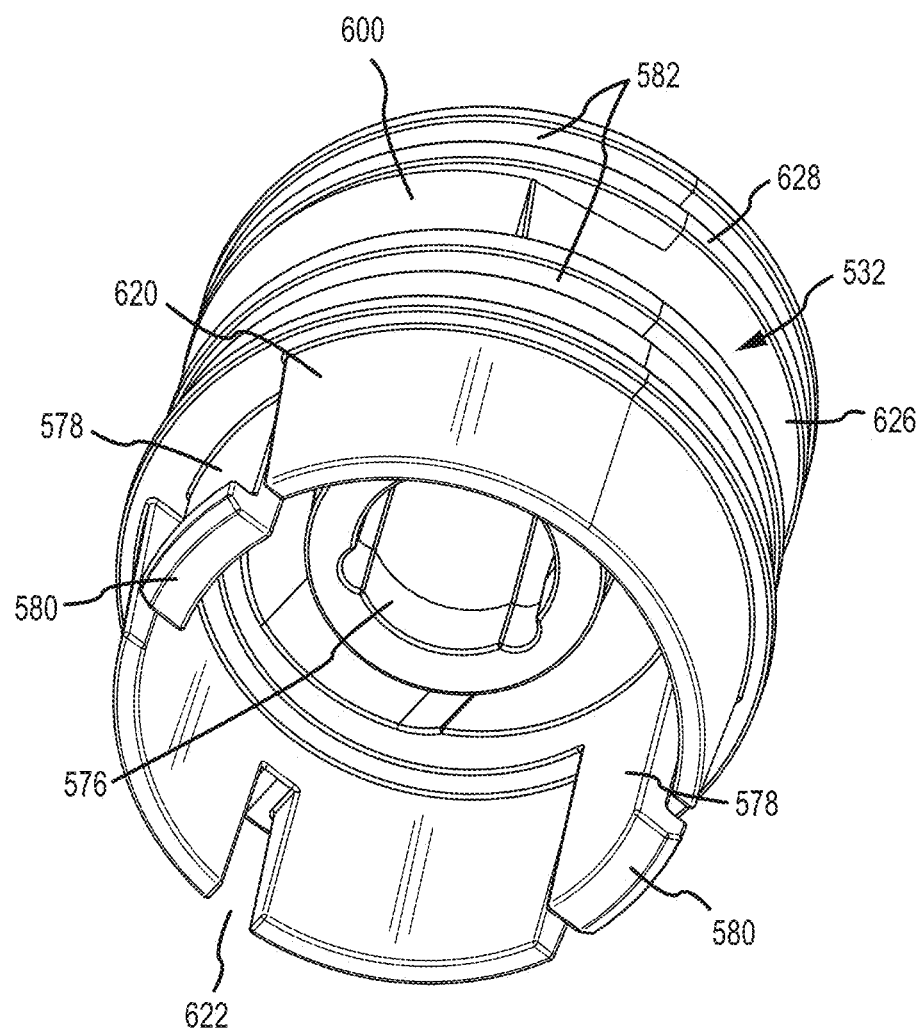
FIG. 39 is a left side isometric view of the spool of the bracket assembly of FIG. 20.

FIG. 37 illustrates the bracket body 516 and the spool 584 in an operational position. FIGS. 38-44 schematically illustrate various views of the spool 584 in isolation. In some embodiments, the spool 584 may define a hollow spool shaft 576 that fully or partially encircles the shaft 542 of the bracket body 516. The hollow spool shaft 576 is best shown in FIG. 36, which illustrates a cross-sectional view of the bracket assembly 506 and in FIG. 40. As is shown, the inner surface of the hollow spool shaft 576 may fit around the outer surface of the bracket body shaft 542 to allow for rotation of the spool 584 relative to the bracket body 516. The spool 584 and the cradle 510, the shaft 552 of which is nested within the hollow shaft 542 of the bracket body 516, may share the same rotational axis. The outer surface 628 of the bottom portion of the spool 584 that is received within the bracket body 516 may be complementary to the interior chamber 566 of the bracket body 516 to facilitate rotation of the spool 584 around the spool shaft 576. Additionally, the inner surface of the spool shaft 576, the outer surface of the bracket body 516, and the outer surface 628 of the spool 584 contacting the cylindrical sidewall 604 of the bracket body 516 may each have a low coefficient of friction to further facilitate rotation of the spool 584.

Figure 47:
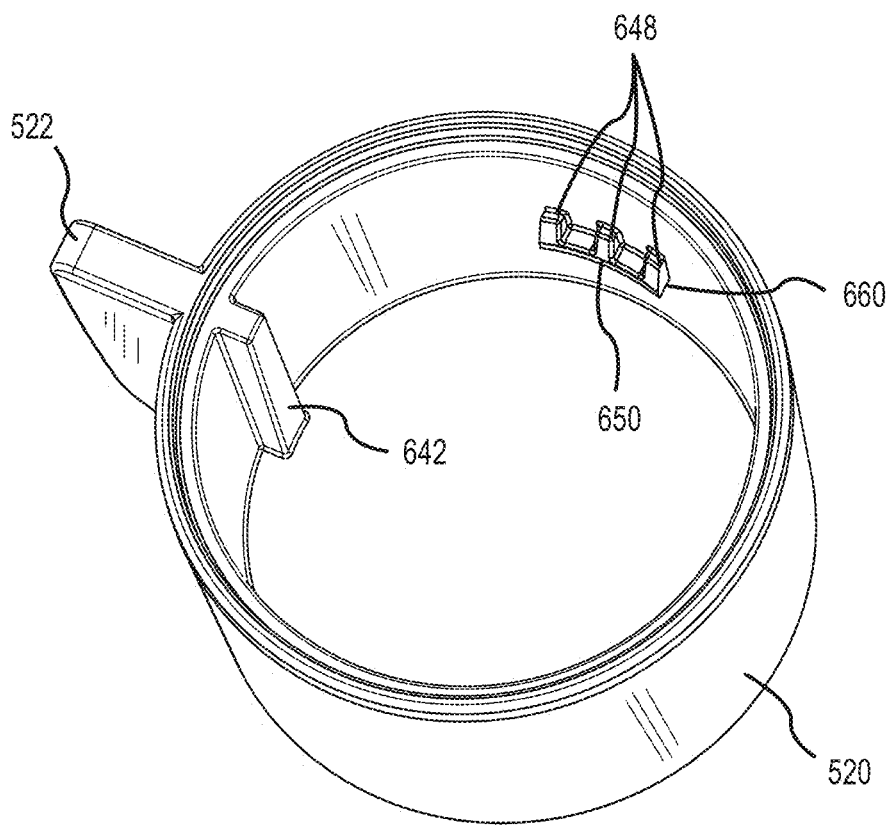
FIG. 47 is a right side isometric view of the knob of the bracket assembly of FIG. 20.
Figure 48:
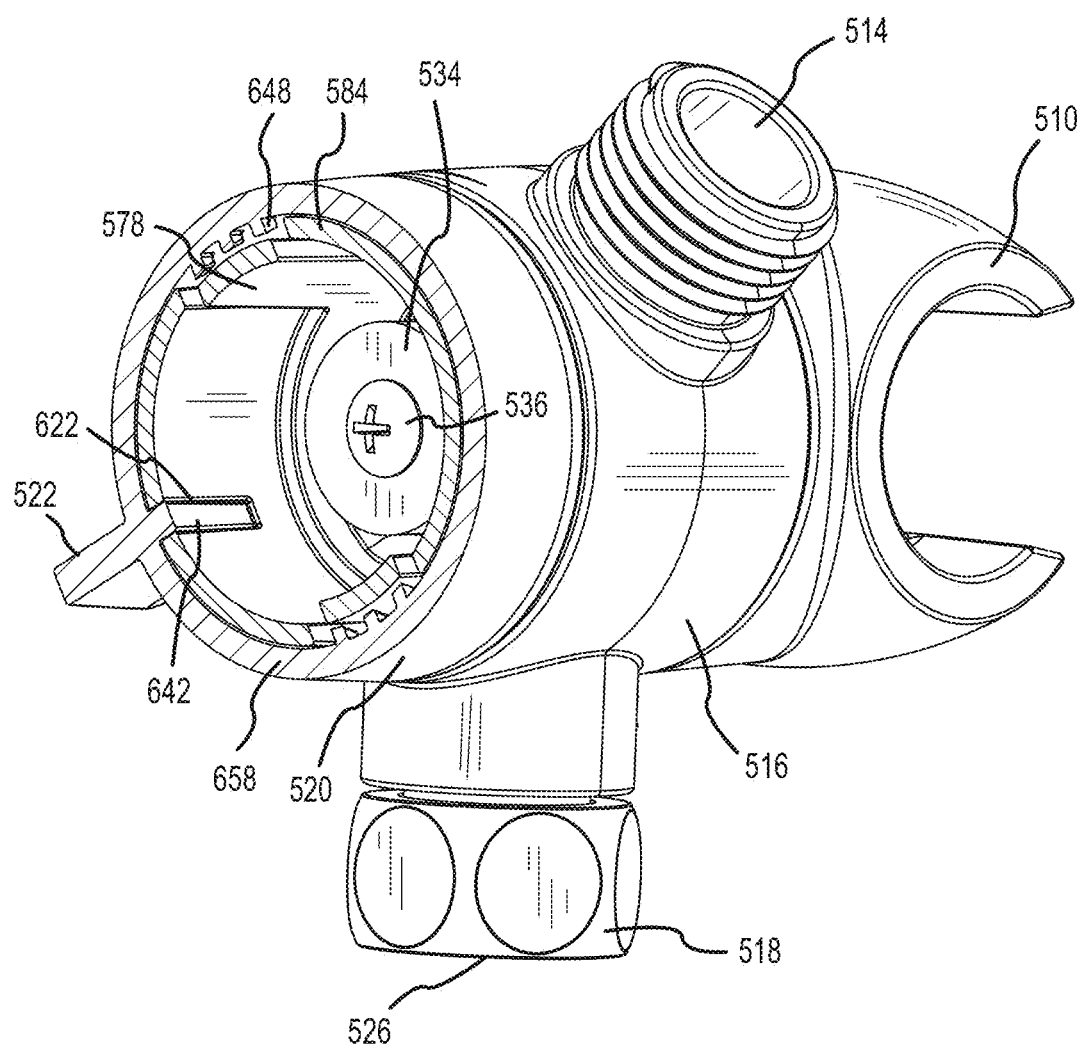
FIG. 48 is a left side, isometric, cross-sectional view of the showerhead bracket assembly of FIG. 20, as taken along line 28-28 of FIG. 23.

As is shown in FIGS. 47 and 48, which illustrate the knob 520 and the connection between the knob 520 and the spool 584, the inner side of the knob 520 defines a tab 642 that fits into a slot 622 defined between two of the arcuate walls 658. The tab 642 may prevent the knob 520 from rotating relative to the spool 584, such that the spool 584 and the tab 642 rotate together relative to the bracket body 516. The knob 520 may further define a plurality of notches 660 which are positioned on opposing sides of the inner surface of the knob 520. The top portion of the spool 584 may define arcuate cylindrical walls 658, and a pair of prongs 578 on opposing sides of the spool 584 that together form a generally cylindrical, partitioned wall 620 on the spool 584. The prongs 578 are configured to receive the knob 520 that is used to adjust the flow rate of the fluid expelled from the bracket assembly 506. The ends of the prongs 578 may have detent catches 580 that interface with the corresponding notches 660 provided on the inner surface of the knob 520 to prevent disengagement of the knob 520 from the spool 584 when the knob 520 is inserted over the prongs 578. In some embodiments, the notches 660 provided on the knob 520 may define a plurality of ribs 648 that extend downwardly from a shelf 650 that is configured to engage the detent catches 580 when the spool 584 is locked into place. As the knob 520 is pulled over the spool 584, the detent catches 580 are slid over the ribs 648 towards the shelf 650, and is locked into place once the detent catches 580 are pulled over the shelf 650. In some embodiments, the height of the ribs 648 may gradually increase towards the shelf 650 to facilitate sliding of the prongs over the notches 660.

Figure 42:
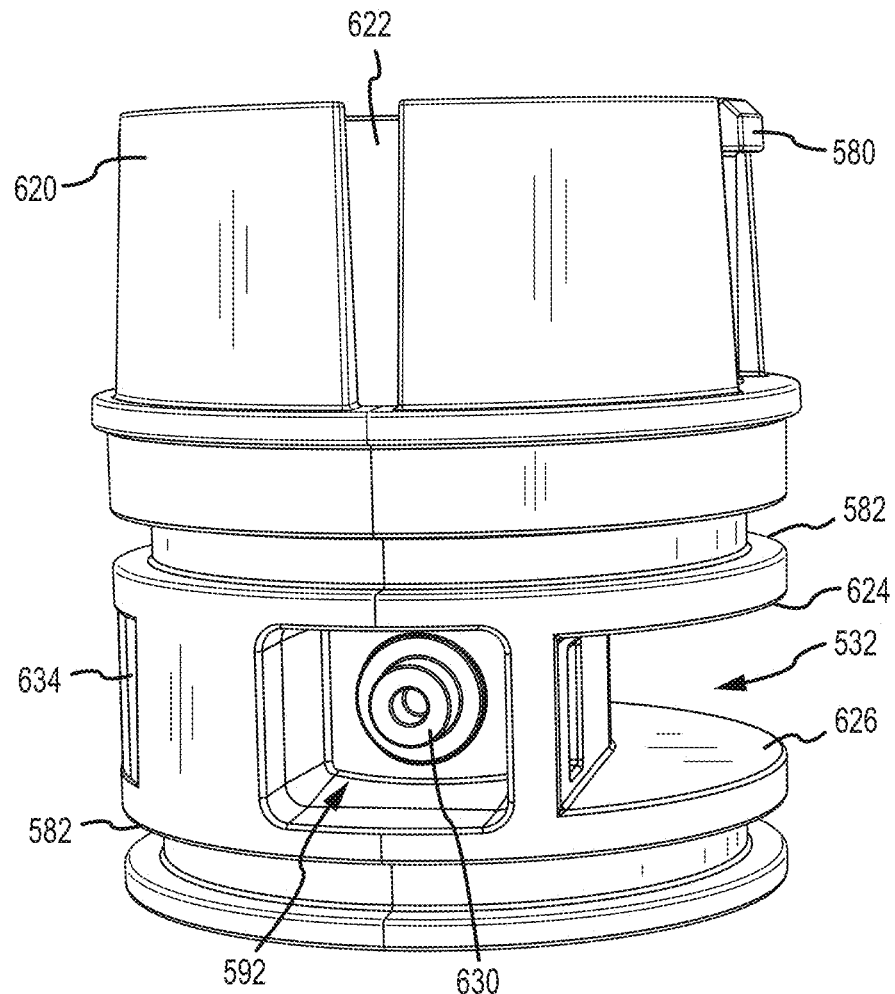
FIG. 42 is further side isometric view of the spool of the bracket assembly of FIG. 20.
Figure 43:
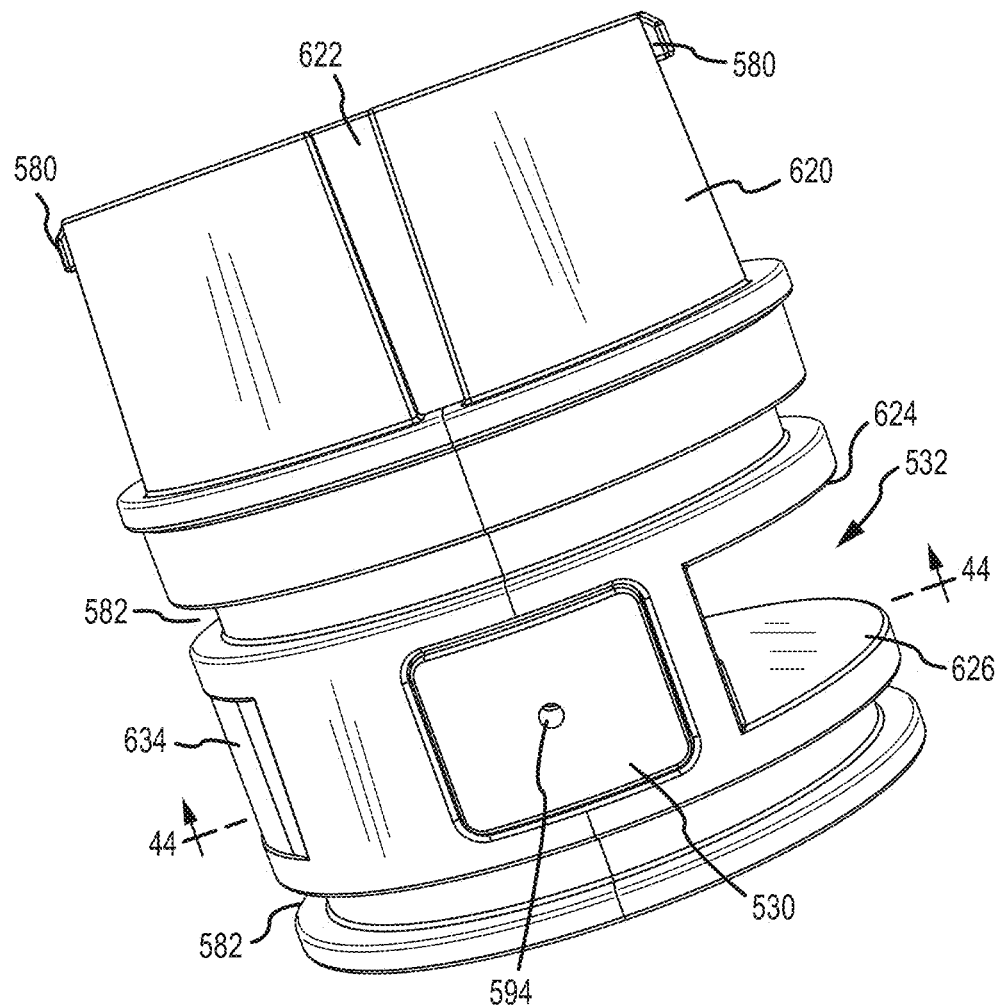
FIG. 43 is another side isometric view of the spool and trickle seal of the bracket assembly of FIG. 20.
Figure 44:
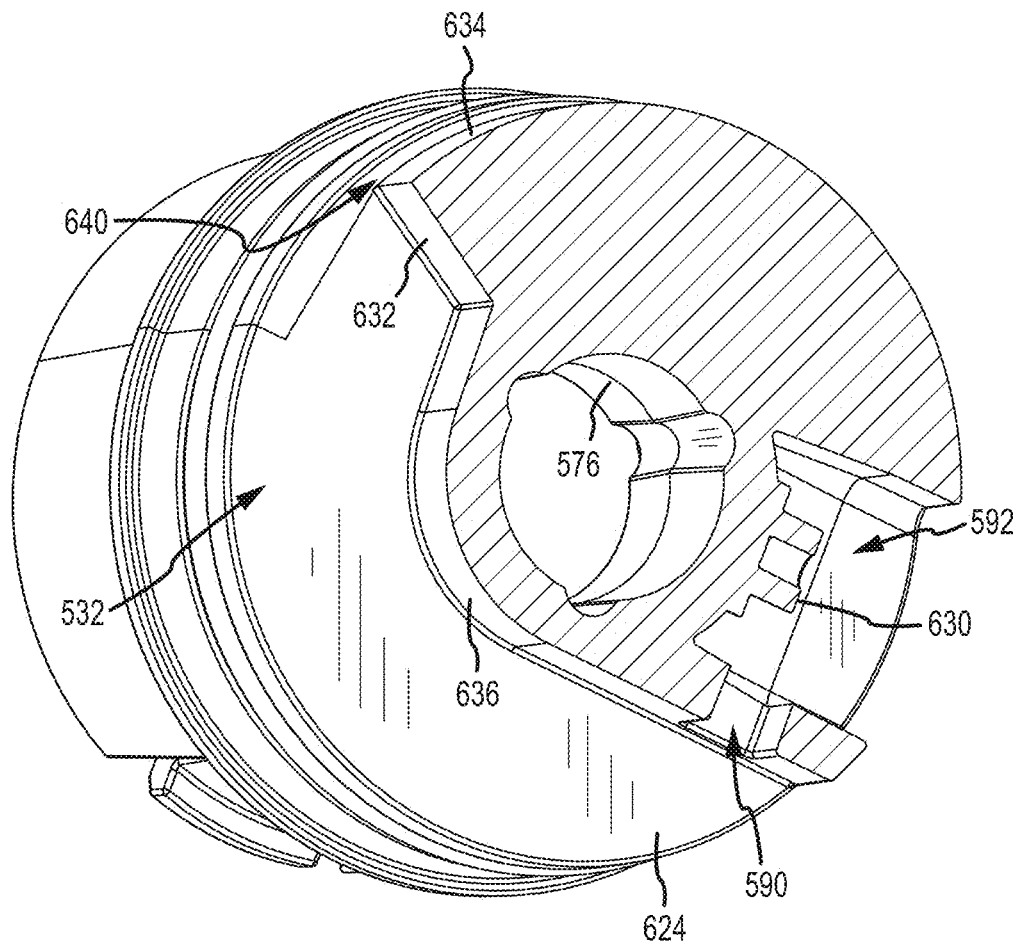
FIG. 44 is a right side, isometric, cross-sectional view of the spool of the bracket assembly of FIG. 20 with the trickle seal removed, as taken along line 44-44 of FIG. 43.
Figure 45:
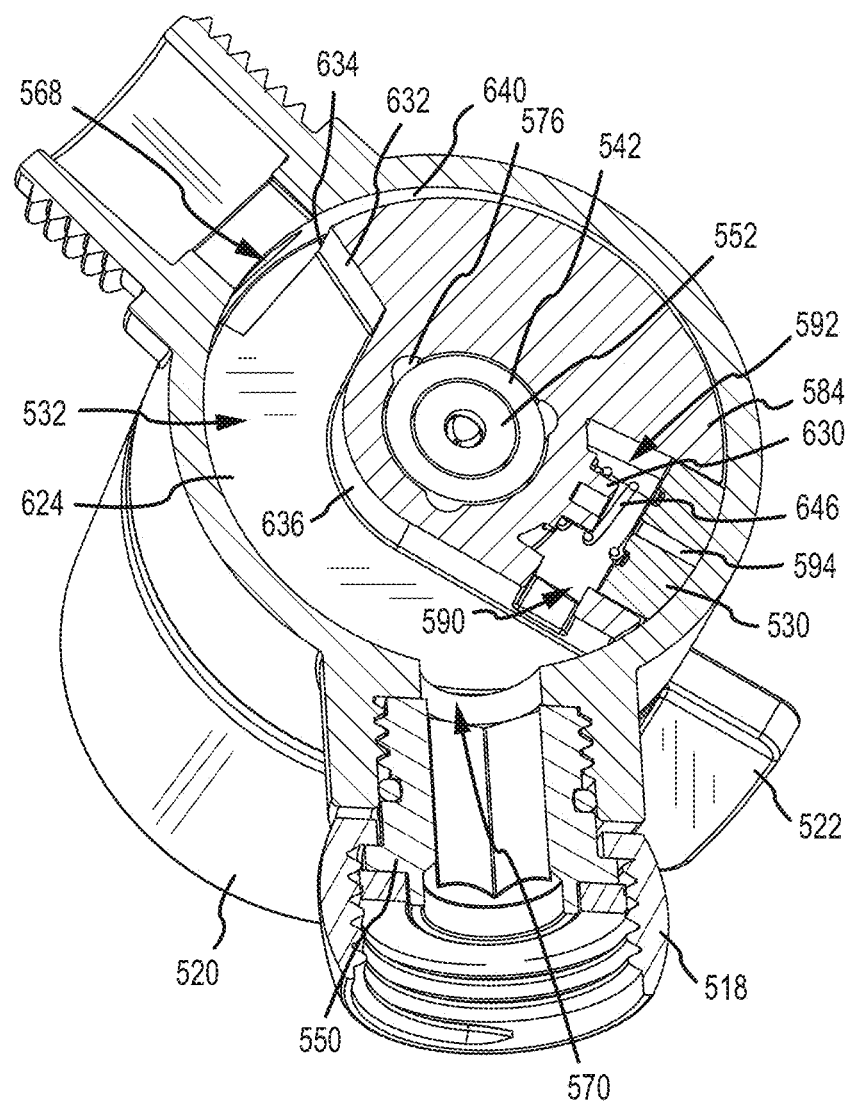
FIG. 45 is a right side, isometric, cross-sectional view of the bracket assembly of FIG. 20, as taken along line 45-45 of FIG. 23.

During operation, the bottom portion of the spool 584 may be nested within the interior chamber 566 of the bracket body 516. The bottom portion 600 of the spool 584 may define a semicircular or arcuate, tapered cavity 532 that, with the bracket body 516, forms a fluid passage 638 when the spool 584 is nested within the inner chamber 566. The shape of the cavity 532 is best shown in FIG. 42, FIG. 44, which illustrates a cross-sectional view of the spool 584 as taken along line 44-44 in FIG. 43, but with the trickle seal 530 and spring 646 removed, and FIG. 45, illustrating a cross-sectional view of the bracket assembly 506, as taken along line 45-45 in FIG. 23. As is shown, the cavity 532 extends at least part of the way around the shaft 576 of the spool 584. The resulting fluid passage 638 may be bound by a top cavity wall 624 and a bottom cavity wall 626 formed in the spool 584, the outer shaft wall 636, an end wall 632, a cam wall 634, and the inner surface of the cylindrical sidewall 604 of the bracket housing 516. The cam wall 634 may extend adjacent to an outer circumference of the spool 584, but may have a decreasing radius of curvature with a larger radius adjacent the compartment 592 and a smallest radius adjacent the end wall 632 of the cavity 532, such that a small arcuate, wedge-shaped gap 640 is created between the cam wall 634 and the cylindrical sidewall 604 of the bracket housing 516. This gap 640 may be fluidly coupled to the fluid passage 638 formed by the cavity 532 and the inner surface of the cylindrical sidewall 604 of the bracket body 516. The narrowing fluid passage formed by the gap 640 may be bound by the top cavity wall 624 and the bottom cavity wall 626, which extend past the cam wall 634 to meet the cylindrical sidewall 604 of the bracket body 516.

The fluid passage 638 formed by the cavity 532 may also be fluidly coupled by a port 590 to a smaller compartment 592 that is configured to receive a trickle seal 530. The trickle seal 530 may be biased away from the shaft 576 by a spring 646 mounted on a spring shaft or post 630 extending radially outward into the compartment 592 from the spool shaft 576, such that the trickle seal 530 is pressed against the inner surface of the bracket body 516 by the spring 646. The compartment 592 may be fluidly coupled to the larger cavity 532 of the spool 584 by the port 590 that is defined by the wall 636 that extends between the spool 584 and the compartment 592 and separates the compartment 592 from the cavity 532. As best shown in FIG. 43, the trickle seal 530 may define a metering hole 594 that extends between the front and rear ends of the trickle seal 530. As will be further described below, the metering hole 594 may allow water to trickle through the fluid outlet 514 of the bracket assembly 506 when the trickle seal 530 is seated against the fluid aperture 568 of the fluid outlet arm 546.

Figure 46:
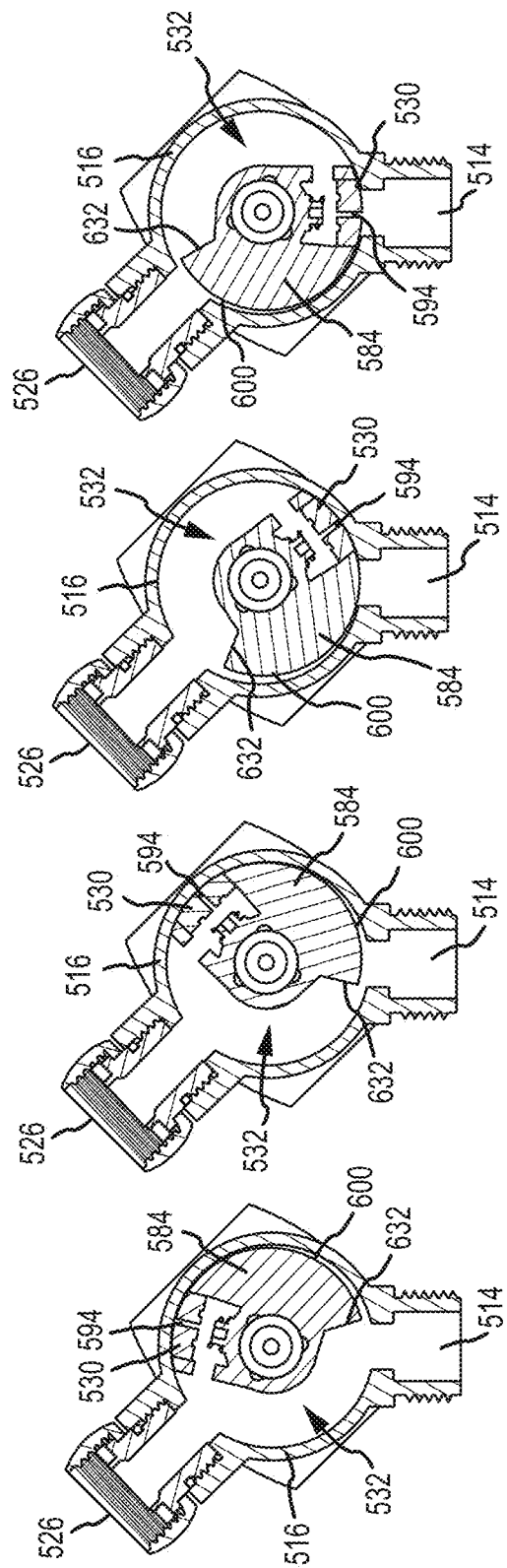
FIGS. 46A-46D are schematic cross-sectional views of the bracket assembly of FIG. 20 in different stages of flow control, as taken along line 45-45 of FIG. 23.

FIGS. 46A to 46D illustrate the bracket assembly 506 in varying stages of flow control. More particularly, FIG. 46A illustrates the bracket assembly 506 when the flow rate is at a maximum, FIGS. 46B and 46C illustrate the bracket assembly 506 when the flow rate is partially restricted, and FIG. 46D illustrates the bracket assembly 506 when fluid is only expelled through the metering hole 594 of the trickle seal 530 (i.e., at the lowest possible flow rate). FIG. 46A illustrates the bracket assembly 506 when it is fully open such that fluid may flow at a maximum flow rate through the bracket assembly 506. At this stage, the spool 584 is rotated such that the fluid aperture 568 of the fluid outlet arm 546 is completely unblocked by the cam wall 634 of the cavity 532. As is shown, fluid fills the cavity 532, the gap 640 between the cam wall 634 and the inner surface of the cylindrical sidewall 604 of the bracket body 516, as well as the smaller compartment 592 that houses the trickle seal 530 and spring 646. The metering hole 594 defined by the trickle seal 530 is also filled with fluid. The trickle seal 530 is pressed against the cylindrical sidewall 604 of the bracket body 516, forming a seal and preventing fluid from flowing past the trickle seal 530. FIG. 46B illustrates the bracket 506 in a partially restricted stage, in which the spool 584 has been rotated such that the wider part of the gap 640 between the cam wall 634 and the cylindrical sidewall 604 of the bracket body 516 is aligned with the fluid aperture 568 of the fluid outlet arm 546. At this stage, fluid flow is more restricted than in the open stage shown in FIG. 46A. Similar to the open flow stage shown in FIG. 46A, fluid is first directed into the cavity 532 of the spool 584, but the fluid passage 638 between the cavity 532 and the fluid outlet 514 of the bracket assembly 516 is restricted by the end wall 632 and the cam wall 634 and fluid received through the fluid inlet 526 must flow through a narrower fluid passage 638 than in FIG. 46A in order to reach the fluid outlet arm 546. In this stage, the trickle seal 530 remains biased against the cylindrical sidewall 604 of the bracket body 516, preventing fluid from flowing past the trickle seal 530. The flow rate is further restricted in FIG. 46C, in which the spool 584 is further rotated such that the narrower part of the gap 640 between the cam wall 634 and the cylindrical sidewall 604 of the bracket body 516 is aligned with the fluid aperture 568 of the fluid outlet arm 546. At this stage, fluid flow is further restricted, since fluid received through the inlet 526 must flow through an even smaller space in order to reach the fluid outlet arm 546. The trickle seal 530 remains biased against the cylindrical sidewall 604 of the bracket body 516, preventing fluid from flowing past the trickle seal 530.

In FIG. 46D, the spool 584 is rotated to its maximum restrictive flow state. In this state, the trickle seal 530 is seated directly over the fluid aperture 568 of the fluid outlet arm 546, and the trickle seal 530 is biased against the cylindrical sidewall 604 of the bracket body 516, such that fluid is prevented from flowing between the sealing face of the trickle seal 530 and the cylindrical sidewall 604. Here, the fluid flowing in a counter-clockwise direction is directed from the fluid inlet 526 into the gap 640 formed between the cam wall 634 and the cylindrical sidewall 604, but prevented from flowing past the trickle seal 530. Fluid flowing in a clockwise direction from the fluid inlet 526 is directed into the cavity 532 defined by the spool 584 and into the smaller compartment 592 that houses the spring 646 and trickle seal 530. The fluid flowing in a clockwise direction is also prevented from flowing past the trickle seal 530, but can flow through the metering hole 594 of the trickle seal 530, which is fluidly coupled to the fluid outlet arm 546. This allows for a flow that is precisely metered, for example, at 0.1 to 0.5 gpm, depending upon the diameter of the metering hole 594 and the fluid pressure.

In some embodiments, the bottom portion of the bracket assembly 506 may further define two annular recesses 582 that are each configured to receive an O-ring seal 538. These O-ring seals 538 may serve to prevent leakage between any potential gaps between the outer surface 628 of the bottom portion of the spool 584 and the cylindrical sidewall 604 of the bracket body 516. As is shown, e.g., in FIG. 43, one of the annular recesses 582 with a first O-ring 538 is positioned above the top cavity wall 624 and the other annular recess 582 with the second O-ring 538 is positioned below the bottom cavity wall 626, to prevent fluid from leaking from the fluid passages 638 formed by the cavity 532, the gap 640 between the cam wall 634 and the cylindrical sidewall 604 of the bracket body 516, and/or the compartment 592 housing the trickle seal 530. When attached to the knob 520, the spool 584 may rotate with the knob 520 around the bracket body shaft 542. As the spool 584 is rotated, the pressure applied to the spool 584 does not change, which prevents axial loading of the spool 584.

Figure 40:
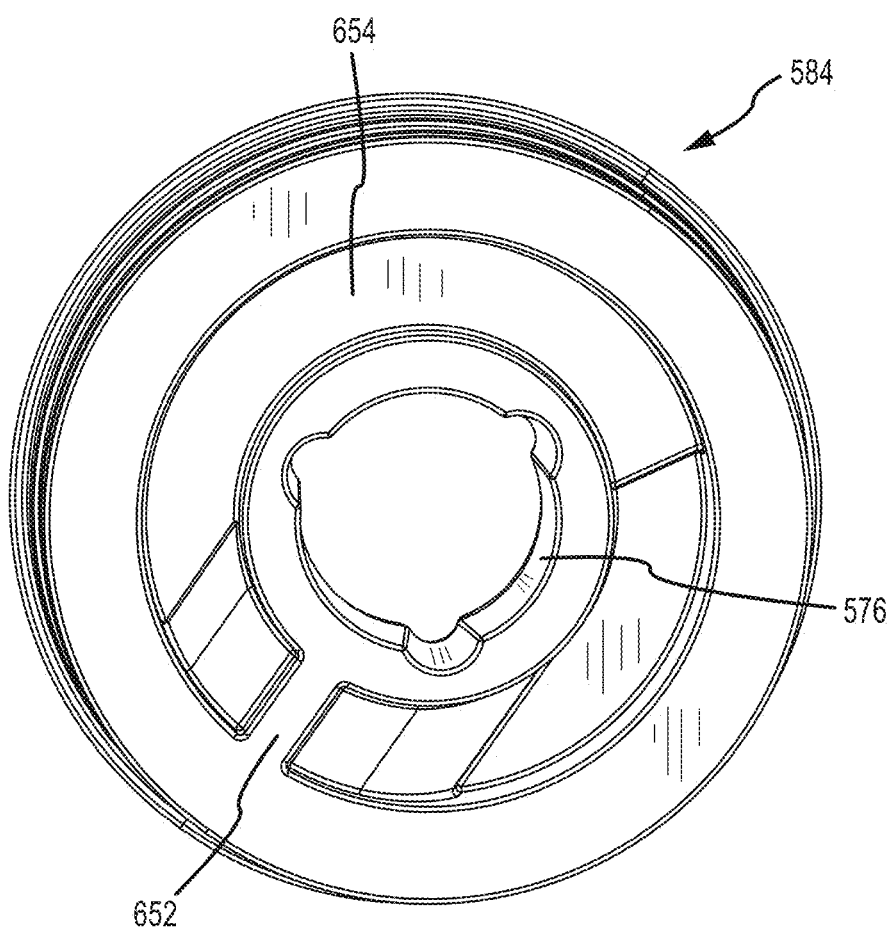
FIG. 40 is a right side isometric view of the spool of the bracket assembly of FIG. 20.
Figure 41:
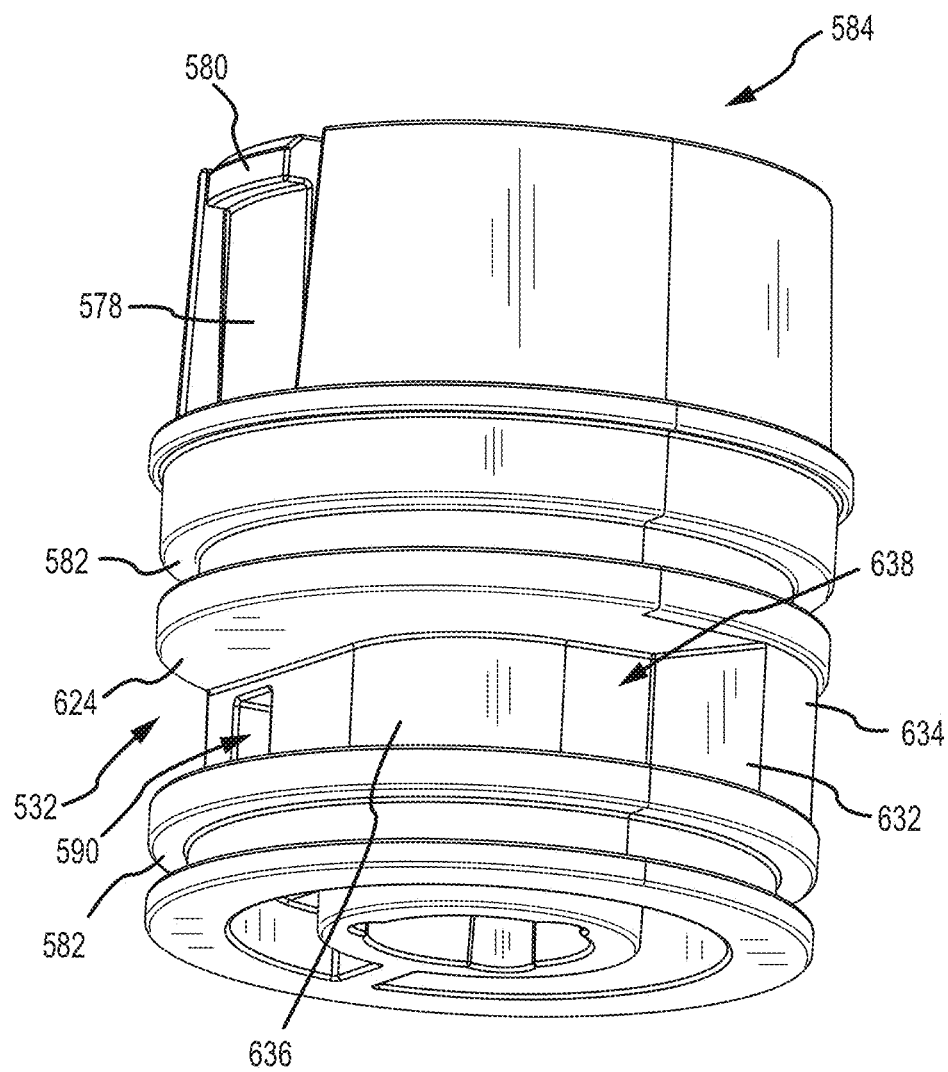
FIG. 41 is another side isometric view of the spool of the bracket assembly of FIG. 20.

In some embodiments, rotational limits on the angular distance that the spool shaft 576 is allowed to rotate relative to the bracket body 516 may be provided. In one embodiment, an arcuate wall 588 protruding from the bottom wall 586 of the bracket body 516 (shown in FIGS. 29, 31, and 32) may interface with a corresponding recessed channel 654 provided in the right end of the spool 584 around the spool shaft 576. When the spool 584 is positioned with the bracket body 516, the arcuate wall 588 of the bracket body 516 is mated with the recessed channel 654 of the spool shaft 576. The recessed channel 654 of the spool 584 may be interrupted by a radial rib 652 and thereby form an incomplete circle. The recessed channel 654 may slide relative to the annular wall 588 as the spool 584 is rotated by the flow control knob 520. As best shown in FIG. 40, the radial rib 652 across the recessed channel functions as a stop element that interferes with the ends of the arcuate wall 588 protruding from the bracket body 516 and prevents the spool 584 from rotating beyond the stop element formed by radial rib 652. In other embodiments, the channel 654 may form a full circle (rather than a partial or incomplete circle), such that the protruded portion of the bracket body 516 may travel 360 degrees around the bracket body shaft 542.

The coupling member, the showerhead bracket, and other elements of the various examples of the showerhead assembly may be integrally formed or may be made of two or more separate components that are joined together by mechanical fasteners, sonic or heat welds, adhesives, chemical bonds, any other suitable method, or any combination thereof. All directional references (e.g., upper, lower, upward, downward, left, right, leftward, rightward, top, bottom, above, below, vertical, horizontal, clockwise, and counterclockwise) are only used for identification purposes to aid the reader's understanding of the examples of the invention, and do not create limitations, particularly as to the position, orientation, or use of the invention unless specifically set forth in the claims. Joinder references (e.g., attached, coupled, connected, joined and the like) are to be construed broadly and may include intermediate members between the connection of elements and relative movement between elements. As such, joinder references do not necessarily infer that two elements are directly connected and in fixed relation to each other.

What is claimed is:

1. A showerhead bracket comprising:
   a bracket housing defining a fluid inlet attachable to a shower pipe and a fluid outlet attachable to a showerhead assembly including a showerhead handle;
   a cradle configured to support the showerhead handle that is selectively rotatable by a user relative to the bracket housing; and
   a spring sandwiched between the bracket housing and the cradle,
   wherein:
      the bracket housing includes teeth that engage with the spring;
      the spring is configured to rotate relative to the bracket housing; and
      frictional forces between the spring and the bracket housing prevent the spring from rotating relative to the bracket housing when the showerhead handle is supported by the cradle and no rotational forces are applied to the cradle by the user.

2. The showerhead bracket of claim 1, wherein the spring comprises:
   a central hub; and
   an interaction rim in frictional communication with the bracket housing.

3. A showerhead bracket comprising:
   a bracket housing configured to engage with a water source and a fluid delivery device, wherein the bracket housing includes a socket containing a plurality of socket teeth;
   a cradle configured to support the fluid delivery device; and
   a deformable member defining a plurality of teeth, wherein the deformable member is positioned within the socket and engages with the bracket housing socket teeth to allow the deformable member to rotate relative to the bracket housing when a rotational force exceeding a predetermined threshold is applied to the cradle, wherein the predetermined threshold is more than a force exerted by a weight of the fluid delivery device.

4. The showerhead bracket of claim 3, wherein the deformable member is an integral component of the cradle.

5. The showerhead bracket of claim 3, wherein the cradle comprises a cradle shaft and the bracket housing defines a hollow bracket shaft configured to receive the cradle shaft, wherein the mating of the cradle shaft with the bracket shaft rotatably connects the cradle to the bracket housing.

6. The showerhead bracket of claim 5, wherein the deformable member comprises a hub defining a central aperture through which the cradle shaft extends.

7. The showerhead bracket of claim 6, wherein:
   the central aperture has a shape on a first side of the hub;
   the cradle defines a key surrounding the cradle shaft and forms a shape that matches the shape of the central aperture on the first side of the hub; and
   the mating of the central aperture on the first side of the hub with the cradle key prevents rotation of the cradle and the deformable member relative to one another.

8. The showerhead bracket of claim 3, wherein the bracket housing remains fixed in place when the rotational force is applied to the cradle.

9. The showerhead bracket of claim 3, wherein the deformable member comprises a central hub with a plurality of spokes extending outwardly from the hub, each of the plurality of spokes having an end opposite the central hub, and each end of the plurality of spokes contains a plurality of teeth.

10. The showerhead bracket of claim 3, wherein spring and frictional forces between the deformable member teeth and the socket teeth maintain the position of the deformable member teeth relative to the socket teeth when the fluid delivery device is resting in the cradle and no rotational force is applied by a user.

11. The showerhead bracket of claim 3, wherein the cradle is rotatable in a single direction.

12. The showerhead bracket of claim 11, wherein the socket teeth and the deformable member teeth are angled in the direction of rotation.

13. The showerhead back of claim 3, wherein the cradle is rotatable in two directions.

14. The showerhead bracket of claim 13, wherein the socket teeth and the deformable member teeth are uniform and symmetrical.

15. A showerhead bracket comprising:
   a bracket housing defining a fluid inlet attachable to a shower pipe and a fluid outlet attachable to a showerhead assembly including a showerhead handle;
   a cradle configured to support the showerhead handle selectively rotatable by a user relative to the bracket housing; and
   a spring positioned between the bracket housing and the cradle, the spring comprising:

a central hub; and an interaction rim frictionally engaged with the bracket housing, wherein:

the spring is configured to rotate relative to the bracket housing; and frictional forces between the spring and the bracket housing prevent the spring from rotating relative to the bracket housing when the showerhead handle is supported by the cradle and no rotational forces are applied to the cradle by the user.

16. The showerhead bracket of claim 15, wherein the spring further comprises a plurality of spokes extending outward radially from the central hub to the interaction rim.

17. The showerhead bracket of claim 16, wherein the interaction rim comprises separate rim sections each attached to a respective spoke.

18. The showerhead bracket of claim 17, wherein each of the separate rim sections defines an oval structure that permits the separate rim sections to deflect inward, allowing the spring to rotate relative to the bracket housing.

19. The showerhead bracket of claim 15, wherein the interaction rim comprises separate rim sections spaced apart from one another.

20. The showerhead bracket of claim 15, wherein the interaction rim allows rotation of the cradle in one direction and prevents rotation in the opposite direction.

21. The showerhead bracket of claim 20, wherein the interaction rim further comprises asymmetrical teeth that allow rotation of the cradle in only one direction.

* * * * *